(12) United States Patent
McLemore

(10) Patent No.: US 7,412,922 B2
(45) Date of Patent: Aug. 19, 2008

(54) COOKING APPARATUS

(76) Inventor: John D. McLemore, 105 Hickory Ct., Fortson, GA (US) 31906

( * ) Notice: Subject to any disclaimer, the term of this patent is extended or adjusted under 35 U.S.C. 154(b) by 474 days.

(21) Appl. No.: 10/917,418

(22) Filed: Aug. 13, 2004

(65) Prior Publication Data

US 2005/0034611 A1 Feb. 17, 2005

Related U.S. Application Data

(63) Continuation-in-part of application No. 10/640,691, filed on Aug. 14, 2003, now Pat. No. 6,941,857.

(60) Provisional application No. 60/402,912, filed on Aug. 14, 2002.

(51) Int. Cl.
*A47J 37/12* (2006.01)

(52) U.S. Cl. .............................. 99/413; 99/403; 99/407; 99/410

(58) Field of Classification Search .................. 99/403, 99/407, 410, 413, 415; 219/437, 432, 429
See application file for complete search history.

(56) References Cited

U.S. PATENT DOCUMENTS

| 2,032,175 | A |   | 2/1936  | Jones ........................... 99/331 |
| 2,215,929 | A |   | 9/1940  | Husk ......................... 99/329 R |
| 2,597,695 | A |   | 5/1952  | Braski et al. |
| 2,785,277 | A |   | 3/1957  | Jepson ......................... D7/360 |
| 3,714,889 | A | * | 2/1973  | Mazzola et al. ............... 99/411 |
| 4,489,235 | A | * | 12/1984 | Porteous ..................... 219/437 |
| D280,064  | S |   | 8/1985  | Obata et al. ................... D7/360 |
| 4,798,939 | A |   | 1/1989  | Nett |
| 4,968,516 | A |   | 11/1990 | Thompson ................... 426/233 |

(Continued)

FOREIGN PATENT DOCUMENTS

DE          3 143 863       *   5/1983

(Continued)

OTHER PUBLICATIONS

Declaration of Ron Popeil with notarized photographs (3 pgs.), dated May 17, 2006, Exhibits 1A, 1B and 1C.

(Continued)

*Primary Examiner*—Reginald L Alexander
(74) *Attorney, Agent, or Firm*—Smith, Gambrell & Russell, LLP

(57) ABSTRACT

A cooking apparatus, as in a domestic fryer, includes a stacked shell, cooking pot and basket combination. A heater element extends into the cooking pot and has a generally horizontal portion suspended above the pot bottom and supported by a support platform as in a volume reduction step-in region in the cooking pot and/or a removable basket support platform. The pot holds sufficient cooking fluid to provide for deep frying large food items as in a whole turkey (e.g., 3.63 Kg to 8.16 Kg). An embodiment includes a drain spigot with adjustable drain spigot cover assembly. The heating device includes a combination control unit and heating element that is releasably supported by the shell with a fail-safe electrical disconnect connection. The basket support platform and one or more temperature sensors are connected to the heating element and thus removable as well. The cooking pot has an edge recess for receipt of the heating element and for pot drainage.

41 Claims, 44 Drawing Sheets

U.S. PATENT DOCUMENTS

| | | | |
|---|---|---|---|
| 5,045,672 A * | 9/1991 | Scott | 219/439 |
| 5,172,328 A | 12/1992 | Cahlander et al. | |
| D338,132 S | 8/1993 | Chang | D7/356 |
| D339,957 S | 10/1993 | Chang | D7/354 |
| D345,281 S | 3/1994 | Mauffrey | D7/354 |
| 5,379,684 A | 1/1995 | Ettridge | |
| 5,400,700 A | 3/1995 | Bois | |
| 5,429,039 A | 7/1995 | Chang | |
| D365,723 S | 1/1996 | Powell | |
| D369,505 S | 5/1996 | Philippe | D7/354 |
| D374,791 S | 10/1996 | Wu | D7/354 |
| 5,613,423 A * | 3/1997 | Polster | 99/330 |
| D378,647 S | 4/1997 | Piret | |
| 5,651,905 A | 7/1997 | Thies et al. | |
| D386,646 S | 11/1997 | Wurth | D7/354 |
| 5,719,934 A | 2/1998 | Hayakawa | |
| 5,758,569 A | 6/1998 | Barbour | |
| 5,794,522 A | 8/1998 | Bois et al. | |
| 5,896,810 A | 4/1999 | Barbour | |
| 5,918,535 A * | 7/1999 | Moreau | 99/413 |
| 5,973,297 A | 10/1999 | Winter et al. | |
| D416,166 S | 11/1999 | Hirose et al. | D7/360 |
| 6,002,111 A | 12/1999 | Beugnot et al. | |
| 6,006,658 A | 12/1999 | Siu | |
| D418,361 S | 1/2000 | Utsugi | D7/354 |
| D419,824 S | 2/2000 | Sham et al. | D7/354 |
| D424,366 S | 5/2000 | Blaise | |
| 6,085,641 A * | 7/2000 | De'Longhi | 99/408 |
| D431,149 S | 9/2000 | Cooke | D7/354 |
| D431,150 S | 9/2000 | Kalina et al. | |
| 6,138,552 A | 10/2000 | Baillieul et al. | |
| 6,240,835 B1 | 6/2001 | Bois et al. | |
| D444,666 S | 7/2001 | Kalina et al. | |
| 6,262,398 B1 | 7/2001 | Busquets et al. | |
| 6,269,737 B1 | 8/2001 | Rigney et al. | |
| 6,289,793 B1 | 9/2001 | Hu et al. | |
| 6,314,869 B1 * | 11/2001 | Bourgeois, Jr. | 99/340 |
| 6,320,166 B1 | 11/2001 | Park | |
| D458,507 S | 6/2002 | Meelen | |
| 6,412,401 B1 | 7/2002 | Mariotti | |
| 6,443,051 B1 | 9/2002 | Suzuki | |
| 6,446,545 B2 | 9/2002 | Rigney | |
| D464,526 S | 10/2002 | Brown | |
| 6,470,794 B2 | 10/2002 | Takahashi | |
| 6,483,990 B1 | 11/2002 | Bikhovsky | |
| 6,495,808 B1 | 12/2002 | Clayton et al. | |
| 6,498,323 B1 | 12/2002 | Robertson, Jr. et al. | |
| 6,498,326 B1 | 12/2002 | Knappe | |
| 6,515,262 B1 | 2/2003 | Li | |
| 6,532,865 B1 | 3/2003 | Hoffman | |
| 6,711,992 B1 | 3/2004 | McLemore | 99/413 |
| 2002/0017201 A1 | 2/2002 | Backus et al. | |
| 2003/0003209 A1 | 1/2003 | Rigney | |
| 2004/0103795 A1 | 6/2004 | McLemore | 99/403 |
| 2005/0034611 A1 | 2/2005 | McLemore | 99/413 |

FOREIGN PATENT DOCUMENTS

| | | | |
|---|---|---|---|
| DE | 3 150 455 | * | 6/1983 |
| DE | 3 221 433 | * | 12/1983 |
| EP | 0 143 885 | * | 6/1985 |
| EP | 0 432 370 | * | 6/1991 |
| WO | WO 2005/016091 | | 2/2005 |

OTHER PUBLICATIONS

Wells Manufacturing brochure for WFAE-30F Fryer (2 pgs.), undated, Exhibit 2A and 2B.
Photographs of Masterbuilt Grand Slam packaging and product (2 pgs.), undated, Exhibits 3 and 35.
Photographs depicting Krups Fryer packaging and product (10 pgs.), undated, Exhibits 4-8, 10-11, 15-16 and 34.
GMA Recipe: Emeril's Deep-Fried "Cajun" Turkey (2 pgs.), printed from http://www.wchstv.com/gmarecipes/deepfriedcajunturkey.html, pulled May 5, 2006, Exhibit 9.
Classes of Turkey table (1 pg.), undated, printed from www.hormel.com, Exhibit 12.
Pages from Krups Fryer Instruction Manual (2 pgs.), undated, Exhibits 13-14.
Photographs of Memco Model No. 6700 003 Fryer, undated, Exhibits 17-21.
Photographs of DeLonghi Dual Zone Deep Fryer Model D445DZ (5 pgs.), undated, Exhibits 22-28 and 30.
Ningbo Yida Electric Appliances Co Ltd, printed from http://www.globalsources.com/gsol/1/0.65qt.-Round-35W//p2000000003844/3000000149681/bg/100117267,0.htm, May 14, 2006, Exhibit 29.
Product description of an electric slow cooker (1 pg.) of Zhongshan New Nomura Electric Manufacturing Co., Ltd., printed from http://normura.en.alibaba.con/product/50139637/50641604/Deep_Fryers/Stainless_Steel_Deep_Fryer.html, May 14, 2006, Exhibit 31.
Product depiction of a stainless steel deep fryer (1 pg.) of Serena Electrical (Shenzhen) Co., Ltd., printed from http://serena-elec.en.alibaba.com/product/50038077/50172742/Deep_Fryers/Deep_Fryer.html, May 14, 2006, Exhibit 32.
Product information sheet (1 pg.) of a deep fryer from Hong King Electric Appliances Co., Ltd. Printed from http://hongking.en.alibaba.com/product/50048493/50536540-Deep_Fryers/Deep_Fryer_with_Digital_Control, May 14, 2006, Exhibit 33.
Photograph of Linkco Production Line (supplier of electrical heaters showing a design similar to that used in the Krups deep fryer), undated, Exhibit 38.
DeLonghi America Inc.—Company Profile, Research, News, Information, Contact.., pulled from the internet at http://goliath.ecnext.com/coms2/product-compint-0000232441-page.html on Feb. 1, 2005 (1 page).
Chef's®The Best Kitchens Start Here, pulled from the internet at http://www.chefscatalog.com/store/catalog/catB9a.jhtml?itemld=cat000038&p.. on Feb. 1, 2005 (1 page).
Delonghi DeLonghi Dual Zone Deep Fryer at sears.com, pulled from the internet at http://www.sears.com/sr/javasr/product.do?vertical=GIFT&pid=08035042000.. on Feb. 1, 2005 (1 page).
Dual Zone Deep Fryer (3.0 lb. Capacity: Model D455DZ), pulled from the internet at http://www.delonghi.com/delonghi/data/int/usa/Prodotti.nsf/b912ead30a9700c.. on Feb. 1, 2005, (2 pages).
Chef's Dual-Zone Digital Fryer, pulled from the internet at http://www.chefscatalog.com/store/catalog/prod.jhtml?itemld=cprod6770003&.. on Feb. 1, 2005 (1 page).
DeLonghi D882UX Cool Touch Roto Deep Fryer Review at Epinions.com, pulled from the internet at http://www.epinions.com/content_95457218180 on Feb. 1, 2005 (3 pages).
DeLonghi Owners Manual for Deep Fryer for model D455DZ dated Oct. 9, 2003 (p. 1 to 28).
"Krups—Fryer * Friteuse * Freidora", pulled from internet at www.krups.com, Assumed Date is Jun. 2002 from '06-02 code on front cover.*
Provantage, "AC Power Universal Extension Cables" pulled from internet at http://www.provantge.com/buy-22044530-belkin-cables-ac-drives-audio-monitor-printer- . . . , on Aug. 14, 2003, 3 pages.*
T-FAL US—Magiclean "T-FAL", pulled from internet at... /index.asp?category%5Fid=200&dept%5Fid=210&sku=U00210&mscssid=W8V8LA5D9U0 on Mar. 24, 2003, one page.*
42 Qt Turkey Deep Fryer Special "Iron Works Quality Cookware and seasonings", pulled from internet at http://www.gasgrill-store.com/42qtturdeepf.html, on Mar. 27, 2003, one page.*
Krups Pro-Fry Semi Professional Stainless Steel Fryer<BR><i . . . /freeshipicon.gifborder=0, "Everythinghome", pulled from internet at http://store.yahoo.com/everythingbagel/krupprofsemp.html, on Mar. 27, 2003, 3 pages.*
MC Sports—King Kooker 26 Quart Aluminum Turkey Fryer/ Boiling Pot, pulled from internet at http://www.mcsports.com/product/index.jsp?productID=7599, on Mar. 27, 2003, 2 pages.*
Welcome to BBQ's Galore-The World's Largest BBQ Retailer, "Barbeques Galore", pulled from internet at http://www.bbqgaloreonline.com/bbq2001/shoponline/produ.../GrillDetails. asp?sku=26315, on Mar. 27, 2003, 2 pages.*

Masterbuilt 30 qt. Aluminum Fryer, The Grand Slam at sears.com, "Masterbuilt 30 qt. Aluminum Fryer, The Grand Slam", pulled from internet at.../productsummary.jsp?BV_SessionID= @@@@0457175865.1048779615 @@@@&BV_Eng, on Mar. 27, 2003, 1 page.*

Amazon.com: Home & Garden/Outdoor Living/Categori . . . /Turkey Fryers & Fish Cooker, pulled from internet at http://www.amazon.com/exec/obidos/tg/browse/-/553776/102-0365240-8744926, on Dec. 17, 2003, 4 pages.*

* cited by examiner

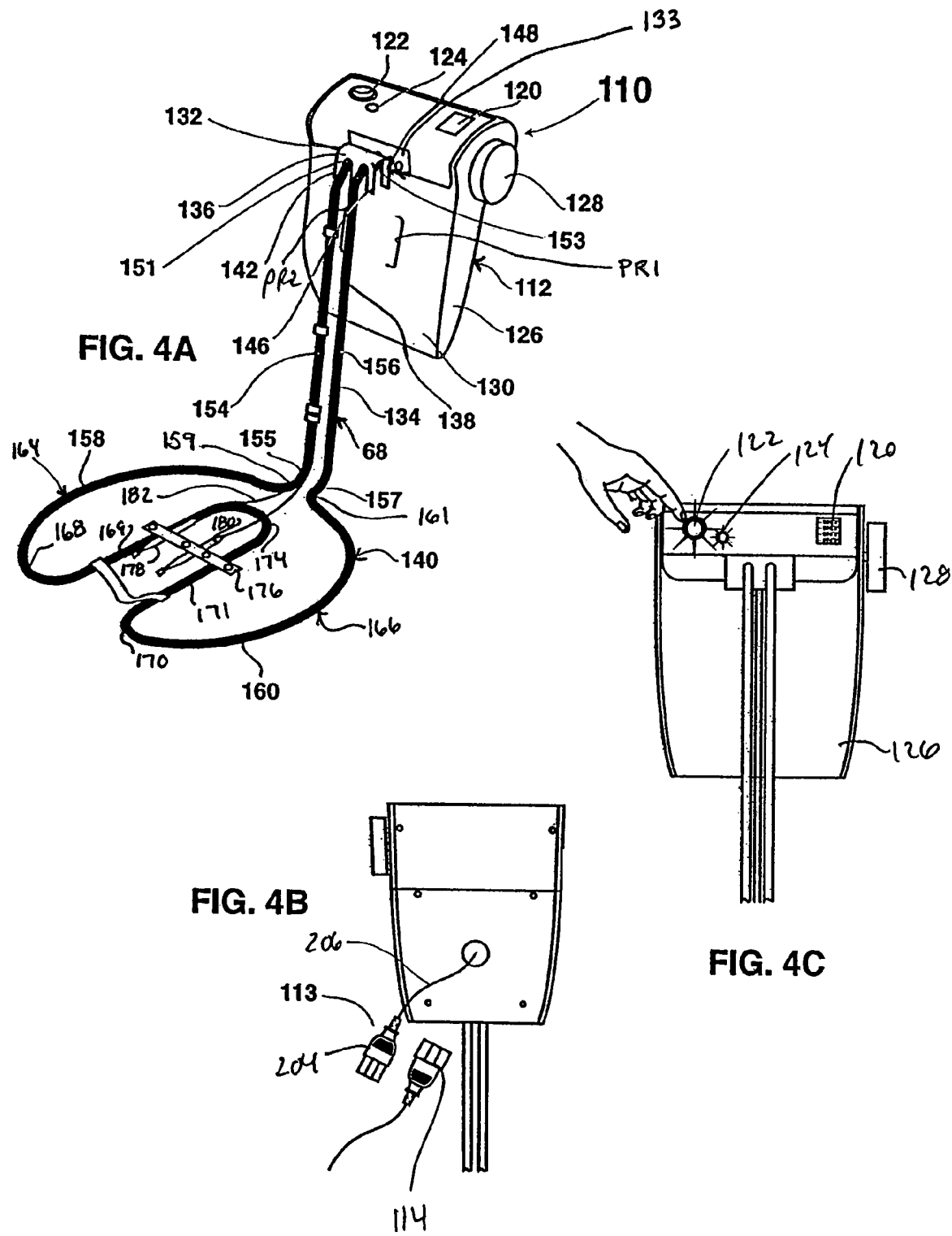

ically low volume usage of cooking fluid (e.g., 6 to 16 quarts

COOKING APPARATUS

CROSS REFERENCE TO RELATED APPLICATIONS

The present invention is a Continuation-In-Part of U.S. patent application Ser. No. 10/640,691, filed Aug. 14, 2003 now U.S. Pat. No. 6,941,857 and claiming 35 U.S.C. § 119(e) priority to U.S. Provisional Patent Application No. 60/402, 912, filed Aug. 14, 2002, each being incorporated herein by reference.

FIELD OF THE INVENTION

The present invention features a cooking apparatus with a preferred embodiment being a domestic indoor electric power sourced fryer that is well suited for deep frying in oil large food objects such as a turkey, while also being suited for cooking other food types with the same type or different type of cooking fluid.

BACKGROUND OF THE INVENTION

Outdoor deep frying of, for example, turkeys has gained in popularity with the advent of outdoor cooking apparatus such as the "Grand Slam Turkey Fryer"™ of Masterbuilt Mfg. Inc. in Columbus, Ga., USA which includes an outdoor propane burner, large cooking pot (e.g., 30 quarts [or 28.4 liters]) a cooking basket (or other means for manipulating large food items as in a turkey) and a grab handle. A cooking apparatus of this type provides for deep frying large food items with turkeys (e.g., 8 to 18 lbs [3.6 Kg to 8.2 Kg] in weight) being illustrative. However, weather conditions or the lack of a suitable location (e.g., apartment dwellers) can prevent or lessen the desire to use an outdoor cooking apparatus.

Additional prior art outdoor cooking apparatus include seafood steam cookers as well as deep fry steak cookers as illustrated by Masterbuilt's "Sizzlin Steak Rack"™ (U.S. Pat. No. 6,742,446). There is also featured in the prior art cooking apparatus featuring a drain spigot and hanging basket arrangement as seen from Masterbuilt's U.S. Pat. No. 6,711, 992 which is incorporated by reference.

As illustrated by U.S. Pat. Nos. 2,032,175; 2,597,695; 2,785,277 there also exist indoor, home use or domestic electric fryers. These devices are designed for frying small, multiple individual food items in groups as in fries, onion rings, and vegetables, and are generally less susceptible to easy breakdown and cleaning.

With large volume food inserts such as a 14 lb [6.4 Kg] whole turkey or similarly sized food item (e.g., 14±3 lb [6.4 Kg±1.4 Kg], there is required a relatively large volume of cooking fluid for suitable full coverage of the inserted food (e.g., the above noted 30 quart [28.4 liter] outdoor cooking pot). However, there is associated with large volume outdoor cooking apparatus a corresponding long cooking fluid heat up time (and cooling) as well as consumption of a large volume of the cooking fluid. Thus, a reduction in the amount of oil or cooking fluid volume utilized while still providing enough cooking fluid for sufficient food surface contact (e.g., a liquid cooking fluid contact over the entire surface of a submerged food item) is beneficial in providing more rapid heat up and cool down times and is a more efficient and less costly use of cooking fluid whether that is oil, water or some other fluid.

SUMMARY OF THE PRESENT INVENTION

The present invention features a cooking apparatus that is preferably a non-outdoor, electric power sourced cooker (e.g., fryer) such as a non-commercial or domestic "house use" sized electric fryer that yet can accommodate large single piece food items such as a turkey (e.g., 8 to 18 lb [3.63 Kg to 8.16 Kg] turkeys or turkeys in the more common 10 or 11 to 14 lb [4.54 Kg to 6.35 Kg] range). Also, in a preferred embodiment, while being able to handle items such as an 8 to 18 lb [3.63 Kg to 8.16 Kg] turkey, there is maintained rela[5.68 liter to 15.14 liter]) in a first embodiment and 8 to 12 quarts [7.57 liter to 11.36 liter] in even further reduced cooking fluid volume alternate embodiments with a 10 quart [9.46 liter] "fill line" demarcation being preferred. The present invention thus provides a means for domestic home owners to enjoy deep fried large food items such as a turkey in an electric fryer positioned on a countertop, tabletop or the like.

An embodiment of the inventive subject matter features a domestic cooker assembly, comprising: a shell or outer shell having an interior cavity, a cooking pot dimensioned for receipt within the interior cavity, and a heat source positioned for heating a cooking fluid within the pot. The pot is designed to provide an efficient combination of a heater means and cooking vessel which, in a preferred embodiment, provides a volume reduction. In an embodiment of the invention the pot is dimensioned to receive in cooking position a 12 to 16 lb [5.4 Kg to 7.3 Kg] turkey as in a 14 lb [6.4 Kg] turkey. In an alternate embodiment, there is additionally provided a dispenser means as in the form of a valved drain spigot that is used in conjunction with the indoor cooker and is preferably arranged so as to have a drain outlet port generally commensurate (e.g., within ±5 cm) in height level relative to an electric heater element height position within the cooking pot.

The cooking pot preferably includes one or more radial step-in section(s) positioned, for example, in a lower third of the cooking pot, and the heat source is preferably an electric resistance unit, as in a configured resistance bar having a first section that extends down into the pot and a second section that is suspended above a bottom surface of the cooking pot. The subject matter of the present invention further preferably includes an embodiment with a step-in section positioned vertically above the second section of the resistance bar. The assembly also preferably features a step-in section of the cooking pot which includes one or more step-in segments spaced peripherally or circumferentially about the side wall of the cooking pot (e.g., at a common level) and/or one or more vertically spaced (unitary) or multi-segment arrangements per level.

The assembly further preferably comprises food holding means, such as a basket having cooking fluid flow through apertures and grasping means, having a radial outer region dimensioned for support by the step-in section of the cooking pot and/or an alternate suspension means. In one embodiment, the basket is dimensioned for receiving a 12 to 16 pound [5.4 Kg to 7.3 Kg] turkey, for example. The means for supporting the food holding means in a suspended state above a portion of the heat source preferably extends just above (e.g., within 5 cm) a bottom surface of the cooking pot, as in a lower positioned first step-in section formed in the lower end of the cooking pot. In an alternate embodiment, there is featured a second radial step-in portion and the second radial step-in portion is positioned above the first radial step-in portion and is radial outward of said first step-in portion.

The heat source preferably includes a resistance heater bar having a portion extending down into the cooking pot, and the food holding means, which is dimensioned for receipt within the cooking pot, includes a recessed portion that extends in common with the downwardly extending portion of the resistance heater bar. In this way, the basket volume can be made larger by having at least 90% of the basket's circumference greater than the circumference occupied by a circle contacting the interior portion of the heater bar reception recess formed in the basket. In addition, the heating element is preferably of the immersion type that is readily removable while also still providing for an encasing of the heat within a cooking pot with a sealing lid (flush contact circumferentially all around despite the heater bar's extension radially in and out of the upper region of the cooking pot (e.g., a recessed upper edge region of the cooking pot that doubles as a flow out facilitator). Moreover, in a preferred embodiment, the heat temperature sensors are connected and removable with the immersion heating element, as well as preferably a basket support platform like the basket support platform described below.

An alternate embodiment of the invention comprises a basket (or alternate food holding means) support platform that preferably functions both as a stable platform for the bottom of an above positioned basket or alternate type food holder and also as a means for supporting the lower portion of the electric resistance unit above the surface of the cooking pot and also preferably includes means for precluding horizontal heater element shifting, as in clamping units which clamp onto a horizontal, looped resistance bar portion.

In one embodiment, the cooking pot is shown to include a cooking fluid fill line representing a cooking fluid volume from, for example, 8 to 16 quarts [7.57 liter to 15.14 liter], and with that cooking pot having an overall volume of about 2 to 3 times that represented by the fluid fill line. An alternate embodiment of the present invention includes a drain valve assembly for drainage of cooking fluid from the cooking pot with the outer shell or casing having an open reception area for allowing the drain valve to extend from the supporting pot radially out past the periphery of the shell. An outer shell closure cover is also preferably provided in conjunction with a radially projecting enclosure housing to allow for heat retention closure of the drain valve reception area in the outer shell wall during heat up, despite the spigot extension radially beyond the main body of the outer shell wall. Thus with the top lid in a flush seal arrangement over the entire periphery of the cooking pot's upper edge (including a portion occupied by a bridge support of the heating element through which horizontal portions of two pronged heat resistant bar extends).

The assembly of the present invention also preferably also has the shell formed with receiving means for receiving the cooking pot to preclude free relative rotation of the cooking pot while within the shell, as in a notch formed in an upper edge of the shell that is dimensioned to receive the aforementioned tab portion of the cooking pot or vice versa. An alternate embodiment for the receiving means includes a receiving means connection block designed to connect with a corresponding connection block fixed to the cooking pot.

An embodiment of the shell includes a multi-component unit with a first component including an upper annular rim of plastic, an intermediate metallic shell component or main body (e.g., a single or multi-shell wall configuration) and a lower base support with suspension projections extending off and below the base support.

An additional embodiment of the invention features a domestic fryer assembly, comprising a shell having an interior cavity, a cooking pot dimensioned for receipt within the interior cavity (all the way into the shell's cavity such that there are generally corresponding upper edges in the cooking pot and shell), and a heating device with heating element positioned for heating a cooking fluid within the pot. The heating device can include a heating element as in a heat resistance bar with a generally horizontal portion positioned below an upper surface of a cooking pot's step-in means. The heater bar preferably makes direct contact with the cooking fluid (an immersion heater) and is preferably formed of a metallic material that is free of any insulating coating (e.g., a bent stainless steel heater resistance rod). The controls associated with the heating element are also preferably integrated with the heating element so that the heating element and controls therefore can be readily removed and attached as a unit relative to the cooking pot. The aforementioned basket support is secured to a lower heat resistance bar section of the heating element for dimensional stability and to place the lower heat resistance bar section in a suspended state (or non-direct contact state) between the bottom of the basket and the interior surface of the bottom of the cooking pot. A basket dimensioned for receiving a turkey of 8 to 18 pounds [3.63 Kg to 8.16 Kg] is provided in one embodiment and has a configuration which comes in supporting contact with the step-in means and/or a basket support platform doubling as a heater bar positioner. The basket further preferably includes a radial indent section which provides greater clearance space between the basket's side wall and a generally vertical section of the heat resistance bar of the heating element removably received within the cooking pot. Also, the cooking pot preferably has an upper annular flange which is in supporting relationship with the shell and has flange extension handles such that the pot can be readily lifted out of the upper receiving opening of the shell (e.g., after drainage of the cooking fluid) and any remaining cooking fluid can be poured out of a recessed flange section of the pot which also functions as a locking device relative to a receiving notch in the shell and also as a pass through region of the heating device.

The present invention also features a method of deep frying food, as in a whole turkey having the above described dimensions, with the domestic fryer process involving inserting the food item (e.g., a turkey) into a cooking pot, and heating fluid in the cooking pot (and preferably covering a submerged food item) with an electric heater unit in contact with the fluid in the cooking pot, with an alternate embodiment further comprising heating the cooking fluid with a drain cover in a drain coverage position and then adjusting the cover to a drain access position and drainage cooking fluid through the drain.

BRIEF DESCRIPTION OF THE DRAWINGS

FIG. 4A shows a heating device by itself.

FIG. 4B shows a cut-away rear view of the heating device with the cord plug means shown FIG. 4C shows an enlarged, cut-away front view of the heating device.

DETAILED DESCRIPTION

Figure 1:
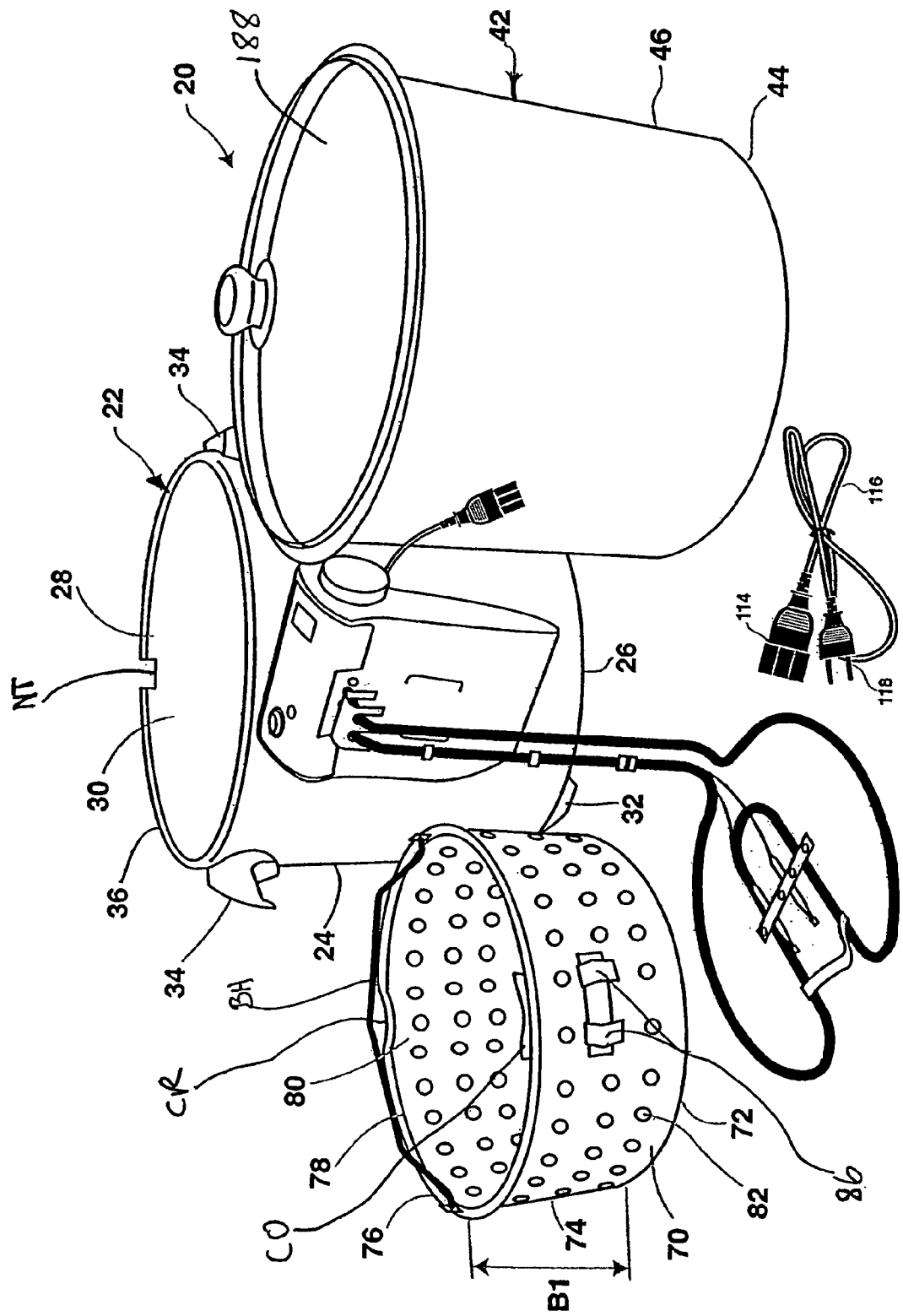
FIG. 1 illustrates a perspective view of a disassembled embodiment of the electric cooker.
Figure 2:
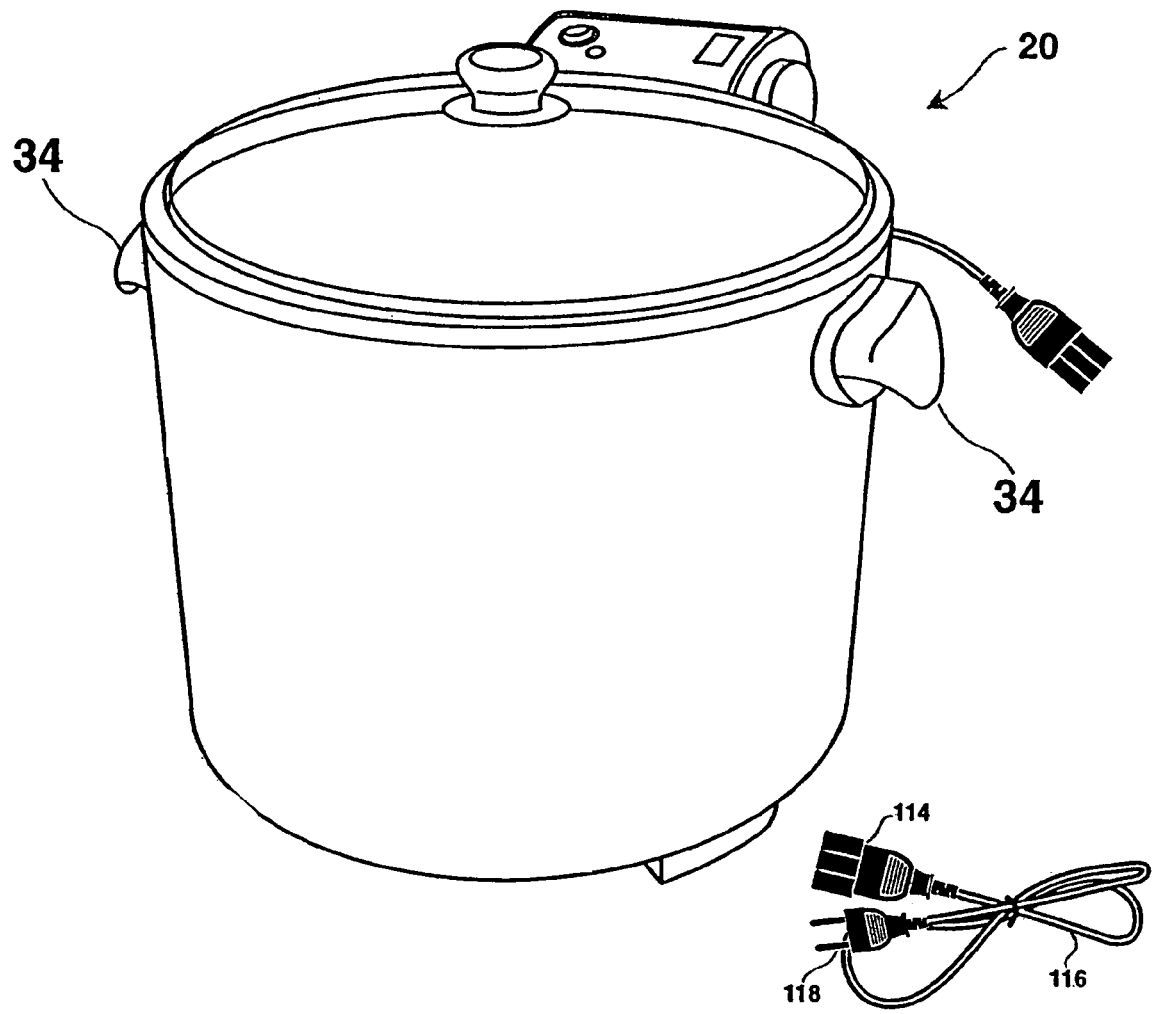
FIG. 2 illustrates a perspective view of components of an electric cooker in an assembled state but for the attachment of the electric cord.

A first embodiment of the present invention is shown in FIG. 1 and features a cooking apparatus 20 comprising shell 22 having external wall 24, base 26 and upper opening 28 leading into interior cavity 30. Shell 22 is preferably made of a relatively sturdy material such as steel or a heavy gauge aluminum (or, as described below, of plastic or a combination of materials as in a plastic ring with meal heat shield bottom disk), and can be either a single wall shell or a laminate or a multi-stack wall as in a double walled shell with or without intermediate insulating material (not shown).

Figure 8:
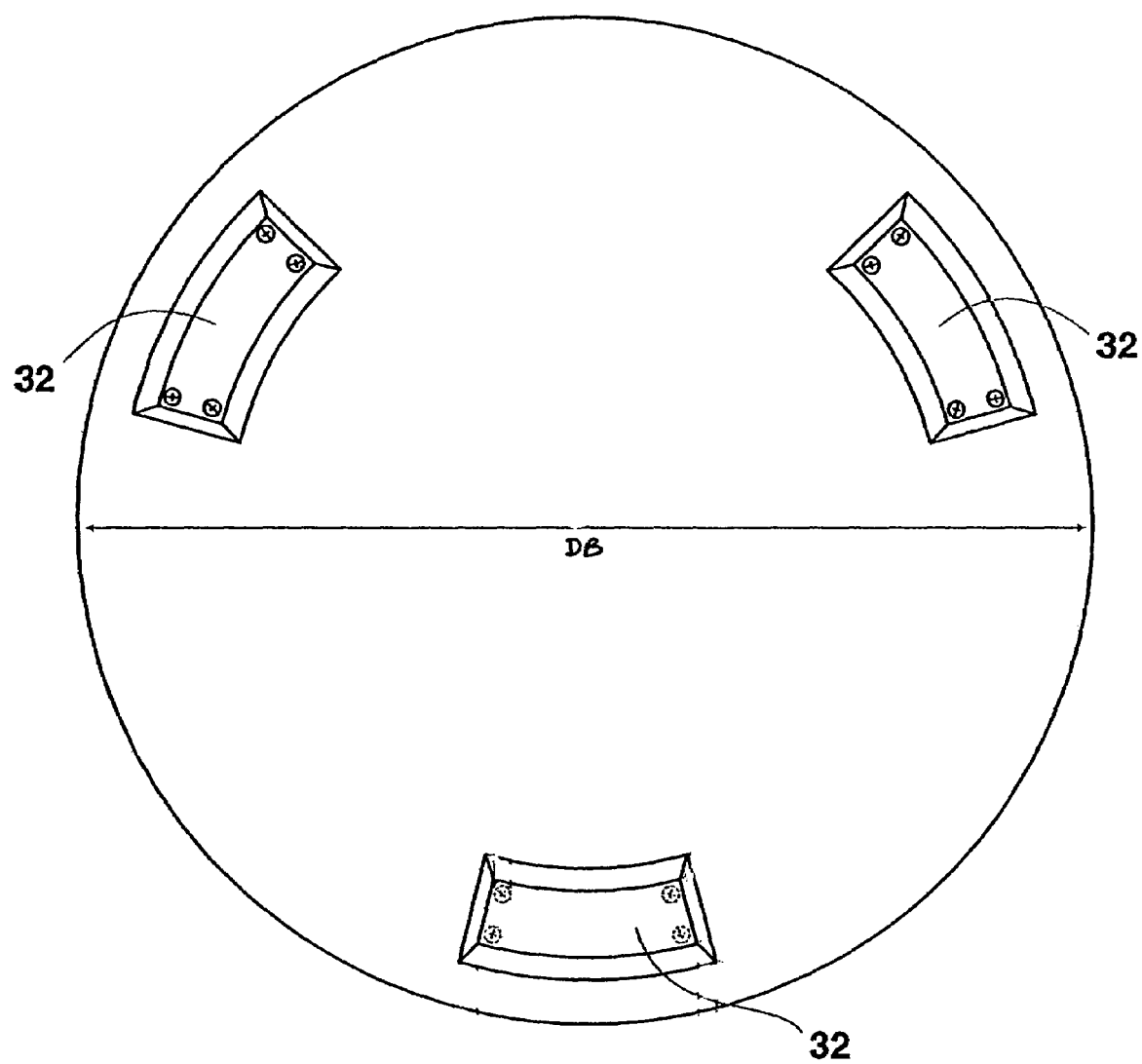
FIG. 8 shows a bottom plan view of an embodiment of the outer shell of the present invention.
Figure 9:
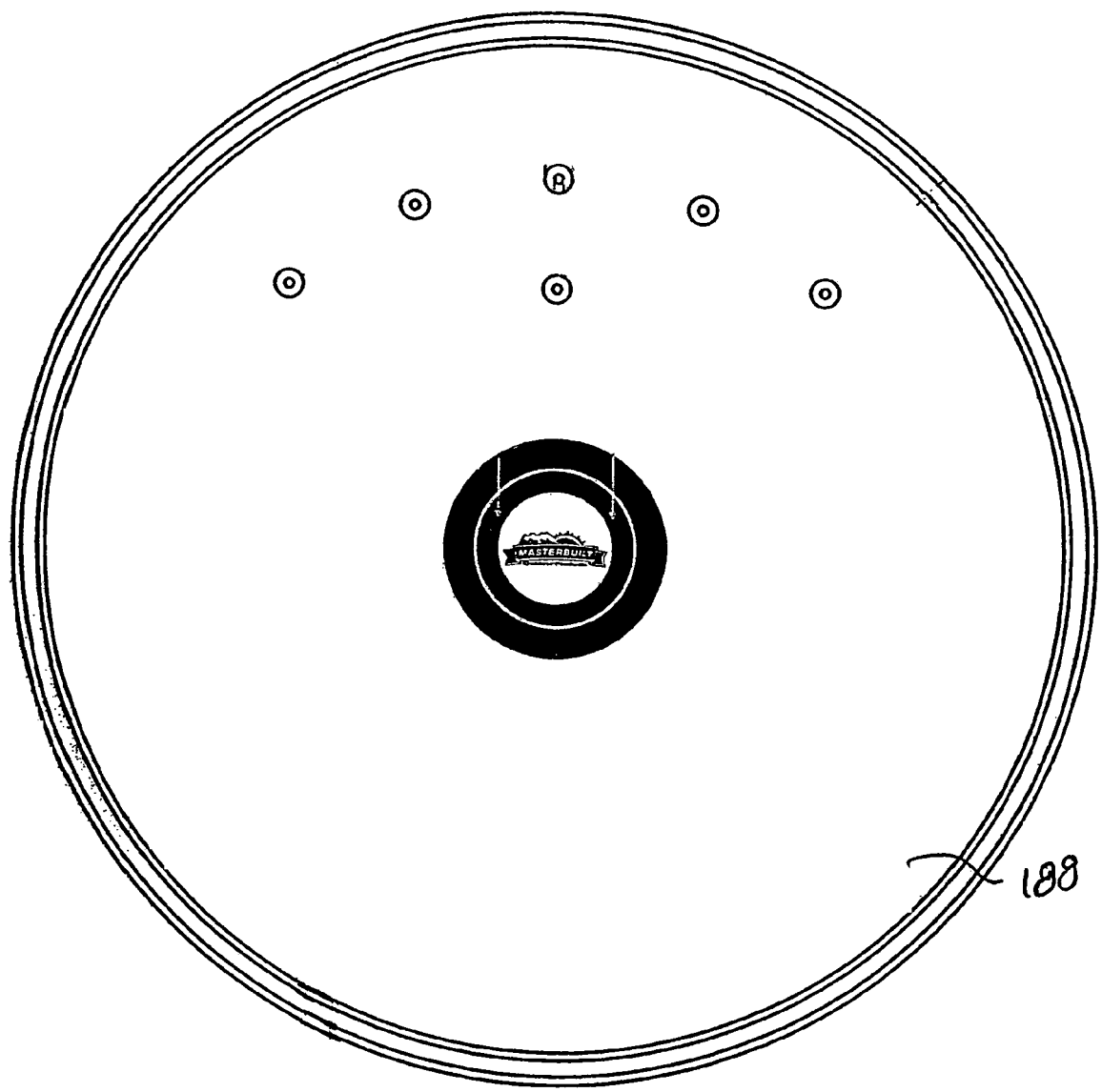
FIG. 9 shows a top plan view of the cooker cover.

As seen from FIG. 1 and the bottom view of the shell in FIG. 8, feet or lift-off means (e.g., individual feet or one or more continuous annular ring members) 32 are fixed to (or integral with) base 26 of the shell and extend downward for contact with the support below such as a table or countertop. Preferably, there are provided a plurality of spaced apart feet 32 (e.g., three with equal 120° spacing around the circumference as shown in FIG. 8 or six with 60° spacing as partially shown in FIG. 6) for preferred cylindrical shell embodiments of the invention. Feet 32 help promote air flow across the bottom surface of base 26 and spacing separation in general between the heat source (resistor and heated cooking fluid) and underlying support so as to help avoid overheating damage to the underlying support.

Figure 5A:
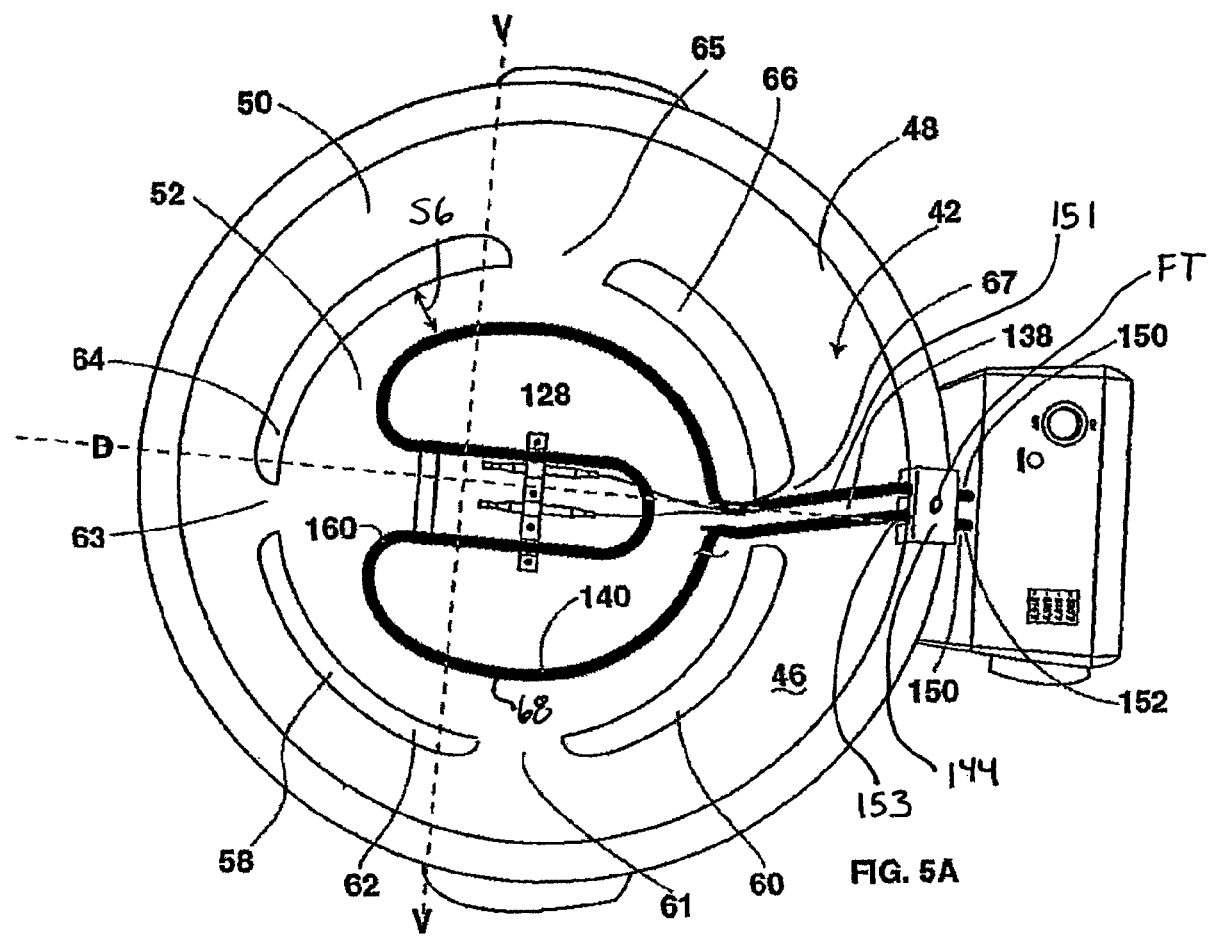
FIG. 5A illustrates a top plan view of an alternate embodiment of the cooker of the present invention with the basket and cover removed, and with the cooking pot having step-in means.
Figure 5B:
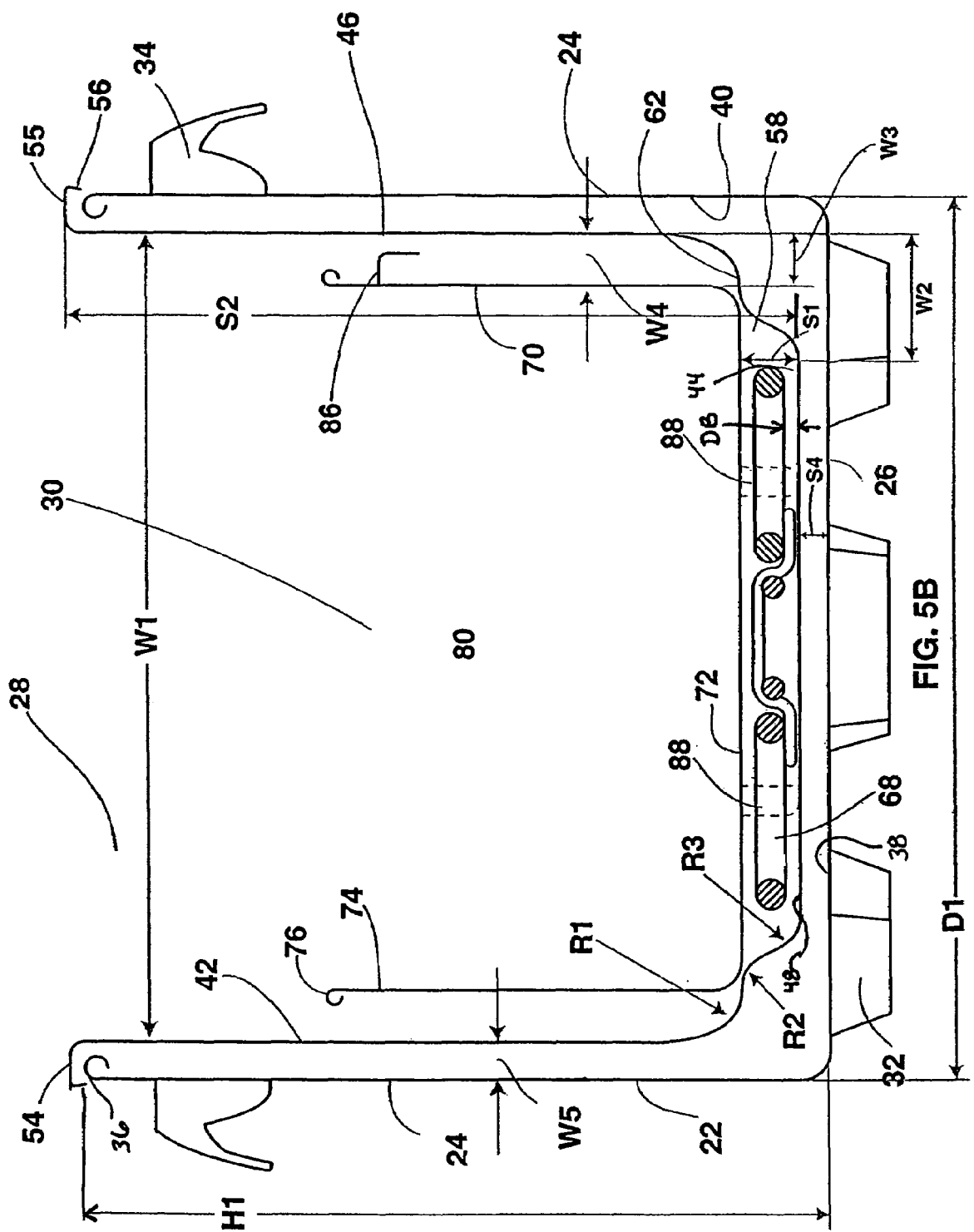
FIG. 5B shows a cross-sectional view taken along cross-sections line V-V in FIG. 5A and with the heating device removed.

Shell 22 further includes grasping handles 34 shown in the figures to be diametrically oppositely positioned within the upper 15% of the height of shell 22 and below the upper bead or edge 36 of shell 22 having notch NT formed over a small portion (e.g., less than 2 inches [5.08 cm] of the circumference). These grasping handles are useful for carrying the fully assembled cooking apparatus from one location to the next. As shown from 5B, the height H1 of the shell from the interior surface 38 of the bottom of shell 22 to upper rim or bead edge 36 and the diameter or average width D1 are sized for the below described accommodation of cooking pot 42 that is, itself, sized for handling large food items such as an 8 to 18 lb [3.62 to 8.16 Kg] turkey T as in FIGS. 10 and 11 and a corresponding amount of cooking fluid. The shell and pot are dimensioned for maintaining a lower center of gravity upon receipt of the turkey and oil which lowers the pot tipping potential (e.g., the cooking apparatus is designed to accommodate up to 30° of tilt before tipping when in a fully filled state (e.g., with a maximum turkey size in oil at the full level state)). A preferred height range H1 includes 9 to 20 inches [22.86 to 50.8 cm], more preferably 12 to 15 inches [30.48 to 38.1 cm] with 12.75 inches [32.38 cm] being well suited based on the additional preferred food sizing characteristics set out below (e.g. a maximum 14 pound [6.35 Kg] turkey recommendation). FIG. 5B further illustrates shell diameter D1 (the interior surface diameter or a maximum width value of the interior surface if other than a circular shell configuration is involved) preferably in the range of 10 to 20 inches [25.4 to 50.8 cm] or more preferably 12 to 18 inches [30.48 to 45.72 cm] with 15 inches [38.1 cm] being well suited for the present invention. These diameter or peripheral width spacing values are well designed to accommodate a container such as the corresponding cooking pot embodiment described below for cooking large single food item as in a turkey. The preferred volume presented by the interior shell wall (e.g., a preferred cylindrical shape) or walls of the shell is designed for receiving cooking pot 42 which preferably is formed either with a typical cylindrical design as shown in FIG. 1 or of a design that provides a reduced cooking fluid volume, while still being suited to accommodate large food items as in a whole turkey, which turkey, in and of itself, generally occupies a volume that will result in an increase of 35 to 65% in cooking fluid level from a pre-insertion of turkey to a post insertion of turkey (or other large single food item) state. It should be noted that any dimension provided herein is for illustrative purposes and not meant to be limiting relative to the general scope offered by the present invention.

Figure 3:
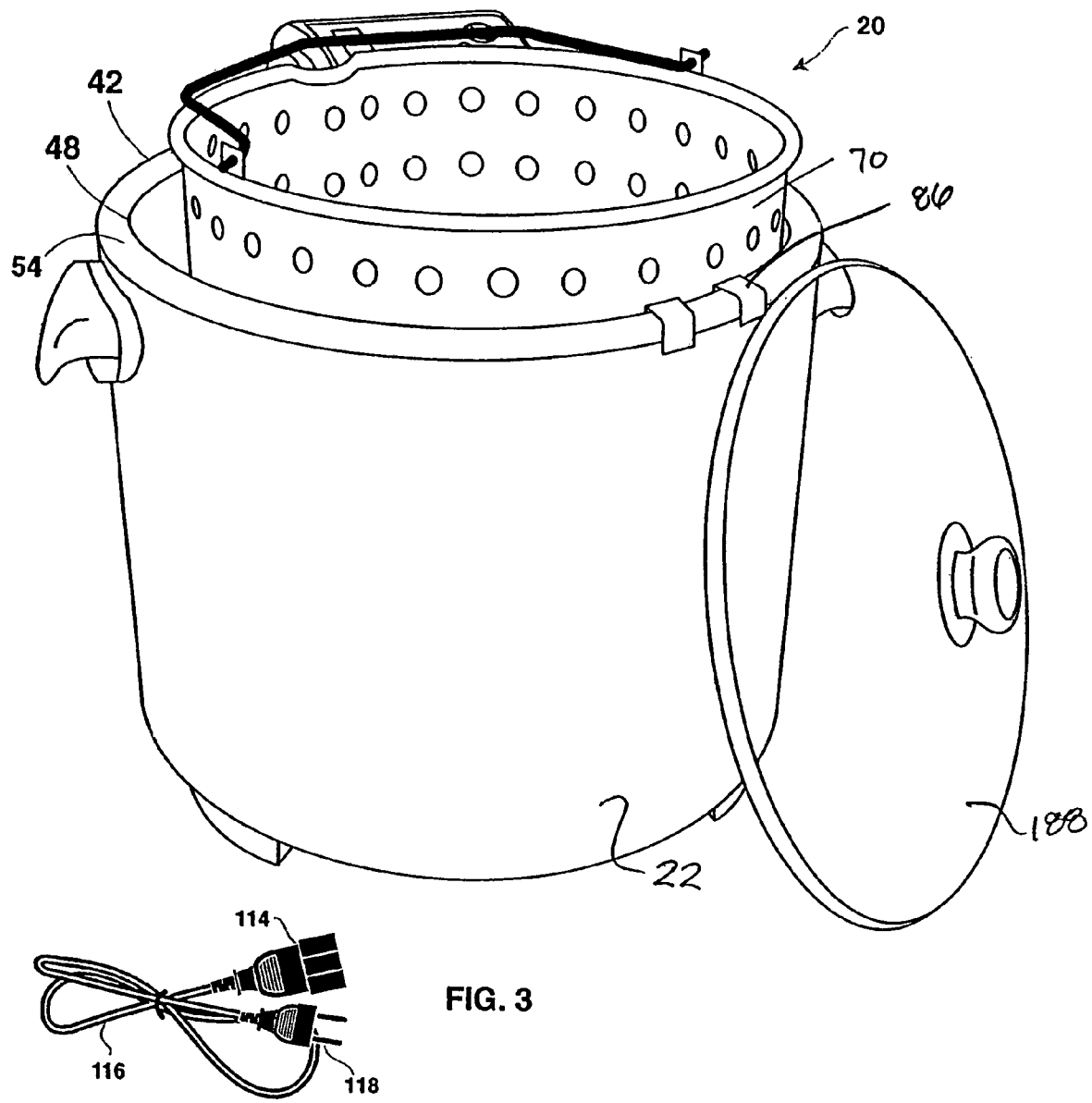
FIG. 3 shows a view of the electric cooker with the cover removed and the basket in a drain mode.

FIG. 1 illustrates cooking pot 42 designed for receipt inside cavity 30 of shell 22 and preferably being of a height that provides for some degree of overhang relative to the upper rim of the shell, as illustrated by FIGS. 3 and 5B. In the embodiment illustrated in FIG. 1, cooking pot 42 has bottom 44 (preferably flat on the inner side, but raised or depressed areas on the inner side are also featured under the present invention), side wall 46 (which term is meant to encompass, for example, a single continuous side wall as in a continuous curvature cross-section (circular or oval) or multi-sided configurations as in non-cylindrical configurations and side walls having relative width deviations going in the vertical direction) with interior surface 48 defining upper opening 50 and pot cavity 52 (FIGS. 5A and 5B).

As best seen by FIG. 5B, shell 22 has an upper edge 36 that preferably includes an upper curved or flat support section to provide a contact support region for overlying flange 54 of cooking pot 42. Flange 54 of pot 42 preferably features a first section 55 extending horizontally or more horizontally than vertical and is either planar or curved such as a planar orientation associated with a curved or planar shell upper edge of the shell. In addition, as shown in FIG. 5B, flange 54 further preferably includes a radial outer second flange section 56 that extends vertically or more vertical than the first section 55. The distance between the outer wall surface of the shell's main body, and the interior surface of the flange section is preferably designed for providing a limited radial movement potential relationship while, on the other hand, preferably avoiding a tight or difficult to separate interference fit between flange section 56 and the below supporting shell edge 36 (e.g., a radial clearance of 0 (slight contact all around) to ⅛ inch [0.32 cm] (limited radial adjustment potential)). This flange nesting relationship helps properly align cooking pot 42 within the receiving cavity presented by shell 22 (e.g., establishing an equal radial spacing between the shell and pot at different horizontal cross-sections over the height of the cooking pot as in the upper half to upper quarter of the cooking pot depending on the degree of volume reduction slope in the portions of the cooking pot as described in greater detail below). This relationship also allows for ready separation and removal of the cooking pot as when removing cooled cooking fluid or during cleaning. The radial distance of flange 54 is of, for example, 0.5 to 1.25 inches [1.27 to 3.18 cm] in radial width.

There is also preferably provided a suspension spacing S4 of, for example, 0.25 to 1.25 inches [0.64 to 3.18 cm] between the exterior bottom surface of cooking pot 42 and the facing interior bottom surface of shell 22 with a 0.5 inch [1.27 cm] spacing being well suited for purposes of the invention. In addition to being spaced in the vertical direction, the suspended cooking pot also preferably has its outer wall surface spaced from the interior side wall of shell 22 (e.g., spacing W5 of, for example 0.25 to 2.0 inches [0.64 to 5.08 cm] with 0.75 inch [1.91 cm] being preferred) which is shown of equal value for more then a majority of the cooking pot height, but can vary as explained below for the cooking fluid volume reduction embodiments and also at the bottom region where cooking pot 42 preferably includes step-in means 58.

In an alternate embodiment, (not shown) there is a direct and/or non-concentric contact bottom relationship and/or a direct and/or non-concentric contact side wall relationship. From the standpoint of, for instance, improved exterior insulation, the concentric side and bottom suspension spacing arrangements are preferred.

A preferred embodiment of the invention has a cooking pot 42 that includes a preferably integrated step-in means 58 providing for basket or food cooking item support and/or cooking fluid volume reduction means. FIGS. 5A and 5B illustrate a first embodiment of a cooking pot with an integrally formed step-in means in the form of a plurality of circumferentially spaced radially inwardly extending steps, although a continuous step-in structure is also featured. Thus, step-in means 58 is shown as having a plurality of steps extending radially in form a location coincident with the bottom of the pot and the step-in region can take on a variety of forms such as the illustrated stepped shoulders 60, 62, 64 and 66 arranged in circumferential series along the interior, bottom region within (e.g., a lower quarter) of the side wall 46 of pot 42, with non-stepped in or recessed areas 61, 63, 65 and 67 therebetween as shown in FIG. 5A. Recessed areas 61, 63, 65, and 67 provide for improved cooking fluid circulation between the area immediately above interior bottom surface 48 of pot 42 and along the portion of inner surface 48 of pot side wall 46 positioned above step-in means 58. Recess 67 does the same and provides access means for heater resistance element 134. As shown in FIG. 5B, the stepped shoulders of step-in means 58 are preferably designed to facilitate their being formed integrally (e.g., as a process step or component in a pot stamping or shaping process) with, for example, a concave-convex-concave curved bottom cooking pot 42 sequence represented by radius lines R1, R2 and R3 respectively, or in a less preferred embodiment, suspension inserts (e.g., welded pads) are provided on the shell and/or cooking pot.

In addition to the preferred shell feet and cooking pot suspension (upper flange/bead overlap), there is also preferably provided by way of step support 58 in the cooking pot, a suspension spacing S1 between the below described basket or food support means 70 and the interior, bottom surface 48 of the cooking pot. Spacing S1 is designed to avoid direct contact between the below described basket or alternate food support means (e.g., a through or into turkey skewer with bottom platform or spoke arrangement that is sized for contact along suspension means 58) and heating element 68 and/or to provide for cooking fluid circulation between the direct support food holder and the cooking pot surface 48. When considering the relatively high weights involved in food items such as a turkey, the upper flange 54 of cooking pot with flange and bead 36 of shell are designed to be of sufficient strength to support the cooking fluid and food item(s) and food support means as in a basket received within the pot (with step support 58 providing backup or additional support in the embodiment shown).

There is also preferably provided a means for spacing the food support means in a spacing relationship with the heating element 68 shown in FIG. 5B. FIG. 5B further shows such spacing means to include the above noted pot step-ins or stepped shoulders 58, although other arrangements such as the below described combination heat resistance bar retentioner and basket support means suspension platform 316 (FIG. 21A) and/or basket feet 88 can be utilized. Additionally, a combination of two or more of these spacing means can be relied upon as in the suspension platform 316 shown in FIG. 21A in combination with stepped shoulders 60-66 with the platform and shoulders preferably presenting a common support level. The spacing means thus provides for the avoidance of food support means direct contact with a heating source positioned between the food support means (e.g., basket) 70 and the bottom of the cooking pot 44. Also while stepped shoulders such as 62 are shown to be greater in circumference than the intermediate recesses such as 63, this size relationship can be altered with the recesses being circumferentially longer than the steps or equal thereto. From the standpoint of avoiding high cooking fluid volume usage, having the stepped shoulders 62 of longer circumferential length than that of the intermediate recesses (e.g., a 2:1 to 8:1 ratio) is preferred. The recessed side walls are preferably made smoothly contouring to facilitate the pot forming process and can include divergent or convergent orientations to promote fluid channeling. While an integrated and contemporaneously "formed with pot" suspension means is preferred, as noted above, alternate suspension means such as members welded or otherwise fastened to the pot are featured under the present invention, including items that extend through the pot wall before extension into supporting contact relative to the underside or side of the to be positioned basket 70. An example of below positioned spacers can be seen in spacing elements 88 (shown in dashed lines in FIG. 5B) which can be integral with the food support means 70 or represent upstanding projections fixed to the bottom of the cooking pot 42.

In a preferred embodiment, spacing S1 between the cooking pot bottom and the bottom of the food support means and/or support contact surface of the step-in 58 preferably ranges from 0.25 to 2 inches [0.64 to 5.08 cm], more preferably about 0.5 to 1.5 inches [1.27 to 3.81 cm], with 1 inch [2.54 cm] being a representative value of a preferred embodiment. The overall height S2 (FIG. 5B) and width W1 (e.g., the interior diameter above the step-in) of pot 42 is designed to accommodate maximum vertical heights and horizontal dimensions of large food items such as a turkey as well as the typically utilized thin layer of cooking fluid that covers a submerged food item(s) and preferably an additional clearance area that is sufficiently high enough up from the cooking fluid upper layer to help ensure retention of bubbling cooking fluid subjected to a maximum temperature generated by heating element 68 (e.g., a maximum heater control setting of 400° F.) below the cooking pot upper edge 54. A preferred height range for height S2 is one that is less than H1 to provide the spacing S4 as in 8.5 to 19.5 inches [21.59 to 49.53 cm], more preferably 11 to 15 inches [27.94 to 38.1 cm] with 12.25 [31.12 cm] being illustrative of a preferred embodiment height. A percentage ratio for S2 to H1 is preferably 88 to 98%, more preferably 90 to 96% with 96% being an illustrative percentage for a preferred embodiment. The difference between the preferably longer H1 and the preferably lower value S2 is essentially equal to the suspension value S4 when considering that the upper end of the cooking pot has its flange in contact support with the rim of the cooking pot and its thickness is typically somewhat minimal when considering the overall height of the cooking pot.

The interior width or diameter W1 for the side wall portion of cooking pot 42 above suspension means or step-in region 58 shown in FIG. 5B and preferably ranges from 9 to 18 inches [22.86 to 45.72 cm], with 12 to 16 [30.48 to 40.64 cm] inches being more preferred and 13.75 inches [34.93 cm] being illustrative of a preferred embodiment value. A preferred embodiment features a cylindrical configuration, with diameter W1 (for non-cylindrical shapes, W1 is the average width for the side wall 46 above the step-in region). The maximum diameter of the cooking pot is represented by WI plus two times the flange 54 width (e.g., 15.375 inches [39.05 cm] with an 0.8125 inch [2.1 cm] flange and a 13.75 inches [34.93 cm] W1 value). W2 illustrates the width between the interior surface of pot 42, above any step-in region, and the interior edge of the step-in means 58 such that W2 is representative of the degree of step-in for the illustrated stepped shoulders of step-in means 58. This step-in distance between the two noted locations represented by W2 is preferably 1 to 4 inches [2.54 to 10.16 cm], more preferably 2 to 3 inches [5.08 to 7.62 cm] with 2.25 [5.72 cm] inches being illustrative of a preferred embodiment.

Width W3 (FIG. 5B) illustrates the width between the outermost step contact point of basket 70 (described below—and while in a concentric cooking position and with the drawing showing a slight spacing for drafting clarity as to basket and pot structure) and the outermost edge of a stepped shoulder of step-in means 58 which coincides in the illustrated embodiment with the cylindrical interior surface of the upper portion of pot 42 shown in FIG. 5B. The interior contact point of W3 is preferably located in an intermediate region of W2 such as at a 25% to 75% distance out from the outer edge of pot bottom surface 48 coinciding with the interior edge of the step-in region. The overall volume of the cooking pot is preferably 25 to 35 quarts [23.67 to 33.12 liter], more preferably 25 to 29 [23.67 to 27.44 liter] with 28 or 29 [26.50 to 27.44 liter] being illustrative of a preferred embodiment.

While the arrangement shown in FIG. 5B is, to some degree, a low volume embodiment (e.g., with the assistance of the step-in means 58), the present invention also features alternate lower volume reduction embodiments such as those described below and illustrated in FIGS. 6, 6A, 6B, 6C to 7. For example, the bottom step-in means 58 shown in FIG. 5B provides, for example, for a reduction from what would normally be a 30 quart [28.39 liter] pot to a 29 quart [27.44 liter] pot (e.g., a reduction of for example 0.5 to 3 quarts [0.47 to 2.84 liter] via a bottom step-in). The aforementioned double step-in cooking pot of FIG. 6, for example, having an upper step-in means and a bottom step-in means (the phrase "step-in means" being inclusive of a continuous circumferential shoulder or an interrupted continuous shoulder or a plurality of individual step-in shoulders) step-in means like 58 can provide for even greater cooking fluid volume reduction and provides a reduction in the overall volume of the cooking pot from 30 quarts [26.50 liter] down to 28 quarts [28.40 liter], for example, (e.g., a reduction of for example 1.0 to 4 quarts [0.95 to 3.79 liter] via a bottom step-in and an upper step-in), with the upper and lower step-ins preferably being below or essentially at the maximum fill line and below the upper level reached when the food insert is inserted.

An additional embodiment of the present invention features projections (e.g., basket legs) 88 (shown in dashed lines) such that the step-in's are optional relative to achieving basket or food support means 70 suspension, but can still be relied upon for volume reduction. As an alternative to legs 88 (designed to make contact with the pot thus rendering optional step-in basket suspension means 58), intermediate sized (in the vertical sense) bottom legs can be utilized such as bumps formed in the bottom of the basket for underlying support contact outside of the cooking pot with reliance still placed on shoulder support for suspension above the resistance heater. As shown in FIG. 5B, optional basket legs 88 are designed to suspend the bottom of basket 70 above means for heating 68 and are arranged in a position which avoids contact with the heating means over the full range of possible radial movement between the basket and the pot (e.g., until either the basket outer wall or capture hook 86 contacts the interior of the pot).

W4 illustrates a spacing between the outer surface of basket 70 and the inner surface of pot 42 (average if varying as in other than a cylindrical shape) and with the basket 70 preferably being in a concentric arrangement inside the pot. Suitable values for W4 include 0.5 to 2.0 inches [1.27 to 5.08 cm], more preferably 0.75 to 1.5 inches [1.9 to 3.8 cm], with 0.875 inches [2.2 cm] being an illustrative value. FIG. 5B shows a cylindrical basket of non-varying diameter height (W3=W4). Width W5 illustrates the spacing (average if varying) between the interior surface of shell 22 and the exterior surface of cooking pot 42 above step-in 58. Suitable values for W5 include 0.25 to 1.75 inches [0.64 to 4.4 cm], more preferably 0.5 to 1.25 inches [1.3 to 3.2 cm], with 0.625 inches [1.6 cm] being as illustrative value.

Figure 12:
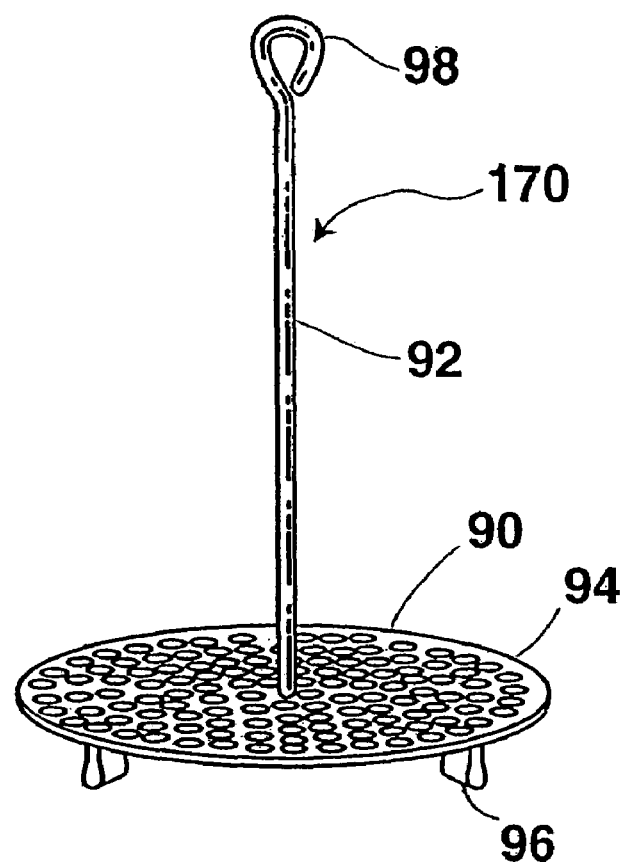
FIG. 12 shows a first alternate embodiment of a food support means.
Figure 13:
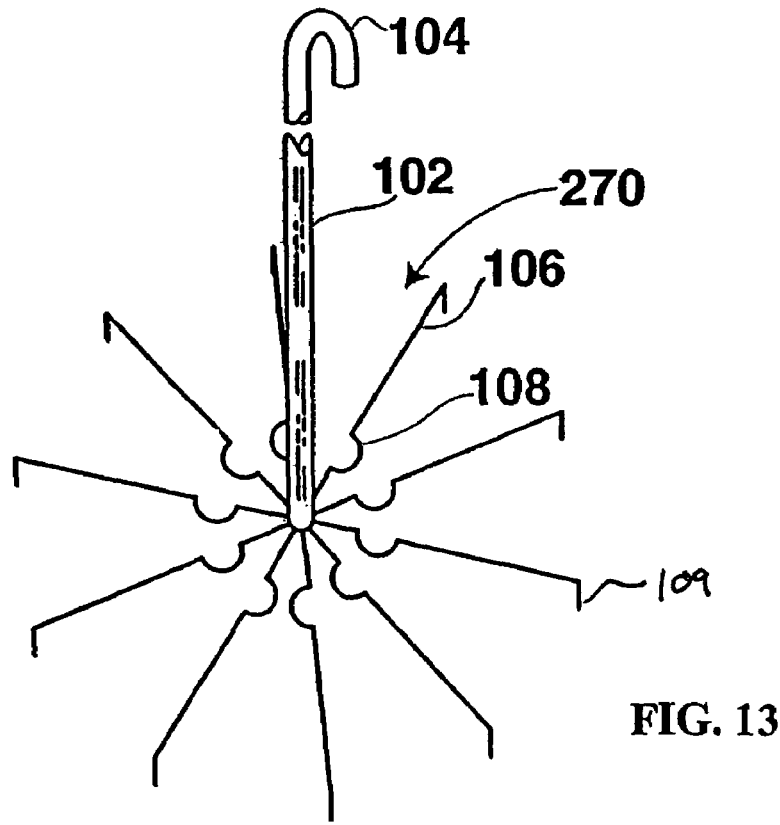
FIG. 13 shows a second alternative embodiment of a food support means.
Figure 14:
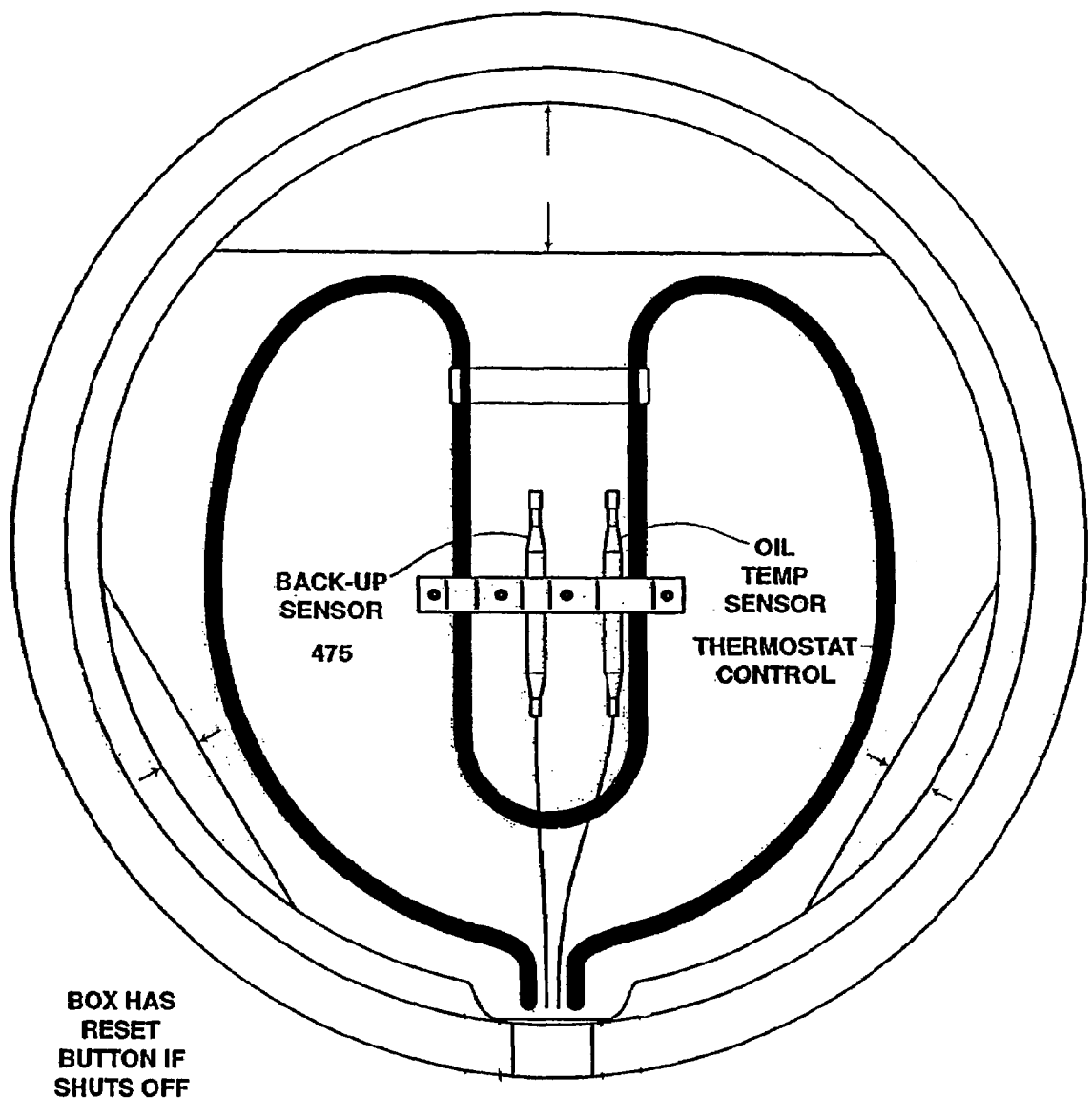
FIG. 14 shows an additional embodiment of the present invention with an alternate low cooking fluid volume cooking pot.

Food support means 70 is shown in FIG. 1 as a basket (FIGS. 12 and 13 illustrate alternate food support means 170 and 270, respectively as described below). As shown in FIG. 1, basket 70 comprises bottom 72, side wall 74 and upper edge 76 defining food reception opening 78 leading to food reception cavity 80. Side wall 74 is preferably provided throughout with side wall apertures 82 (with 3 to 6 vertically spaced circumferentially extending rows of apertures preferred). As the illustrated basket is designed to provide for deep frying heavy objects such as a turkey (including the added weight associated with post cooking absorption of cooking oil) it is preferably formed of unitary metal structure with apertures formed therein and preferably not of low load wire or metal rod screen or mesh arrangements such as in conventional indoor deep fat fryers, although with suitable strength wires the use of mesh is possible under the present invention. Because of the heavy load possibility the basket is formed of relatively thick aluminum (e.g., at least 1.0 mm thick) material. To maintain sufficient strength there is a greater percentage of solid surface than open surface in the areas where apertures are provided. For example, 0.3 to 0.7 inch [0.8 to 1.8 cm] diameter holes with 0.7 to 1.5 inch [1.8 to 3.8 cm] minimum spacing between holes. A series of 0.5 inch [1.3 cm] holes with 0.9 inch [2.3 cm] minimum spacing covering all surfaces of the basket provides a good high strength/drain-steam arrangement. In this regard reference is made to U.S. Pat. No. 6,711,992 which patent is incorporated herein by reference.

The basket has a side wall that is of sufficient height to adequately retain a large turkey in position (preferably vertical orientation) within the basket despite the turbulent effects of deep fat frying. For example, a height ratio range of 2:8 to 5:8 relative to the cooking pot. A basket height as indicated is also well suited for steaming typical quantities of seafood such as clams and mussels. A basket height (main body) of about 7 to 10 inches [17.78 to 25.4 cm] is illustrative. Bottom apertures 84 are additionally provided and are preferably sized and circumferentially serially spaced similar to those in the side wall FIG. 12 illustrates an alternate embodiment of a food support means 170 having a turkey or large food item contact plate 90 having a diameter similar to the bottom of basket 70 so as to rest on the pot's basket step-in means 58 when inserted into pot 42. Food support means 170 includes a turkey or food item skewer pole 92 extending up from plate 90, with plate 90 also including a plurality of apertures 94. Feet 96 extend down from plate 90 and are preferably of the intermediate length described above which are suspended above the bottom of pot 42 when plate 90 is resting on support or suspension means 58, but which provide for suspension of plate 90 following removal and placement on an external support surface such as a countertop, cooling container or plate (not shown) with the suspension and apertured plate providing for cooling and controlled dripping into a suitable cooling container or plate or absorbent sheet. Skewer pole 92 features grasping loop 98 which is positioned above the turkey held on the skewer pole and thus provides a grasping location for a grasp handle (see FIG. 10 for an illustration of grasping handle 100 being used as a bailing handle grasping means for basket 70 removal).

FIG. 13 illustrates an alternate food support means 270 having a skewer pole 102 with grasping end 104 and spokes 106 having a radial extension suitable for suspending support means on suspension means 58 of pot 42. Spokes 106 are shown to include optional intermediate bump sections 108 which help in suspending the food item to some degree off an underlying post cooking cooling surface (not shown) in the suspension means 58. Suitable indents 109 for the radial ends of the spikes are also preferably provided to properly position the intermediate bump members (which extend down more than the spikes) away from the resistance bar in the event they extend down sufficiently. Various other embodiments of food support means are also featured under the present invention which preferably are able to accommodate a large food item such as a turkey and retain the food item suspended in the cooking pot either based on coordination in configuration with suspension means associated with the cooking pot and not the food support means s(e.g., a heater bar support bracket and/or pot step-in) and/or are self suspension supporting (e.g., legs) either for outside of the cooking pot or both in and out of the cooking pot.

In a preferred embodiment the height of basket 70 is at least 25% of the total height of cooking pot 42 and more preferably falls with a range of ⅜ to ⅞ of the cooking pot. As shown in FIG. 3, capture device 86 (e.g., a capture hook formed with two circumferentially spaced hook prongs) is positioned heightwise on the basket to provide some drainage clearance when the pot and basket are lifted out of contact with the cooking fluid which during cooking covers over the turkey. As seen from FIG. 10, the dripping fluid returns close (some absorption involved) to a turkey pre-insertion height level (e.g., a volume of about 10 liters of cooking fluid suitable for a turkey of about 12 to 14 pounds in weight).

Figure 15:
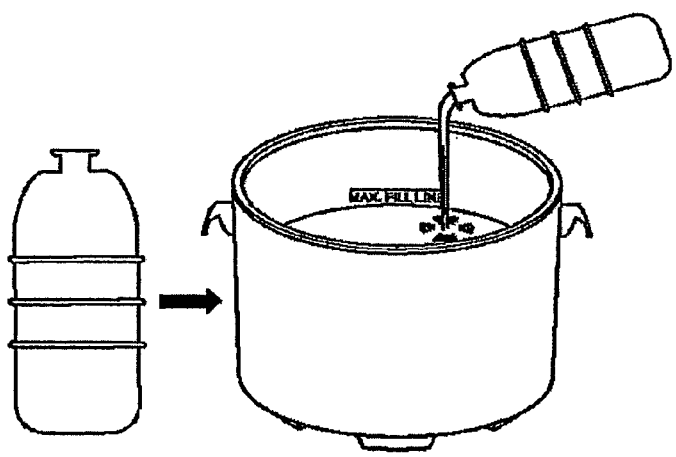
FIG. 15 shows a view of the cooking pot being filled with cooking fluid to a level between the max/min fill range.
Figure 10:
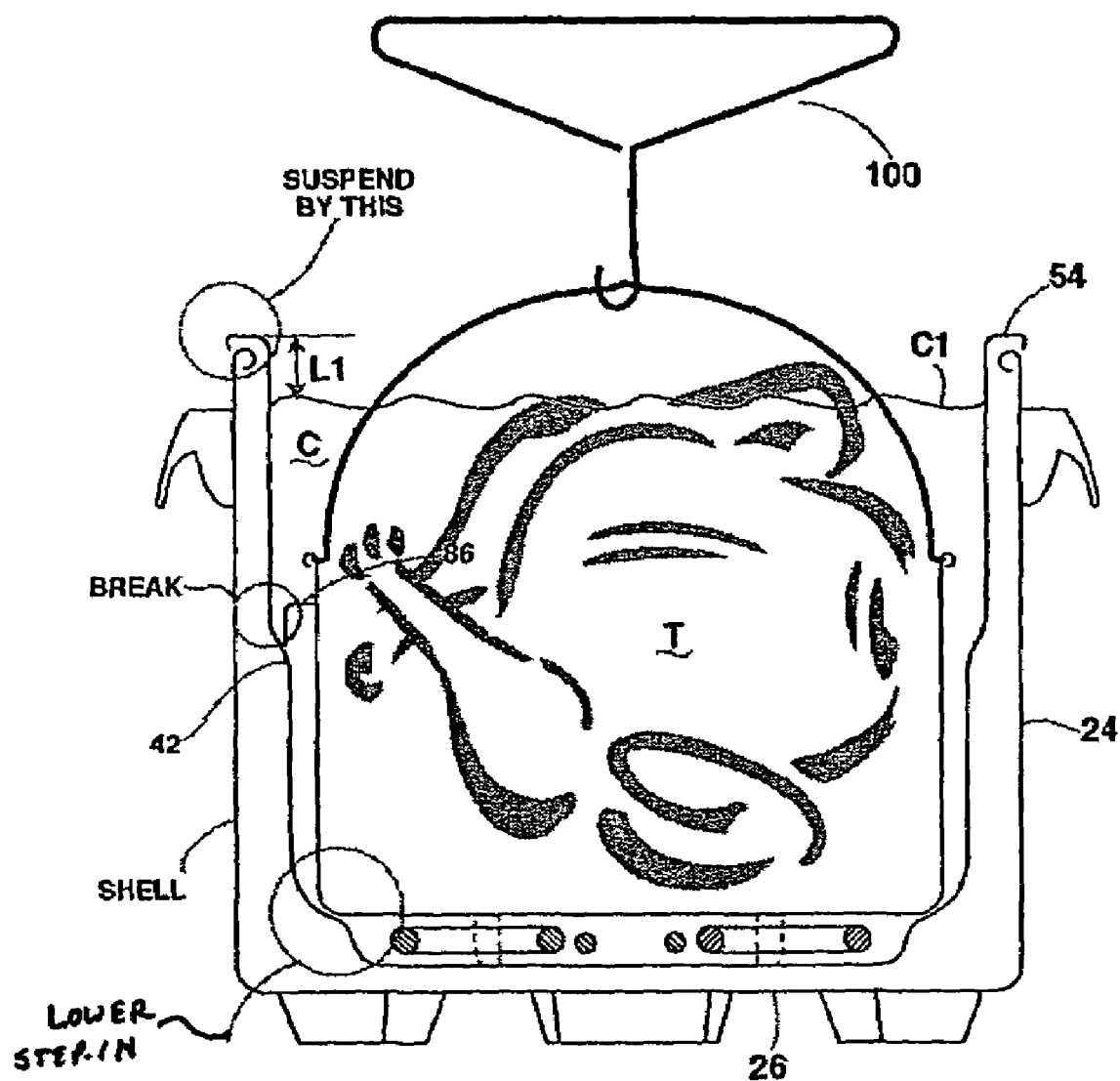
FIG. 10 shows a cross-section view similar to FIG. 7, but with turkey positioned in the cooking pot prior to lid closure.

When capture hook 86 is positioned on the upper flange or bead edge 54 of cooking pot 42 it is placed into drainage mode with the under surface of basket 70 spaced sufficiently off the remaining cooking fluid surface level as to provide for drainage of cooking fluid from the suspended basket (an initially submerged arrangement is also possible, particularly with a pot having drainage means as in the below described drain spigot although as the cooking fluid cool down period is often longer than the food drain and cool sate, the former arrangement is preferred). FIG. 10 illustrates a cooking mode with turkey T submerged under upper surface level C1 of cooking fluid C and level C1 being a distance L1 below the upper contact surface 54 of the cooking pot in a cooking mode state with the upper end of turkey T submerged or sufficiently close to level C1 to provide sufficient cooking heat temperature. Suitable values for L1 include 3 to 6 inches [7.6 to 15.2 cm] with 3.75 inches [9.5 cm] being well suited under the present invention or 20 to 50% of the overall height of pot 42 with 25% being a suitable percentage. Distance L2, represents the height from the upper edge of cooking pot 42 to level C2 of the cooking fluid when the basket and turkey are suspended above C2. C2 is preferably 5 to 10 inches [12.7 to 25.4 cm] with 6.75 inches [17.1 cm] being well suited for uses of the present invention, and with 45 to 65% of the overall height being highly preferred and with 55% being preferred. This level C2 is roughly equivalent (e.g. within an inch or two [2.54 or 5.08 cm]) to the fluid fill line shown in FIG. 15 (e.g., a 10 quart line although there will be a minimal amount of cooking fluid volume loss due to cooking and food absorption). In a preferred embodiment, with a 12.25 inch [31.1 cm] high cooking pot, there is featured a 10 quart [9.46 liter] fill line at about a 5.5 inch [13.9 cm] height from the bottom of the pot and about 3 inch [7.6 cm] anticipated clearance for cooking fluid level post turkey insertion leaving about 3.75 inch [9.5 cm] clearance above the post insertion fluid level to accommodate, for example, foam ups, etc.

Figure 11:
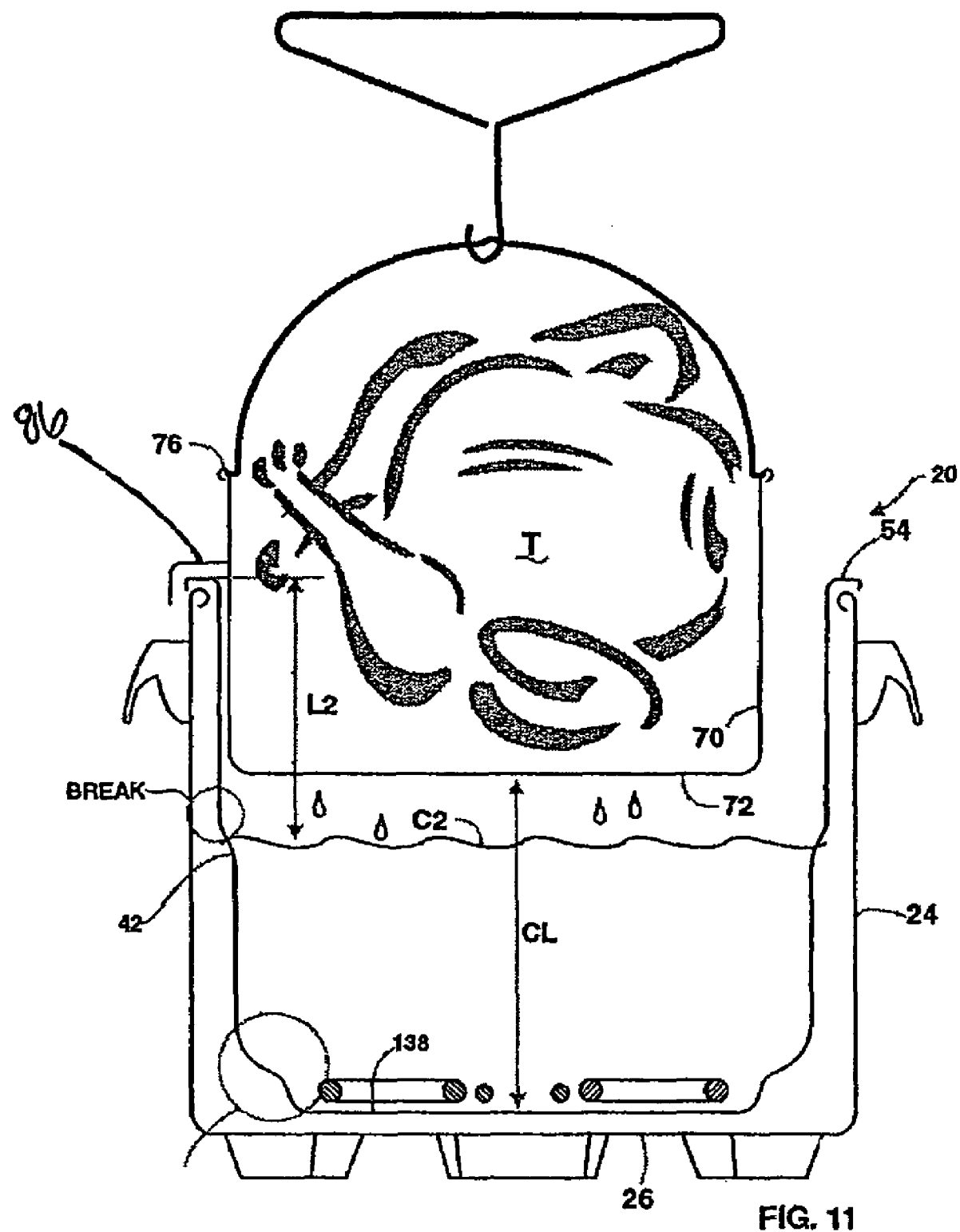
FIG. 11 shows a cross-sectional view with the basket in a drain position after cooking the turkey.

The clearance space between the bottom of suspended basket 70 and the bottom surface 48 of cooking pot 42 is shown in FIG. 11 as clearance distance CL and is controlled by the relative position of capture device 86 which is (the contact portion) preferably about 0 (essentially at) to 4 inches [10.16 cm] from upper edge 76 of basket 70 or more preferably 1 to 3 inches [2.54 to 7.62 cm] down from upper edge 76 or within an intermediate range of 0 to 45% of the full height of basket 70 with 0 representing the upper edge.

An additional feature of basket 70 includes clearance recess or groove CR (FIGS. 1 and 24E) which runs vertically along the side wall of basket 70 between the basket's upper edge and a lower end of the basket (preferably defined by a rectangular cut out CO as shown in FIG. 1 which facilitates the concave protrusion's radially inward extension and preferably extends to the bottom of the basket). As explained in greater detail below, clearance recess CR is dimensioned to avoid direct contact between the basket and a vertical component 138 of heating element 68 (FIG. 5A) when the basket is properly oriented such that the recess CR is aligned with the heater portion 138 which is also at a location aligned with notch NT in shell 22. Recess CR is also preferably circumferentially spaced by 90° from the contact ends of bailing handle BH with basket 70, and 180° from the capture hook. FIGS. 24E and 24F provide an additional view of the basket's heater bar reception recess or indent CR. As seen on the circumferential ends of the indent, radial depth of the radial indent and vertical length of the recess CR are designed to accommodate the vertical section of the heater bar in a manner which preferably avoids direct contact but avoids wastage of basket volume. Thus, a less than 10° and more preferably about 5° circumferential range is occupied by recess CR with a preferred, generally convex cross-sectional configuration with a 1% to 10% of basket radius radial inward indent.

Figure 4D:
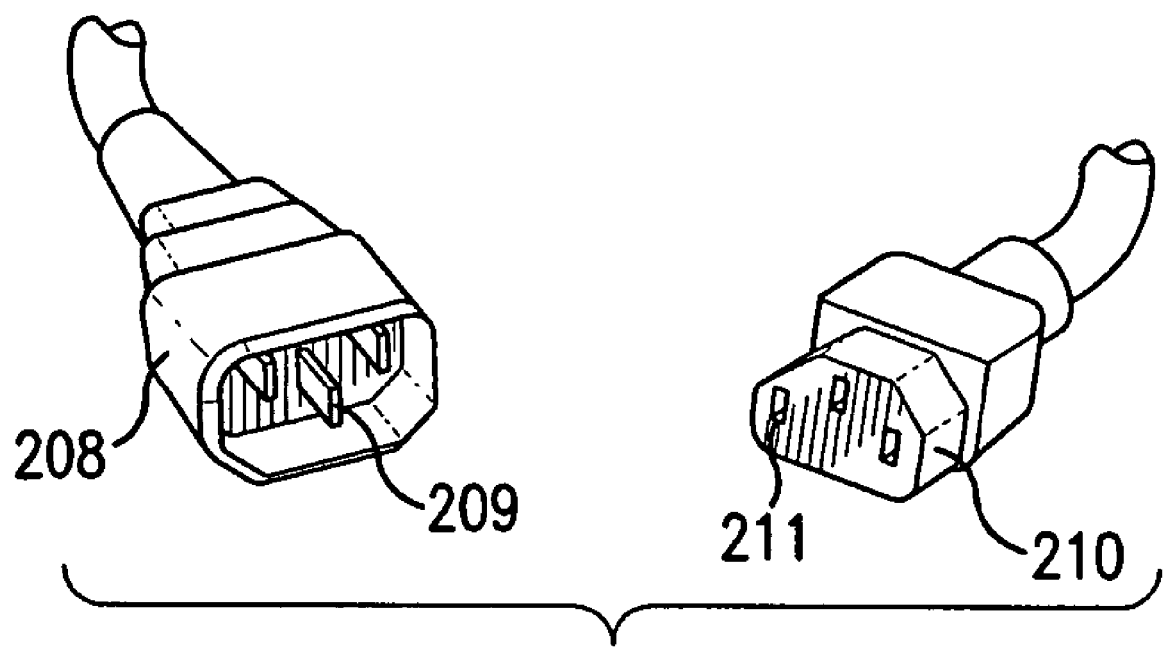
FIG. 4D illustrates a close up view of a preferred electrical connection for connecting the heater unit to a power source.

With reference to FIGS. 4A, 4B there is illustrated heater device 110 comprising heating element or heater means 68 and control unit 112. Control unit 112 is shown in FIG. 4B to include electric cord receptor 113 which receives connector 114 of electric cord 116 which has on its opposite end standard wall plug 118 (FIG. 1). Control unit 112 includes temperature information supply means 120 (e.g., an electrical LED display or mechanical printed indicia background with dial, spotter etc.), designed in conjunction with the desired temperature range to be utilized in the fryer such as a range of 0 to 400° F. or 0 to 450° F. which ranges are well suited for turkey frying and well below a flash point temperature of cooking oils to be used (e.g., peanut oil). Control unit 112 further comprises on/off switch (e.g., pressure button) 122 which has an integrated light such that when the button is placed on the light shines below the button. There is also preferably provided light 124 which turns off (from an initial on state when the on button is pressed) when a set temperature level is reached or some other signal means (e.g., flashing light and/or audible sound) which activates when the set temperature level is reached or re-reached after food insertion. Temperature setting means 128 is supported on main housing 126 of control unit 112 and is preferably in the form of a turn dial 128 or an electric temperature setting device such as direction arrow press buttons and/or number touch buttons. Although not shown, the interior of main housing 126 supports the electrical connections involved in supplying power from cord 116 to the heater element of the heating unit at the desired level to conform to the temperature set by temperature setting means 128 as well as the safety controlling means described below.

Figure 6:
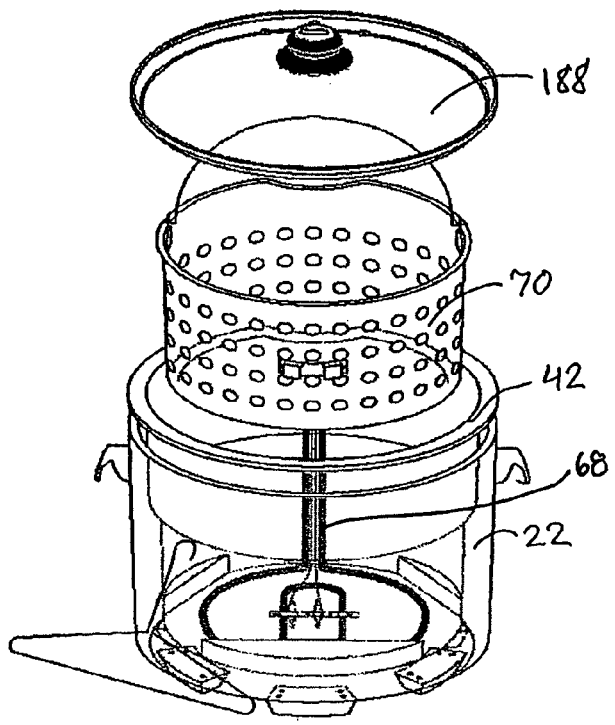
FIG. 6 shows an exploded view of the above featured embodiment of the present invention with a "double step-in" cooking fluid volume reduction cooking pot.

As can be seen from FIGS. 4A and 6, main housing 126 has radial interior surface 130 which is elongated and arranged essentially vertically, or with a common slope as the supporting outer shell. The interior surface 130 has means for engagement with shell 22 to help provide a stable relationship. In one embodiment that connection device is comprised of a pair of male projections PR1 and PR2 as in T-shaped or oppositely outward arranged C-shaped cross section projections. These projections extend outward toward the shell and are arranged for sliding connection in female reception grooves (GR1 and GR2) formed in block BL connected to the outer side of shell 22 as shown in FIG. 6C and in greater detail in FIG. 24G. Grooves GR1 and GR2 have an open top and a blocked off bottom to assist in proper height positioning. A wider open top end and diverging upper section into vertical slots is preferred as shown in FIG. 24G. Reverse female and male connection arrangements are also featured under the present invention, or alternate connection means as in magnetic fasteners or some alternate fastening means (quick release hand cams or hand release screws).

Figure 18:
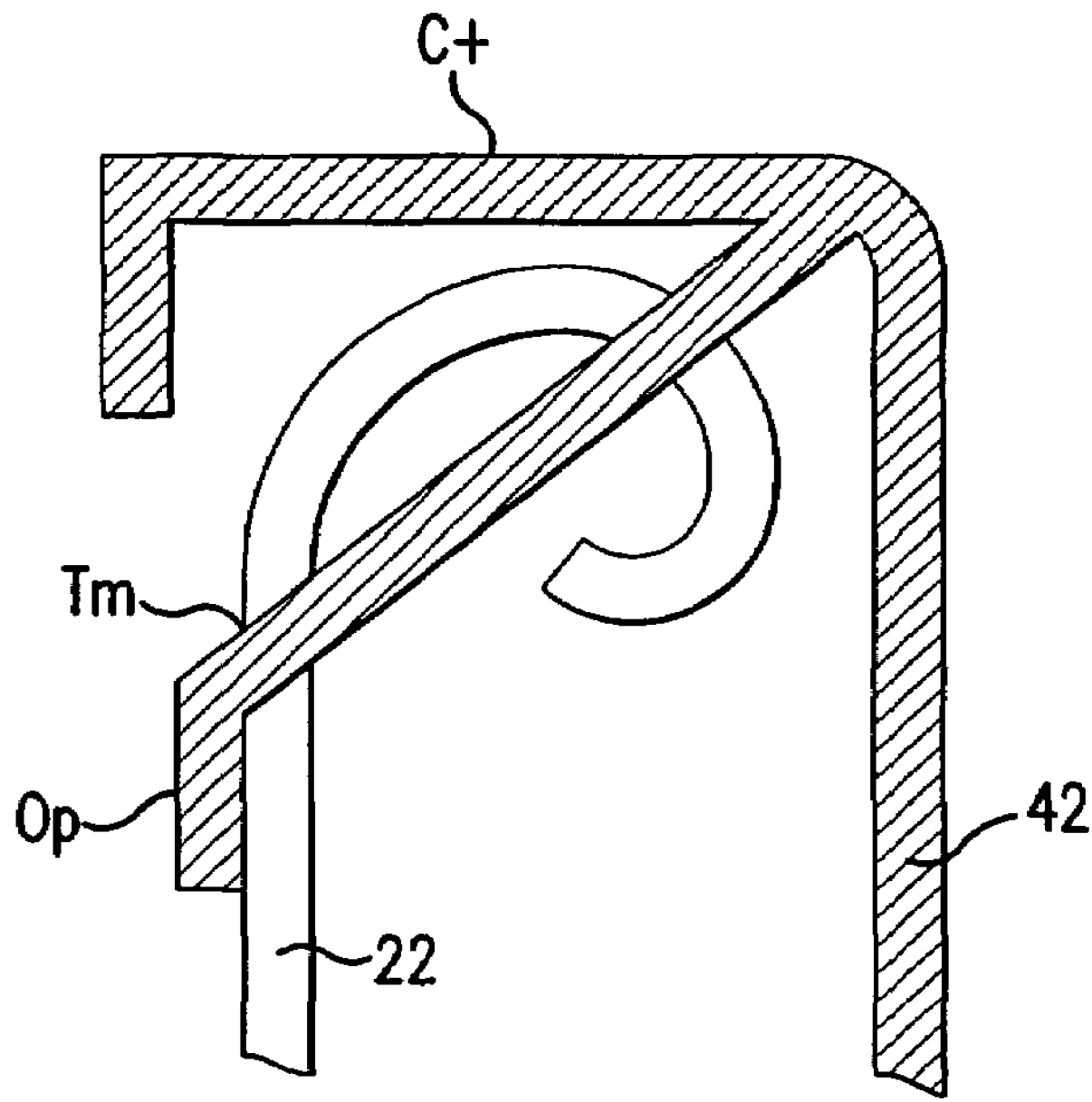
FIG. 18 shows a locking notch of shell and tab of cooking pot relationship.
Figure 19:
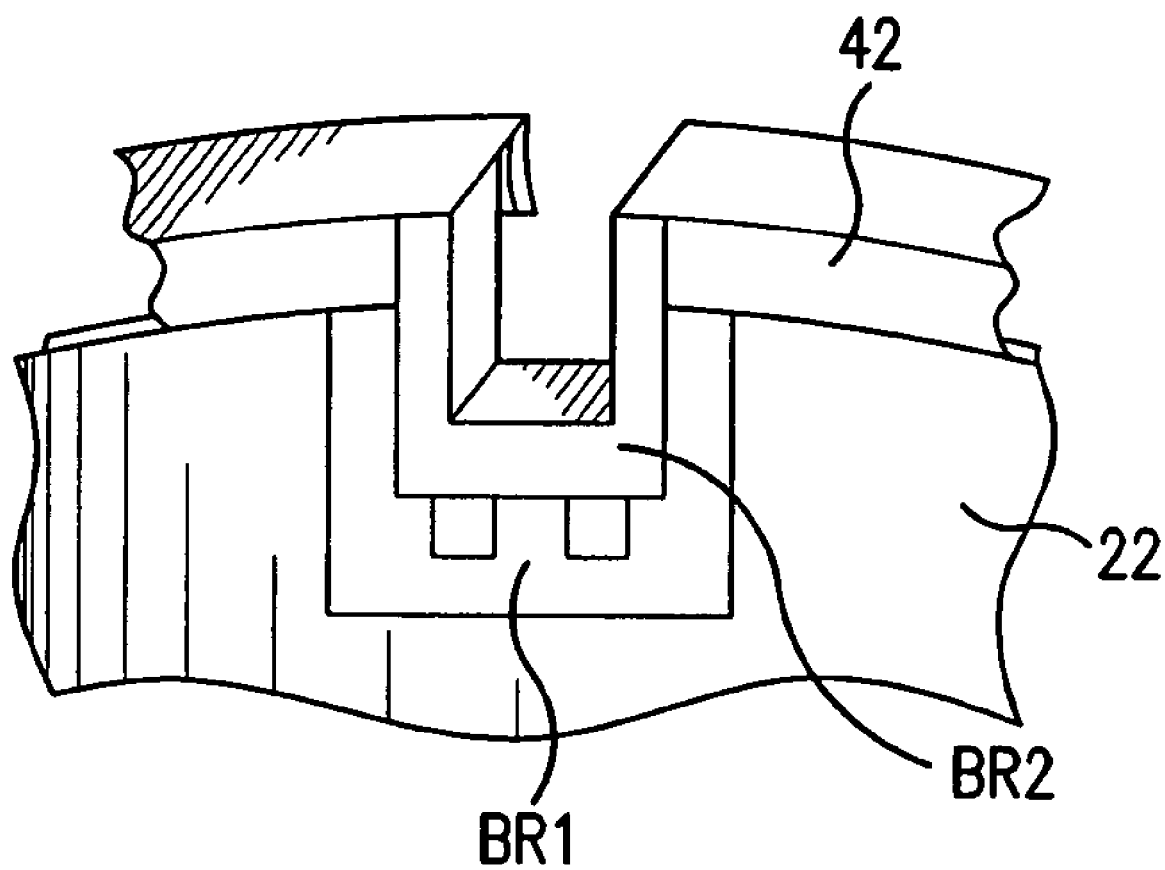
FIG. 19 shows a liner block interconnection between the shell and cooking pot as an alternate to the notch and U-shaped recess arrangement of FIG. 1.

Heater device 110 is shown to include main body mount (e.g., a mounting bracket) 132 securely fixed to housing 126 and supporting resistance element 134 of heating element 68, which in a preferred embodiment is a resistance heater bar which has two prong ends for electrical connection in the control unit's housing. Resistance element 134 is shown to include upper section 136 in a direct supporting relationship with mount 132 and is shaped to extend over and to opposite sides of upper edge or flange 54 of pot 42, preferably in horizontal fashion in its extension out from mounting bracket 132 and within a recessed region in pot 42. The illustrated bridging or mount bracket 132 is shown securing heating element 68 in a preferred generally concentric spacing relative to the interior side wall of the pot (i.e., preferably both a side wall spacing and a suspension arrangement relative to the bottom surface of the pot), and also has an upper surface which is generally commensurate or flush with the upper flanged edge of the pot such that a see-through top or lid 188 has its outer edge in a heat sealing flush relationship. Also, notch NT (FIG. 1) of shell 22 provides a clearance location for the passage of the two prongs of the shaped resistance bar extending over the upper edge of notch NT into its reception area of main housing 126 in connection with a reception region or recessed area in the cooking pot. For example, with reference to FIG. 18, when combining cooking pot 42 and shell 22 together, there can be provided a tab member Tm that is provided by way of a pair of circumferentially spaced cuts Ct (one shown) in the pots flange and a bending down to, for example, 45°, and a bending of any radially outward overextending portion Op down against the side of the shell. This arrangement is shown in FIG. 18 and helps in locking the two components together and helps in covering over a gap formed in between the shell and cooking pot. In an alternate embodiment shown in FIG. 19, the notch recess receives a connection block liner BR1 which is designed for a male/female connection with a corresponding connection block BR2 (e.g., each insulating blocks) provided by the cooking pot as in a downwardly extending block member sections (spaced apart to accommodate the upper, horizontal components of the resistance heater bar). The tab member Tm can also be formed in a non-cut arrangement by providing a depressed region in the flange of the pot that generally conforms in configuration to the shell notch for a locking relationship.

Intermediate section 138 of heater resistance element 134 extends for essentially the full length of the interior surface of cooking pot 42 but for a bottom of pot clearance spacing as shown in FIG. 5B of, for example, a spacing SB of 0.125 to 0.750 inch [0.32 to 1.90 cm] above the interior bottom surface of pot 42, which is suitable to avoid direct pot contact and provide some degree of cooking oil circulation under the heating element bottom section 140 (e.g., an intermediate position between the bottom of basket 70 and bottom interior surface of cooking pot 42). With notch NT and the cooking pot depression defined by tab Tm, there is accommodated heater element thickness spacing below the cooking pot's upper edge and the relatively thin connection bracket 132, the overall vertical length of section 138 is essentially equal to the height of pot 42 but for the clearance spacing of SB between the lower edge of the bottom heater section 140 and the bottom of the cooking pot. Heater resistance element 134 further has its bottom section 140 designed to extend in parallel fashion above the interior bottom 48 of pot 42.

Connection bracket 132 is preferably U-shaped and has an enlarged upper wall 144 which is sufficiently sized as to bridge the notch NT in shell 22 and can either be curved along its long length to correspond with the circumferential curvature of the shell or not curved since the notch is relatively small 2.0 inches [5.08 cm] or less in circumference or length. As shown if FIGS. 4A and 5A, mounting bracket 132 features a fastener reception hole for receiving fastener FT (e.g., a screw designed to connect with an underlying component of the assembly or a clamp combination with underside of an adjacent shell flange). Enlarged upper wall 144 extends into front and back three prong arm sections 146 and 148. Each three prong set defines two intermediate slots spaced apart by a middle prong in the set. As seen from FIGS. 4A and 5A, for example, heater resistance element 134 has a pair of generally horizontal leads that extend from the above noted electrical contact prongs positioned within the control housing and which are further supported by strengthening plate 133 of mounting bracket 132. Each of the resistance lead portions form one half of upper section 136 in its extension out from mounting bracket 132.

FIGS. 4A and 5A thus illustrate a first embodiment of heater resistance element 134 having an upper section 136 that features resistance element segments 150, 152 that extend into prongs (not shown) within housing 126 and into electrical communication with the interior control elements (internal controls know per se and thus also not shown for this embodiment). The interior control elements establish a desired heating level based on controlling the output from the electric outlet energy source to the illustrated resistance element 134 in accordance with the setting established by temperature control dial or temperature control setting means 128 and in conjunction with one of the temperature controls immersed in the cooking oil together with the illustrated vertical and horizontal sections (138, 140) of resistance element 134. Thus, one of segments 150, 152 is an electrical output line segment and the other an electrical input line segment for the continuous resistant heater element 134. Segments 150 and 152 are of a radial length suitable to clear the upper rim of both the cooking pot 42 and shell 22 and respectively lead into two smooth concave (opens down) interface segments 151 and 153. Concave heater element segment 151 (which is bisected by a vertical plane) extends down into a first vertical segment 154 of the pair of more vertical segments 154, 156 which together form more vertical intermediate heater section 138 that extends within basket recess CR. As noted above, segments 154 and 156 are more vertical than segments 150, 152 and they extend down from the level of the respective more horizontal segments 150 and 152 for preferably at least 90% of the overall pot 42 height. Segments 154 and 156 are also shown to extend in parallel fashion down from their upper smooth convex curve interface 151, and 153 with the inner pot ends of segments 150, 152. Any length values for the horizontal and vertical sections are defined on the basis of inclusion of any interface section that extends from an intermediate point of bending along the interface section into the section whose length is being referenced.

The lower end of intermediate section 138 (i.e., the lower ends of the vertical segments 154 and 156) interfaces with bottom section 140 by way of a double curve combination on each side with the first curved interface section in each combination including a convex (opens upward and is bisected by the same vertical plane bisecting the corresponding upper curved interface) intermediate section (155 and 157) and a second curved interface section (159 and 161) in each combination with segments 159 and 161 including a generally horizontal curved section (bisected by a horizontal plane) opening radially outward such that the immediately adjacent respective portions of the bottom section extend outward from the intermediate section to initiate a curvature that corresponds to some degree to the curvature (or peripheral extension) of the cooking pot in which the bottom section 140 is received and suspended above the cooking pot's lower surface 48.

As seen from FIGS. 4A and 5A, a preferred embodiment includes a horseshoe shaped bottom heater section 140 featuring a first side outer curved portion 158 having a curvature that preferably generally conforms (e.g., is concentric) over a majority of the side length of the heater and/or a quadrant of the cooking pot curvature as in the case of a cylindrical step-in portion or is close to concentric as in an inch or two or less of radial deviation relative to the spacing to the outer radially adjacent point on the cooking pot for the noted majority and/or quadrant of the cooking pot. When a straight line step-in Q1 is featured as in FIG. 6A, the concentric arrangement is relative to the curved area of the cooking pot above the step-in or can be made to correspond with the step-in's interior surface. Also, if other than a smooth curving cooking pot is used, the exterior of the heater bar is preferably designed to generally conform in configuration to either the bottom step-in portion or the interior wall surface of the cooking pot above the step-ins. In a preferred embodiment, first side outer curved portion 158 extends in common or generally common curvature for 50 to 100% of the 180 degrees represented by the diametric line D (FIG. 6A) extending midway between the vertical segments 154 and 156 and more preferably 70 to 95% of the same. Also the heater element "halves" 164, 166 having respective outer curved sections 158, 160 are preferably symmetrical, particularly when the cooking pot configuration is symmetrical. In a preferred embodiment the radius of curvature of each of sections 158 and 160 generally conforms to the that of the cooking pot and the spacing S6 is preferably between 1 and 3 inches [2.54 to 7.62 cm] with 1.5 or 1.75 inches [3.81 to 4.45 cm] relative to the most interior step-in edge, being well suited for use with a cooking pot having a W1 value (e.g., diameter shown in FIG. 5B) of 13.75. The suspended heater relationship can be seen in the plan view provided in FIG. 5B showing the heater resistance element 134 held in a suspended state relative to both cooking pot 42 and supporting outer shell 22. The length of the segments in a direction parallel to line D is preferably about 75 to 95% of W1 while a spacing width for the opposing parallel extending inner heater bar segments 169, 171 taken along a line extending transverse to line D is preferably about 15 to 40% of width W1, with 20 to 25% being preferred.

FIG. 4A shows heater element halves 164, 166 having inward extensions 169, 171 extending inwardly from outer most edge sections 168, 170 and generally parallel, while being spaced to opposite sides of the diametric line D as noted above. Inward extensions 169, 171 are spaced from line D (e.g., 0.75 to 2 inches 1.9 to 5.08 cm) and merge to form an integrated or monolithic heater bar at internal curve section 174. Sensor frame support 176 extends between and is connected at opposite ends to respective inward extensions 169, 171 and hold first and second sensors 178, 180 which are preferably thermistor temperature sensors with different temperature control settings and are in communication with control unit 112 via sensor lines 182, 184 that are banded to one or opposite one of the vertical heater sections (154, 156) so as to avoid dangling and potential catching of the sensor wires 184, 186.

Temperate sensors 178, 180 are preferably designed for different functions with one of the two (e.g., sensor 178) sensing temperature and in communication with a control unit sub-system (not shown) that is also in communication with the temperature setting means 128 and current temperature display means 120 such that the sensor 178 senses current oil temperature at the bottom of the pot and control unit 112 determines whether additional electric current needs to be supplied to raise the oil temperature or whether a lowering or discontinuation of current supply is warranted to avoid overheating relative to the set temperature. In addition control unit sends a signal to display means 120 to display the current sensed temperature within a preferred display ranges of for example 0 to 400° F.

The second of the two sensors is preferably a fail safe sensor which shuts down all power if a high temperature is sensed (e.g., 450° F. or 475° F.) This failsafe features is well below the ignition temperature of cooking fluids such as peanut oil (e.g., below 600° F.) FIG. 4B illustrates the outer face of main body 126 which includes a reset button RB that allows for a re-initializing of the control unit and heater elements when the temperature drops below the second sensor threshold.

Thus, in use, the cooking pot 42 is inserted into shell 22 followed by the attachment of heating means 68 such that bottom heater element section 140 is suspended above the bottom of the cooking pot 42, and control unit 112 is properly and stably supported by the combined cooking pot and shell flanges/upper bead combination preferably in conjunction with the notch NT and cooking pot recess TM as well as projections PR1 and PR2 noted above. There is then placed up to, for example, a 14 lb turkey in basket 70 as shown in FIGS. 10 and 11. Suitable cooking fluid as in cooking oil for a turkey or water for shellfish is supported up to the fill line (e.g., 10 quart [9.46 liter] amount). The control unit's temperature setting means 128 is then adjusted to a desired temperature level (e.g., 350° F. [176.7° C.] which is a setting suitable for cooking a whole turkey). For cooking a 14 lb [6.35 Kg] turkey, the following time formula is preferably used (3 min.×# of lbs of turkey) +5 min. (thus, for a 14 lb [6.35 Kg] turkey, (3×14) +5=47/min). The turkey is placed within cooking basket 70 and the basket and turkey are slowly placed in the cooking fluid with the assistance of handle 100 after the cooking fluid is displayed as having reached the set level (preferably by way of sensed temperature amount display at 120 and the turning on of a signal as in a light (DS) off and/or audible signal). The cover 188 is then placed on and the cooking time monitored. Pre-insertion while the cooking fluid is cool is also possible under the present invention with an appropriate extension of time under the above formula. The control unit of the heating device 110 can also be used in conjunction with a temperature probe that is inserted into the cooking item to monitor internal food temperature as in a plug in reception (not shown) integrated with a corded temperature probe which when a desired (e.g., preset temperature is reached) triggers a user signal (visual and/or audible) and/or initiates a shut down. Although not shown, an additional internal heat temperature set dial is also provided. The corded probe can be passed through the cooking pot tab region together with the upper resistance element sections to allow for flush lid contact.

When the signal is generated for completion of the turkey for the desired time setting (in addition to temperature sensing) a timer can be provided or use made of the cooking timer described in U.S. patent application Ser. No. 10/371,194, filed Feb. 24, 2003, now publication No. U.S. 2003-0179653 A1, and entitled Cooking Facilitator to Applicant Masterbuilt which is incorporated herein by reference.

Once the desired cooking time is reached, the cooker is turned off (e.g., unplugged) (either automatically by the control unit or manually) and the cover removed and then the basket (or alternate food supporting means) is removed with the assistance of grasping handle 100 as shown in FIG. 10. The basket is lifted sufficiently high enough for catching grasping hook 86 on the side of the combination cooking pot and shell flange/upper rim for drain off. Following a period of food oil drainage from the food product and cooling, the turkey is then removed to a suitable food preparation area.

After sufficient cooking fluid cooling off (e.g., 2 hrs for water, 5 hours for oil cooking fluid) the cooking fluid can be properly dispensed (e.g., an oil receptacle). The earlier exposed heating means 68 sensor casings and control unit housing are then preferably cleaned with a damp cloth or sponge using a mild soap. The remainder of the non-electrical components being dishwasher safe following disassembly.

Figure 6B:
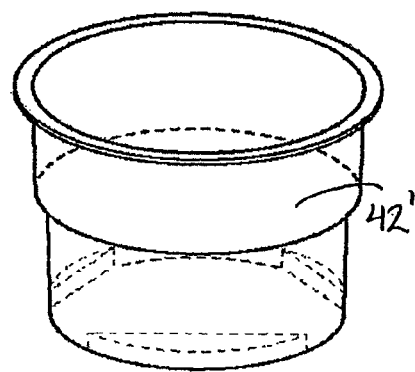
FIG. 6B shows a perspective view of "double step-in" cooking fluid volume reduction cooking pot alone.
Figure 6A:
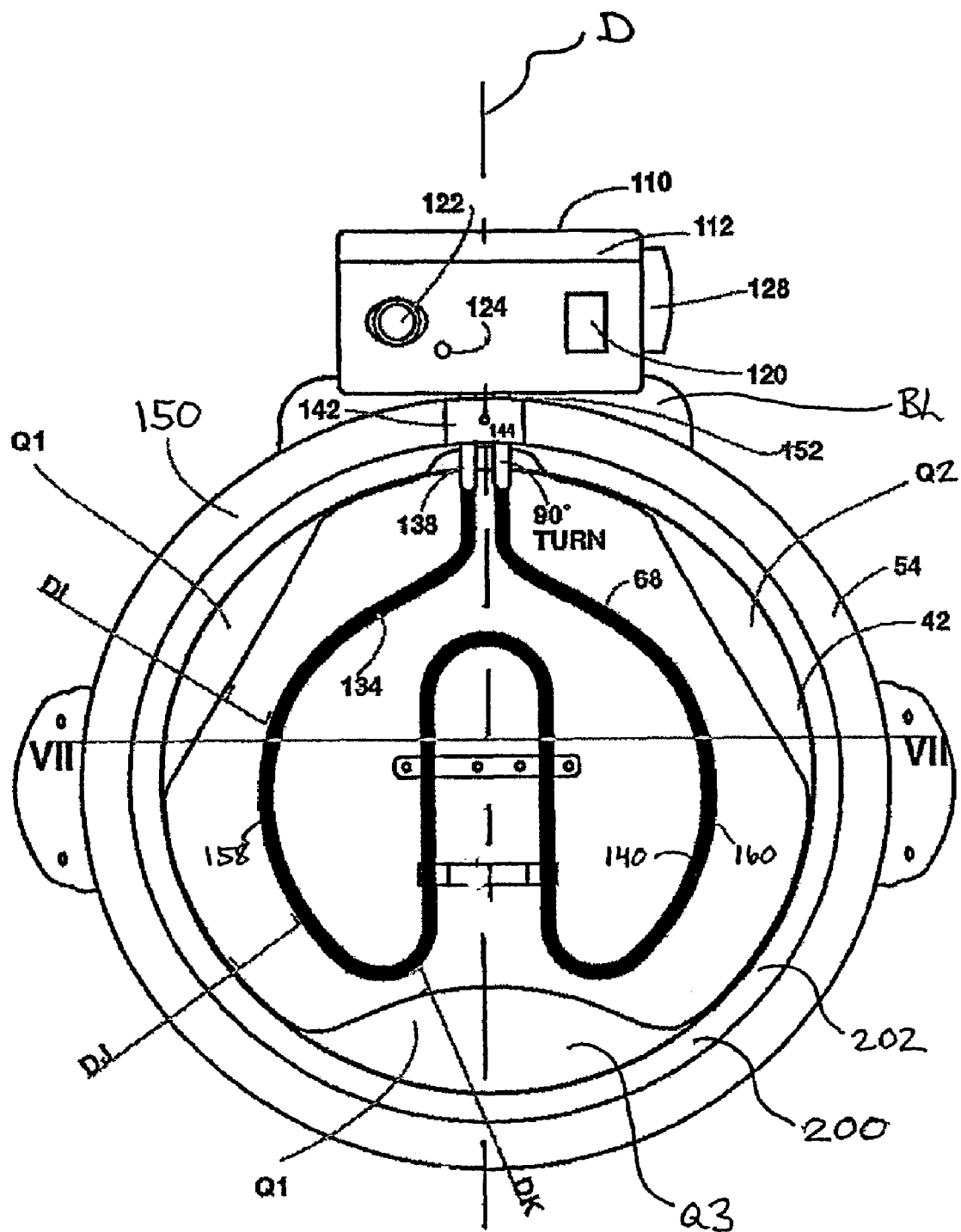
FIG. 6A shows a view similar to FIG. 5A with a preferred "double step-in" cooking fluid volume reduction cooking pot and with the temperature sensors removed.
Figure 6C:
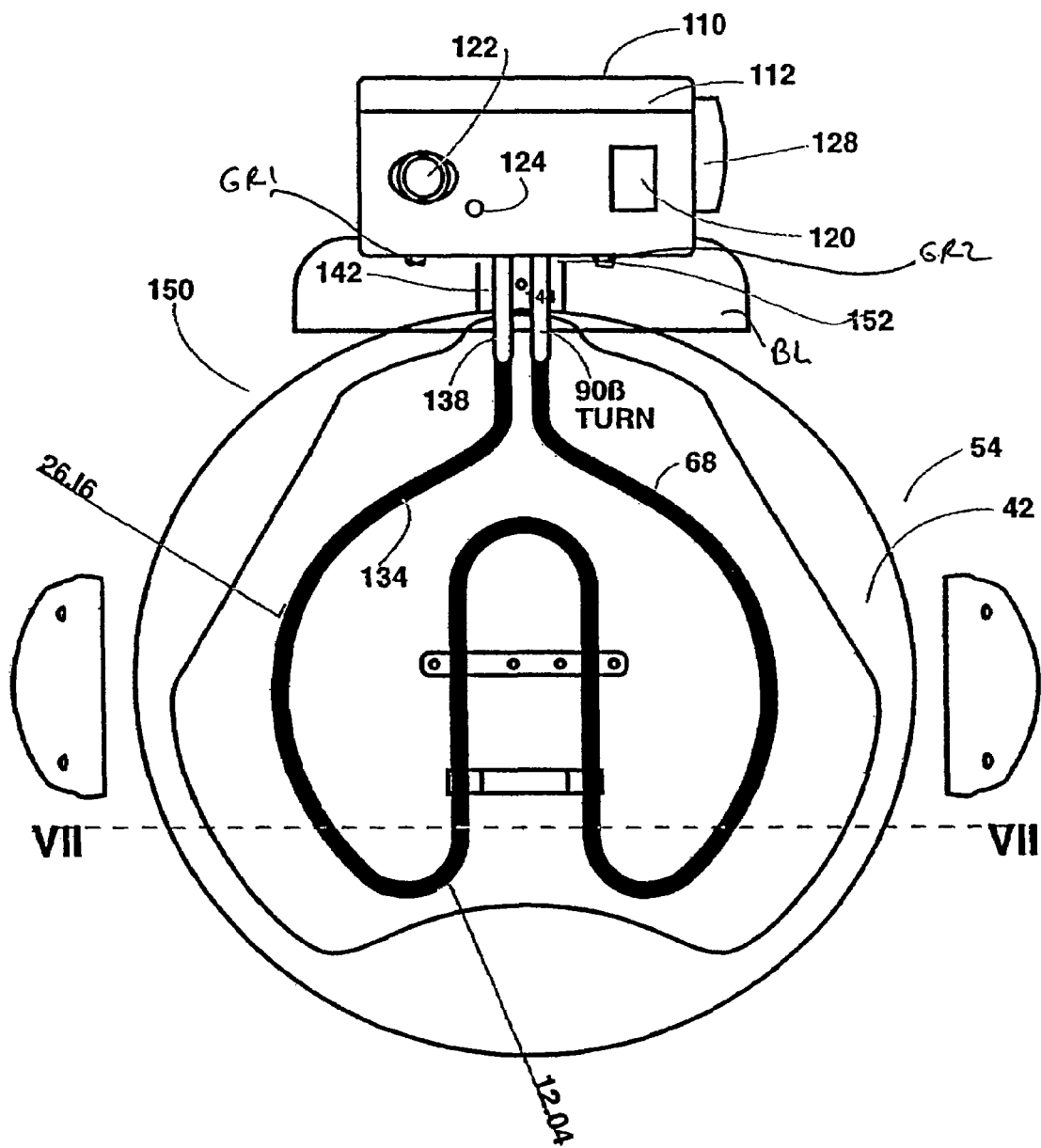
FIG. 6C shows a view similar to FIG. 6A but with an alternate embodiment of the cooking pot having a circumferentially continuous, varying radial dimension step-in region.
Figure 7:
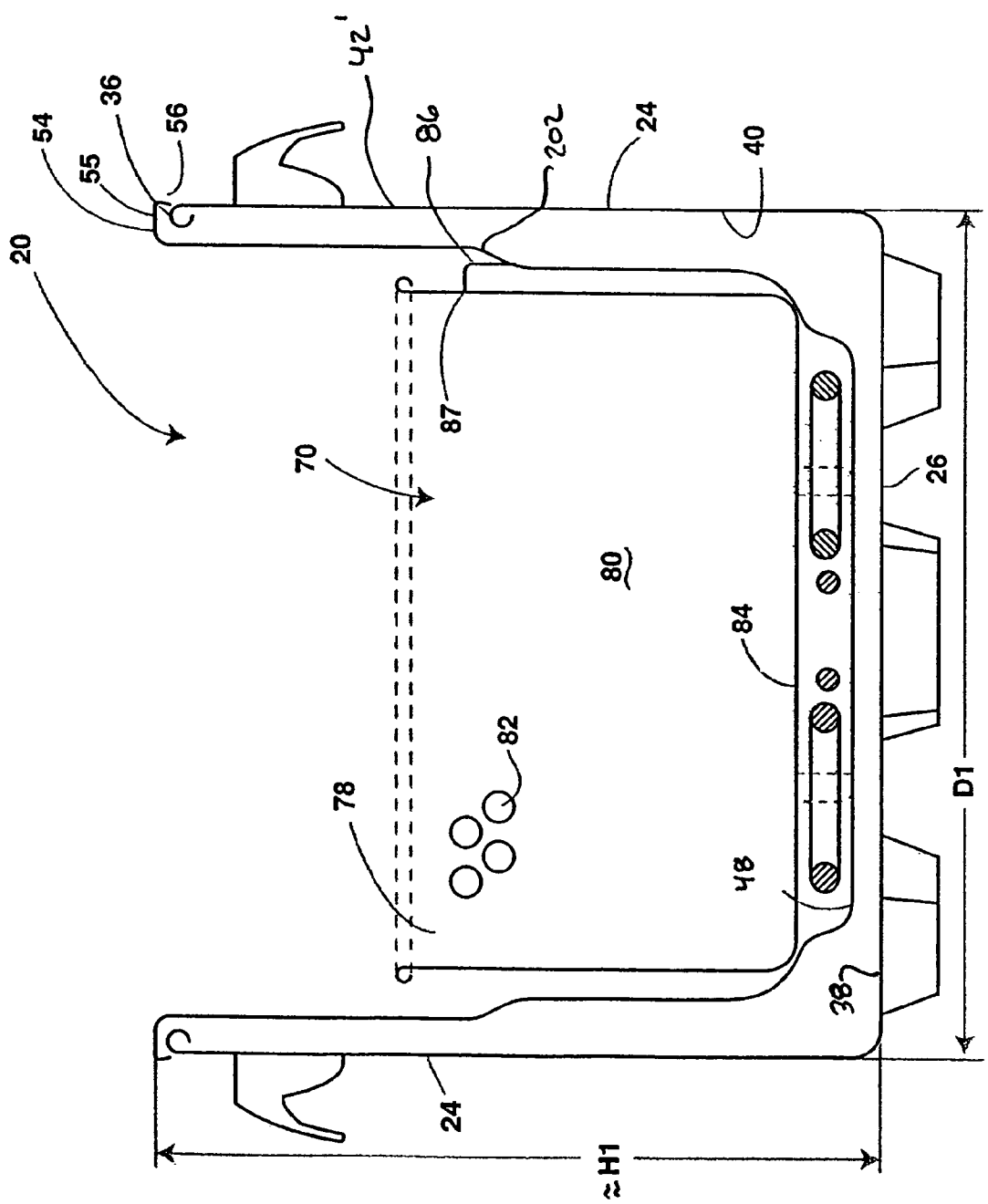
FIG. 7 shows a cross-section view taken along cross section line VII-VII in FIG. 6A together with a basket inserted.

FIGS. 6, 6A-6C and 7, illustrate an alternate embodiment of the invention showing a multi-step-in cooking pot 42' configuration designed to reduce volume while still providing for both heater element and cooking basket placement and side edge clearance FIG. 6B illustrates a similar arrangement shown in FIG. 5A but for there being provided an even further cooking fluid volume reduction embodiment wherein cooking pot 42' features step-ins of variable radial extension so as to provide support to the basket or alternate food support means. Radially inward extending regions are shown to the left and right as step-ins $Q_1$ and $Q_2$ relative to a central positioned control unit and a diametrically opposite region $Q_3$ which is the thickest region and preferably as a convex inner edge (while the other step-ins Q1 and Q2 are preferably straight edge). The radially inward curved extension wall of step Q3 is shown centrally positioned relative to the open end of the horseshoe shaped horizontal portion of the heater resistance bar shown. FIG. 7 also show the double step-in arrangement with upper annular step-in 202 which is preferably about at the half way level of the height of the cooking pot (e.g. a 35 to 65% range with about 50% being preferred). Hook 86 is shown to extend down to a location at or above the upper step-in 202 and preferably within an inch or two thereof.

FIG. 6A also illustrates the generally concentric relationship between the outer curved edges 158 and 160 relative to the upper portion of cooking pot 42' (the prime representative of the double level step-in arrangement) while the lower interiormost edges of lower step-ins Q1 to Q3 extend in closer relative to the heater resistance elements horizontal portion 140. For example, dimensions DI, DJ and DK in FIG. 6A illustrate some of the relative spacing between heater bar 140 and the interior surfaces of the step-ins. For example, DI shows the relative spacing between the straight edge of step-in Q1 and the tangential, closest surface of heater bar 134 (by way of transverse line DI) as being intermediate the smaller spacing distance DK and the larger spacing DJ (with the same spacing DI being true for step-in Q2). The smallest spacing DK is between a line extending transverse to the tangential, closest spaced line extending of the closest point of the heater unit adjacent thereto. DJ illustrates the transverse distance between the inner surface immediately below the annular step-in 202 and a tangential line of the heater bar portion closest thereto. The annular thickness or radial depth of step-in 202 is preferably about 0.25 to 1 inch with 0.5 inch being preferred.

In FIG. 6A, block BL of shell 22, into which the main housing 126 of the heater device 110 is slid by way of grooves GR1 and GR2, is illustrated in its mounted position on the exterior side of the shell 22. Also the electrical connection extending from the housing 126 of the heater unit is preferably of a design that precludes too easy detachment (a problem associated with some prior art designs relying on magnetic attachment). To facilitate rapid and secure connection the present invention preferably includes a first electrical connector 204 (FIG. 4B) extending from a relatively short "pig tail" wire 206 which is free to rotate at the housing 126 connection. The connector end 208 (FIG. 40) is preferably a female receptor with internal male prongs 209 similar to the main power connection to a personal computer and with receptor end 210 being the insertable male component into the connector end while having female receptors 211. This connection used in the present setting provides for sufficient attachment without undesirable detachment.

Figure 16:
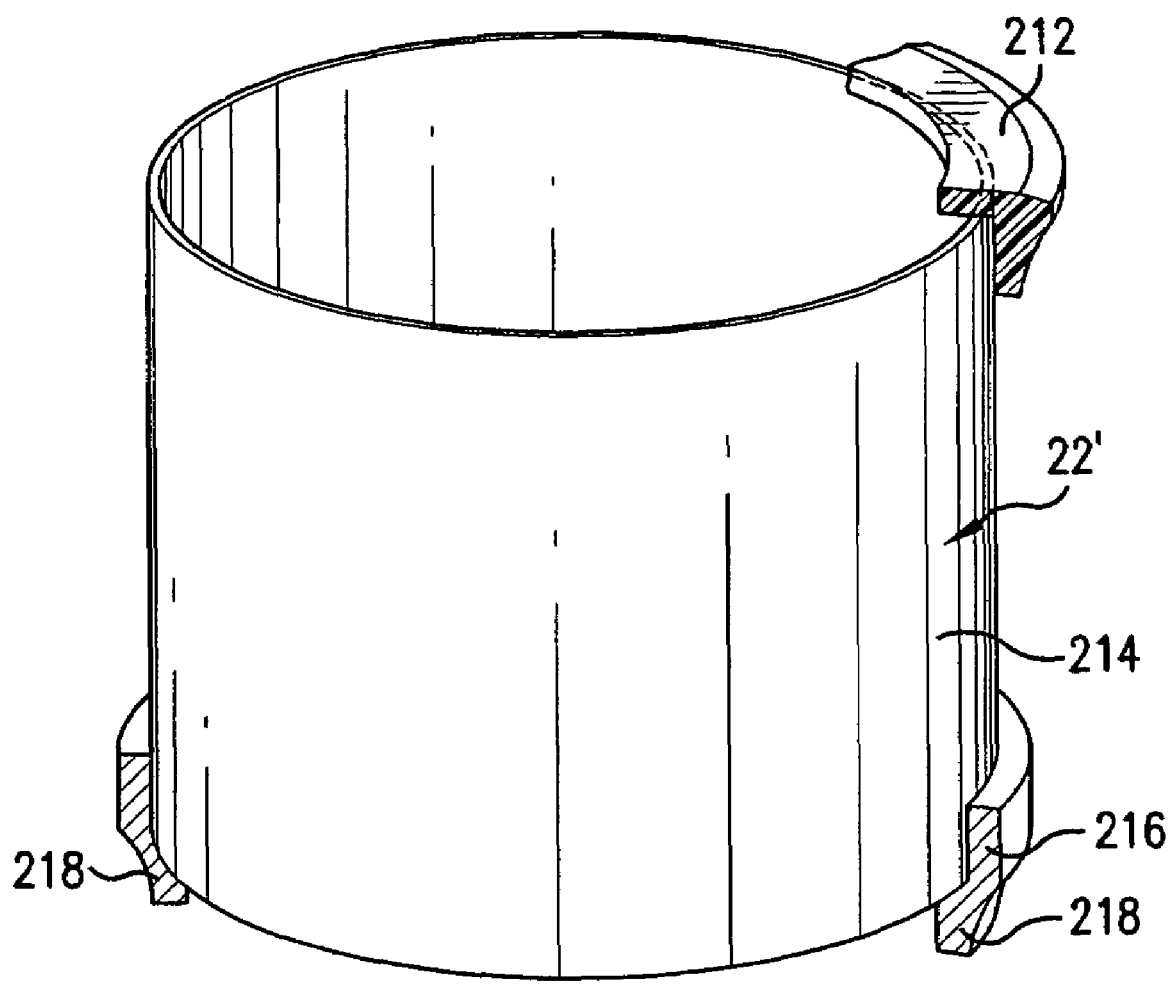
FIG. 16 shows an exploded view of an alternate multi-member embodiment of the shell of the present invention.
Figure 17:
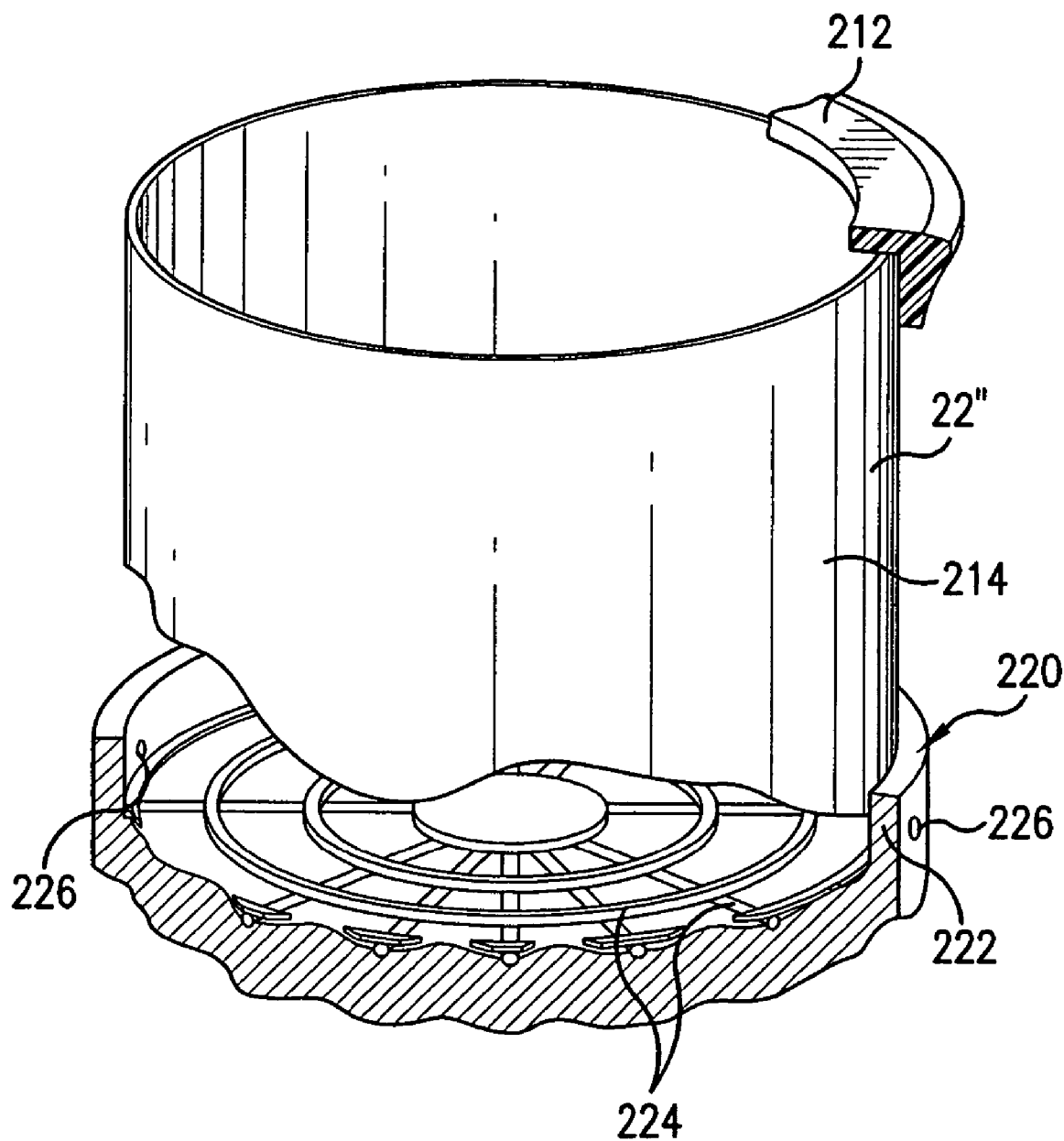
FIG. 17 shows an exploded view of an additional alternate multi-member embodiment of the shell of the present invention.

FIGS. 16 and 17 show exploded views of alternate shell embodiments of the present invention, with FIG. 16 showing shell 22' being formed of a combination upper ring 212 (preferably plastic formed by injection molding and shown in cut-away in FIG. 16) providing the contact bead or flange on which the cooking pot rests, intermediate shell wall 214 (e.g. a fastened coiled sheet of material as in aluminum or a monolithic cylinder of the same) and a bottom ring 216 (shown in cut away) featuring a bottom contact portion with vertically extending flange for receiving and positioning the lower edge of shell wall and a plurality of integral legs 218 (e.g., monolithic body such as one injection molded at the same time as forming the ring) extending down from the reception portion of the bottom ring 216. The upper and lower rings are securely fastened to respective upper and lower ends of the shell wall (e.g., mechanical fastening via added fastening members or a mechanical interrelationship between the two such as in an overmolding process with catch tabs).

FIG. 17 shows a similar view as that of FIG. 16 except that the shell assembly 22", rather than a lower ring 216, has a lower base member 220 with a continuous surface wall 222 for contact with the bottom of the cooking pot (preferably with a series of grooves and ribs 224 as well as ventilation ports 226 for heat reduction in the contact area of the cooking pot). A high temperature plastic is preferably used for the base member 220 or a combination of plastic base and an upper high temperature intermediate laminate (e.g., metal disc) between the base and the cooking pot to be inserted into the shell.

Figure 20A:
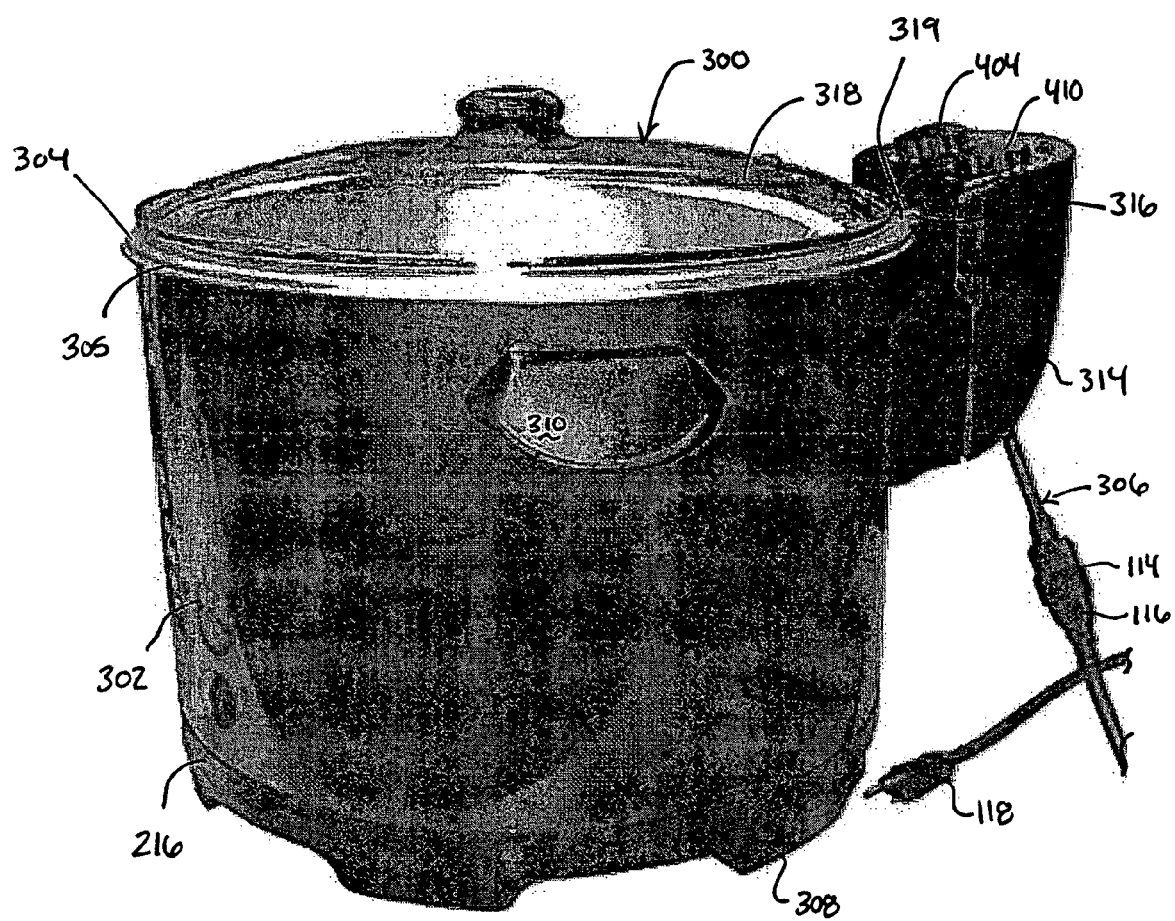
FIG. 20A shows a perspective view of an additional embodiment of the present invention.
Figure 20B:
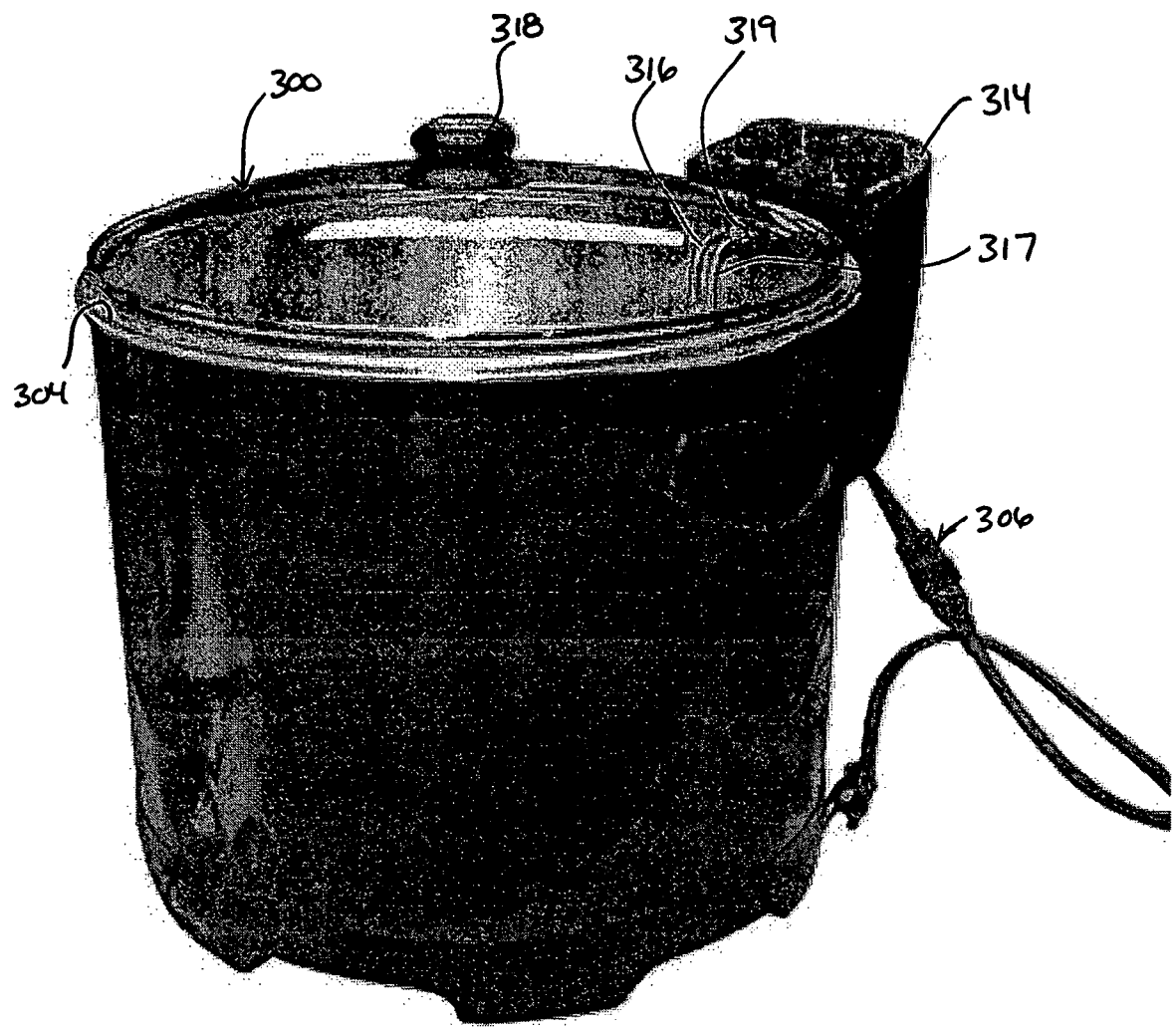
FIG. 20B shows an additional perspective view of that which is shown in FIG. 20A.

FIG. 20A illustrates an alternate embodiment of cooking apparatus 300 of the present invention. As shown, cooking apparatus 300 includes outer shell 302 within which cooking pot 304 is received (e.g., the aforementioned suspended pot within shell arrangement with overhang pot flange 305). The electrical chord 306 features the same preferred connector plug 114 arrangement as in the earlier embodiment. FIGS. 20A and 20D illustrate shell base 308 having an integral set of feet 218 and an outer circumferential retention flange 216.

Retention flange 216 is preferably fastened (e.g., releasable fasteners or a tight frictional fit to facilitate breakdown for cleaning or permanent attachment as through more permanent fasteners and/or adhesives) to the lower outer edge of shell 302. Handles 310 (one shown in FIG. 20A) are mounted on the shell as is the control mounting block 312 supporting control unit 314 into which extends heater device 316. As with the aforementioned embodiment, heater device 316 includes a bridging section and a heater resistance element 317 (FIG. 20B) extending vertically down along the interior side of pot 304 and then horizontally along the bottom of pot 304. With a notch or recess in both the outer shell 302 and upper edge of pot 304 a bridging section for the horizontal portion 319 of heater assembly 316 is provided that allows the illustrated see through lid 318 to fit in flush fashion onto the upper edge of the pot across the pot's entire circumference.

Figure 20C:
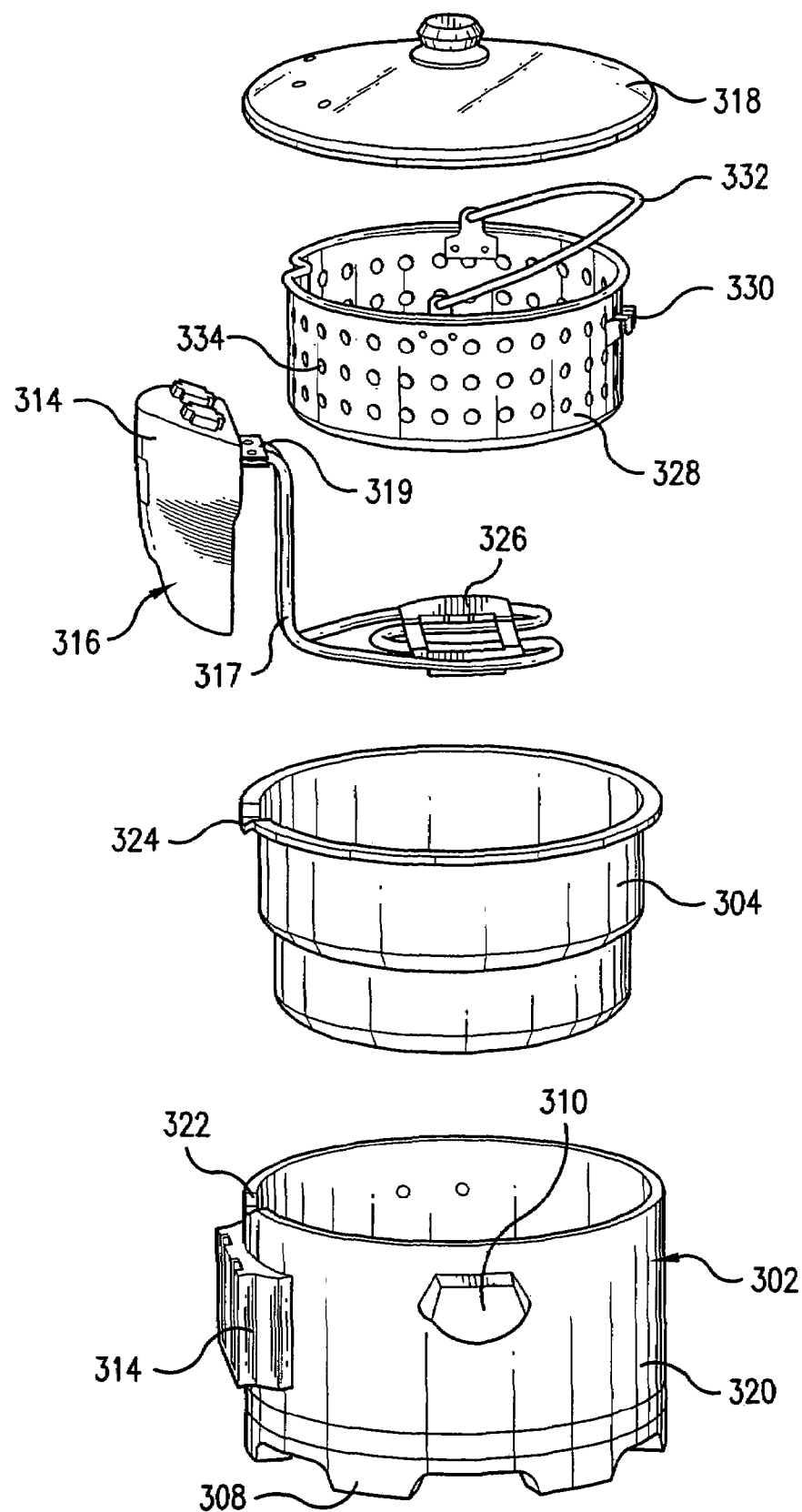
FIG. 20C shows an exploded view of the cooking apparatus of FIG. 20A.
Figure 20D:
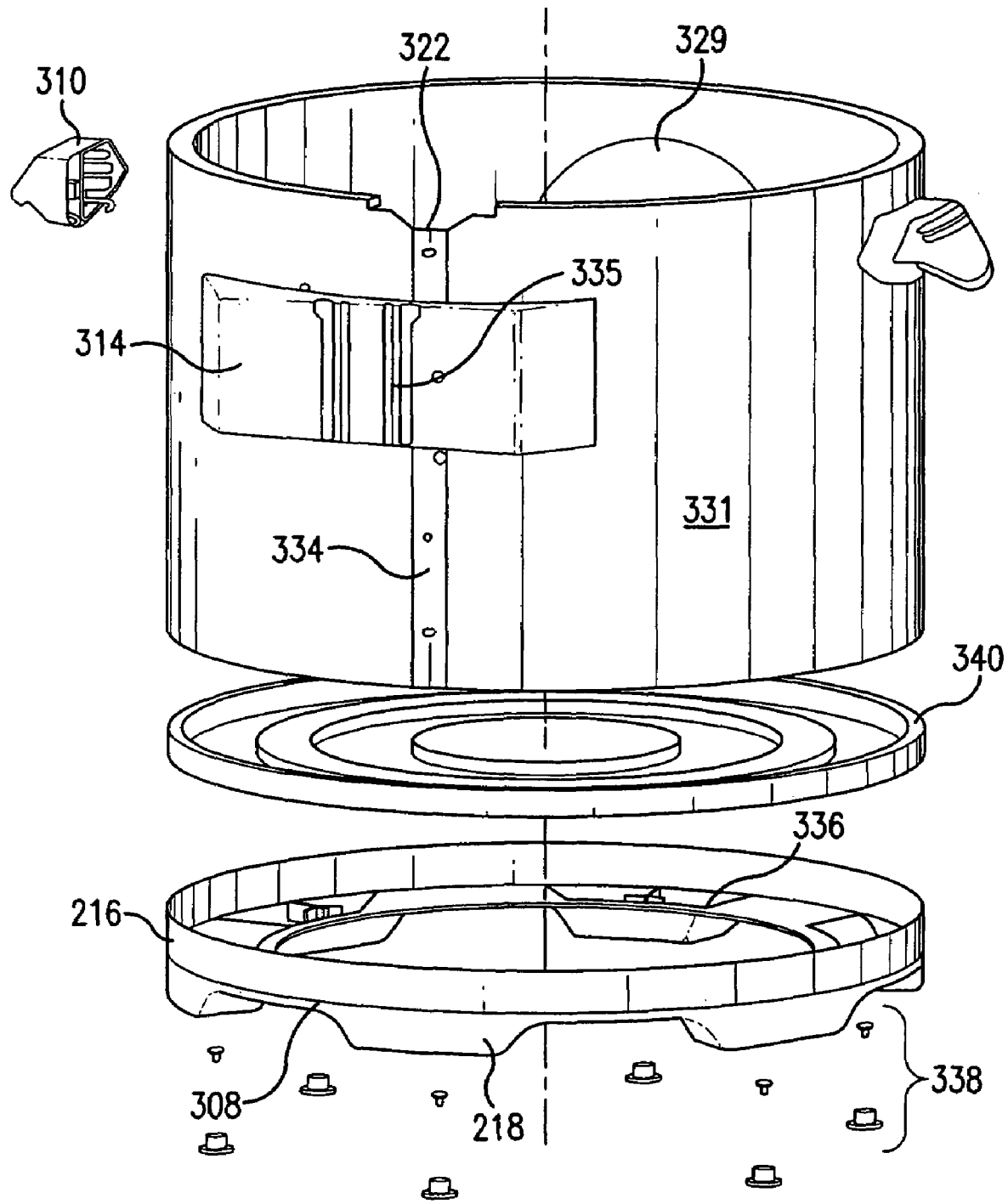
FIG. 20D shows an exploded view of the outer shield or shell.

FIG. 20C provides an exploded view of components of cooking apparatus outer shell 302 shown in an assembled state with its cylindrical casing 320, support base 308, handles 310, notch 322, and mounting block 314. FIG. 20C further illustrates double step-in, volume reducing cooking pot 304 (similar to the FIG. 10 embodiment) with upper rim 305 (radial extension with a downwardly turned outermost edge) having a corresponding recessed region 324 to fit within notch 322 of shell 302.

Heater device 316 includes control unit 314 out from which extends horizontal cover/clamping bridging mount 319 into which coiled heat resistance bar 317 extends and is covered over so that a generally 360° continuous lid contact region is provided by the pot/bridge combination. As explained in greater detail below, heater device 316 comprises a food handling means (e.g., basket) bottom support platform 326 that also functions as a heat resistance bar retention and suspension device and preferably also further provides a retention and suspension function to the temperature sensors.

The food handling means in the form of basket 328 is designed for reception in cooking pot simultaneously with the coiled heat resistance bar 317 and basket support 326. Basket 328 is similar to that in the aforementioned embodiment with its grasping hook 330, bailing handle 332 and apertures 334 and radial indent to accommodate the heat resistance bar. Lid 318 is also shown in FIG. 20C.

FIG. 20D shows an exploded view of shell 302 (an embodiment which includes a shell drain valve reception recessed section 329 as explained in greater detail below). As shown in FIG. 20D, shell 302 is preferably formed based on a flat rectangular sheet of, for example, aluminum that is manipulated into a cylindrical shape to form shell main body 331 and clamped along its free edges by way of fasteners at an overlap 334 as shown in FIG. 20D or in some other manner as in a monolithic shell main housing (e.g., extruded or molded). Notch 322 in shell 302 is shown formed commensurate with the upper edge of the overlap section.

FIG. 20D further illustrates mounting block 314 bridging overlap 334 and having a curved interior wall surface for conforming to the curvature of the shell's cylindrical main body 331 and fastened at its opposite edge to help retain the securement at overlap 334. The configuration of the shell's main body 331 is further maintained by the restraining affect of peripheral upstanding flange 216 in base 308 receiving the bottom edge of the shell's main body 331 and with the bottom edge resting on the outer extremity of the integrated (e.g., plastic molded) radial base flange 336 shown as a horizontal annular ring, from which feet 218 extend downward. Feet 218 are provided with a stepped hole for receiving counter protective contact elements 338 (e.g., soft rubber plugs with counter sunk threaded fasteners).

Base flange 336 also provides support to heat shield 340 which is formed of a material as in a metal or plastic that provides a heat barrier effect so as to protect an underlying countertop for example from the heat generated by the horizontal section of the heat resistance element spaced just above the barrier and is preferably more resistant to heat degradation than the base support 308. A laminate (releasably or permanently arranged in a stack) arrangement is preferred between the disc shield 340 and the supporting base 308 (ring or also disc shaped). As seen from FIG. 20D, the combination of insert 340 and ring of the shell base 308 from a cup-shape support unit onto which the element support means 326 (food handling means support and/or resistance bar suspension and retention support) can rest.

Figure 20E:
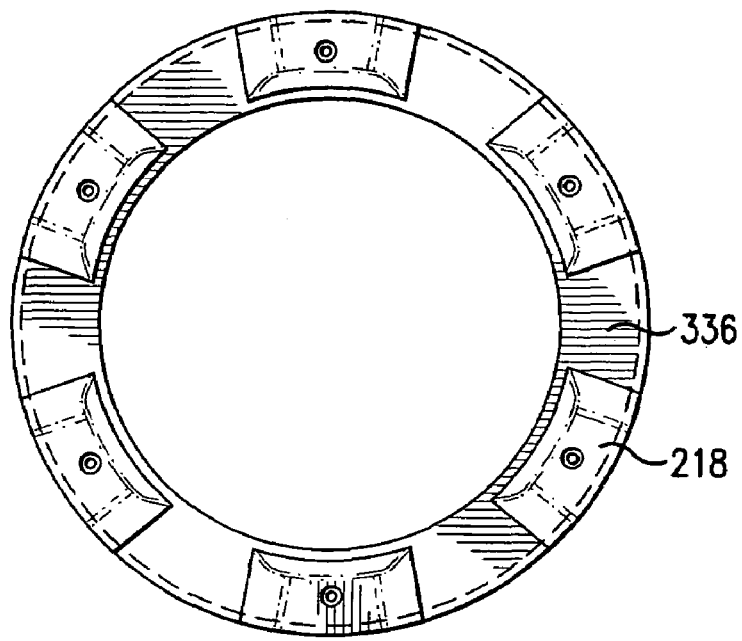
FIG. 20E shows a bottom plan view of the shell base ring.
Figure 20F:
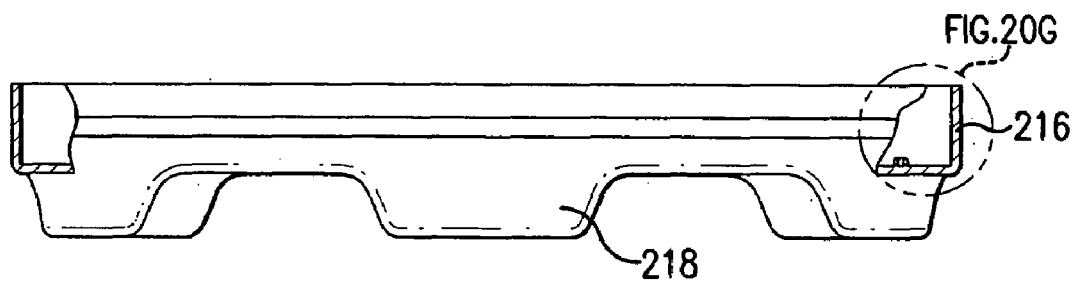
FIG. 20F shows a side elevational view of the shell base ring.
Figure 20G:
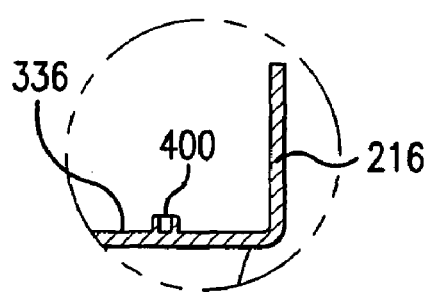
FIG. 20G shows an enlarged view of the circled section of FIG. 20F.
Figure 20H:
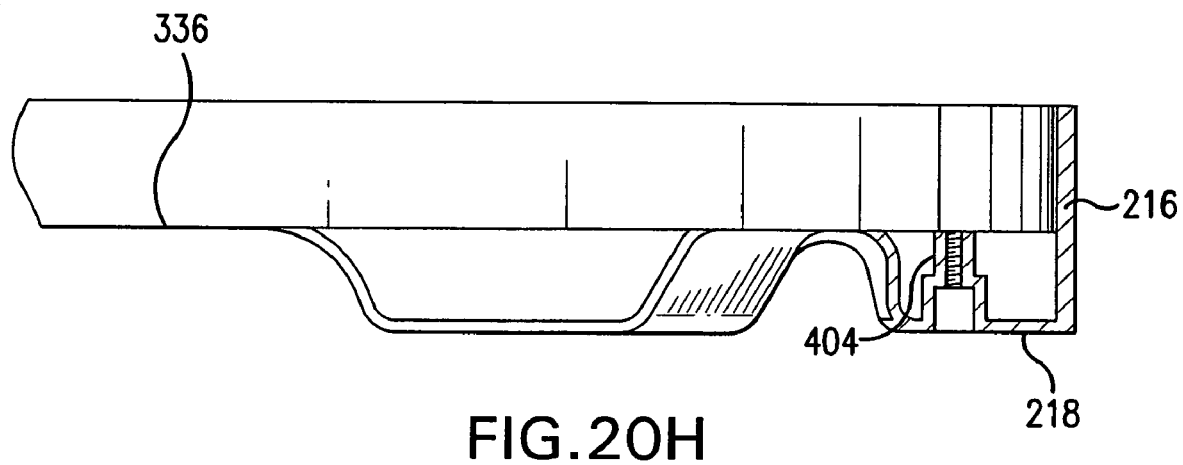
FIG. 20H shows a cut-away parted cross-sectional view of the base ring in its normal, upright usage state.
Figure 20I:
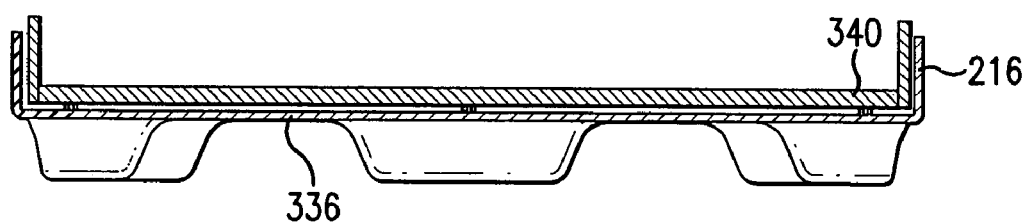
FIG. 20I shows a cross-sectional view of the shell base ring and connected cylindrical shell casing.
Figure 20J:
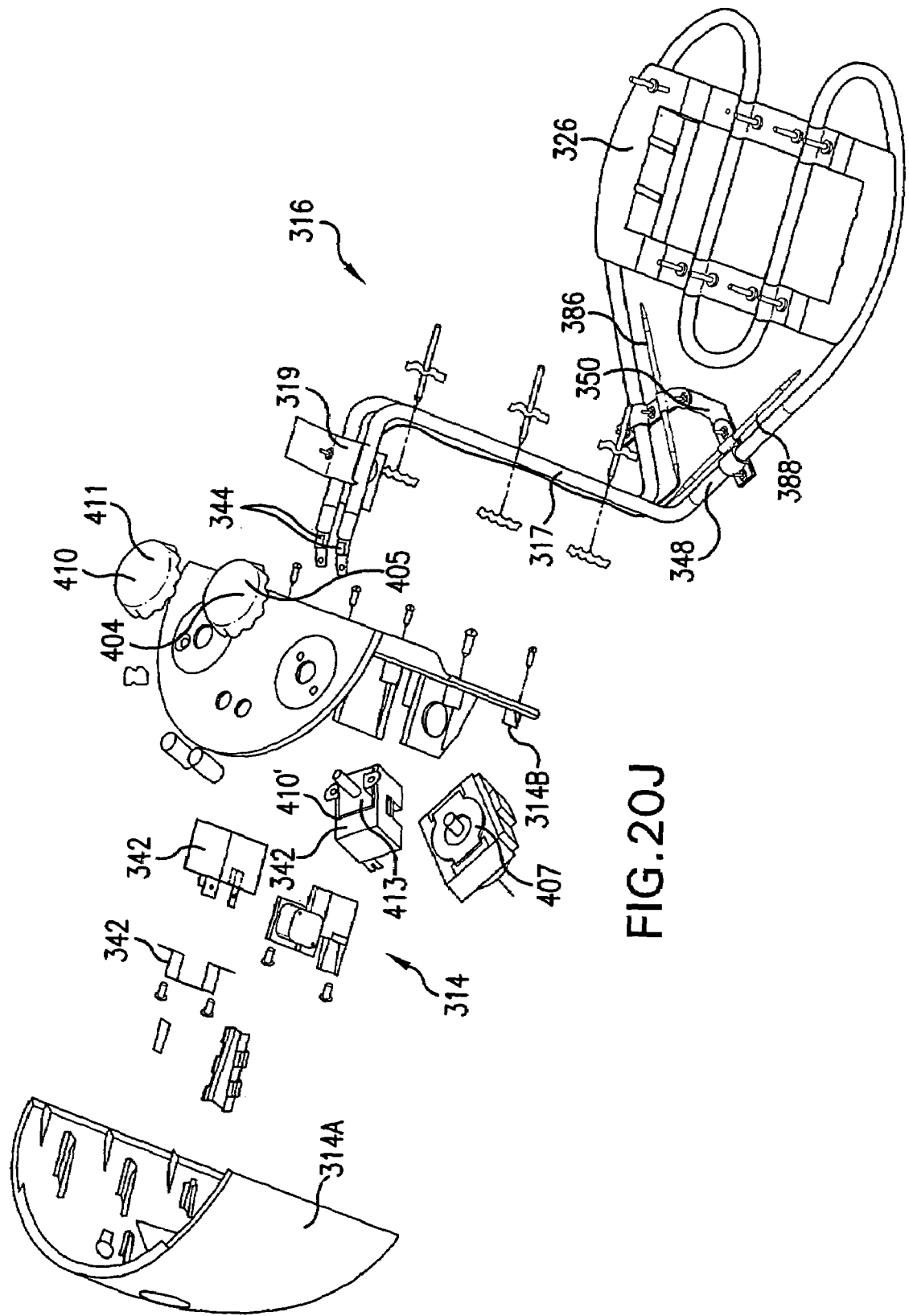
FIG. 20J shows an exploded view of the heater unit with control box and heating element.

FIG. 20J further shows heater device 316 with control unit 314 in an exploded view. Control unit 314 is shown having exterior housing section 314A and radially interior housing section 314B within which is housed the various control components 342 (known per se and thus not further detailed) and into which the electrical connection ends 344 of coiled heat heater resistance element 317 extends. Support means 326 is illustrated in association with the coiled horizontal or lower portion 346 of resistance bar 317. Radial out at the initial region 348 of heater bar divergence there is provided support bracket 350.

FIGS. 20E, 20F, 20G, 20H, 20I, 20K and 20L show additional detail as to a shell support base embodiment. As shown, feet 218 are integrally molded as one piece with side wall flange 216 and support flange ring 336 which supports the bottom edge of main shell body 331 and down from which extends feet 218. This illustrated monolithic unit is further provided with upward projections 400 on which heat shield 340 rests slightly off of the flange ring upper surface when the heat shield is received within the shell main body 331. The lifting off of the shield from the flange 336 provides an additional cooling function as with the above noted groove/ridge/hole arrangement of the similarly cupped shaped embodiment of FIG. 17 embodiment. FIGS. 20E and 20F illustrate a preferred countersunk thread hole provided in an intermediate area of the bottom of feet 218 for receipt of counter contact elements 338. FIG. 20I provides a cut away view showing the relationship between the heat shield, support flange and base side wall 216.

Figure 20L:
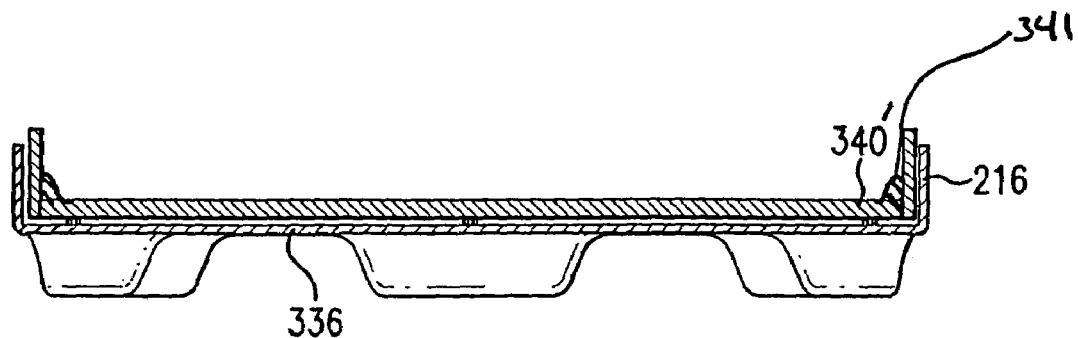
FIG. 20L shows an additional shell base ring, shell main body and heat shield arrangement.
Figure 20K:
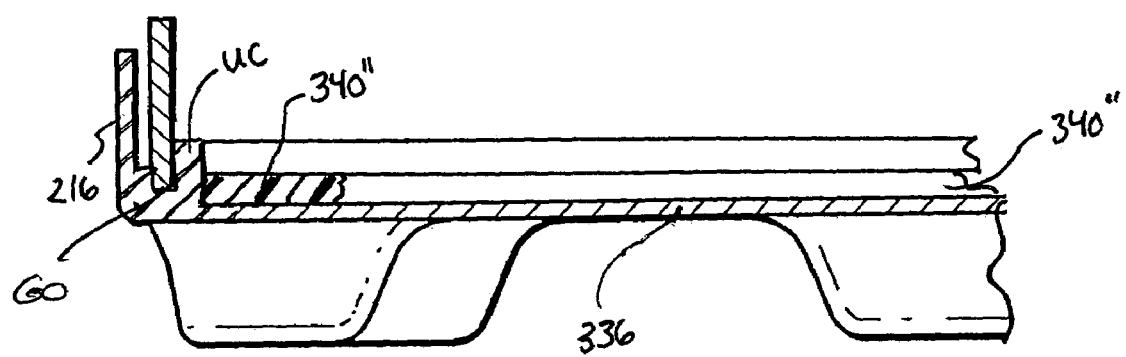
FIG. 20K shows a cut away view of an alternate shell base ring, shell main body and heat shield arrangement.

FIG. 20K shows an alternate embodiment wherein the annular ring has a shell main body circular receiving groove and the horizontal ring portion has a projection that defines a heat shield disc receiving recess. FIG. 20L shows an embodiment wherein the heat shield has a peripheral projection with a slight outward taper (e.g., 2%) that is designed to facilitate the compressive frictional attachment of the lower end of the main body of the shell against the vertical wall of the base ring.

Thus, as shown, for example in FIGS. 20I, 20K, 20L or 24J in preferred embodiments the lower edge of the cylindrical main body of the shell rests on the outer edge of the circumferential ring (e.g., within a circular groove or on an upper grooveless surface), and is preferably further retained in place by the circumference of the heat shield disc also supported on the horizontal circumferential section of the ring. For example, the horizontal ring portion of the base ring is shown in FIG. 20K to have projection UC and circumferential groove GO to confine the lower edge of the shell's main body. Projection UC is placed in friction contact with the outer periphery of the disc shaped heat shield. The heat shield's outer edge is shown formed with a circumferential bulbous upward projection 341 (FIG. 20L) for friction contact with the main body of the shell.

Figure 21A:
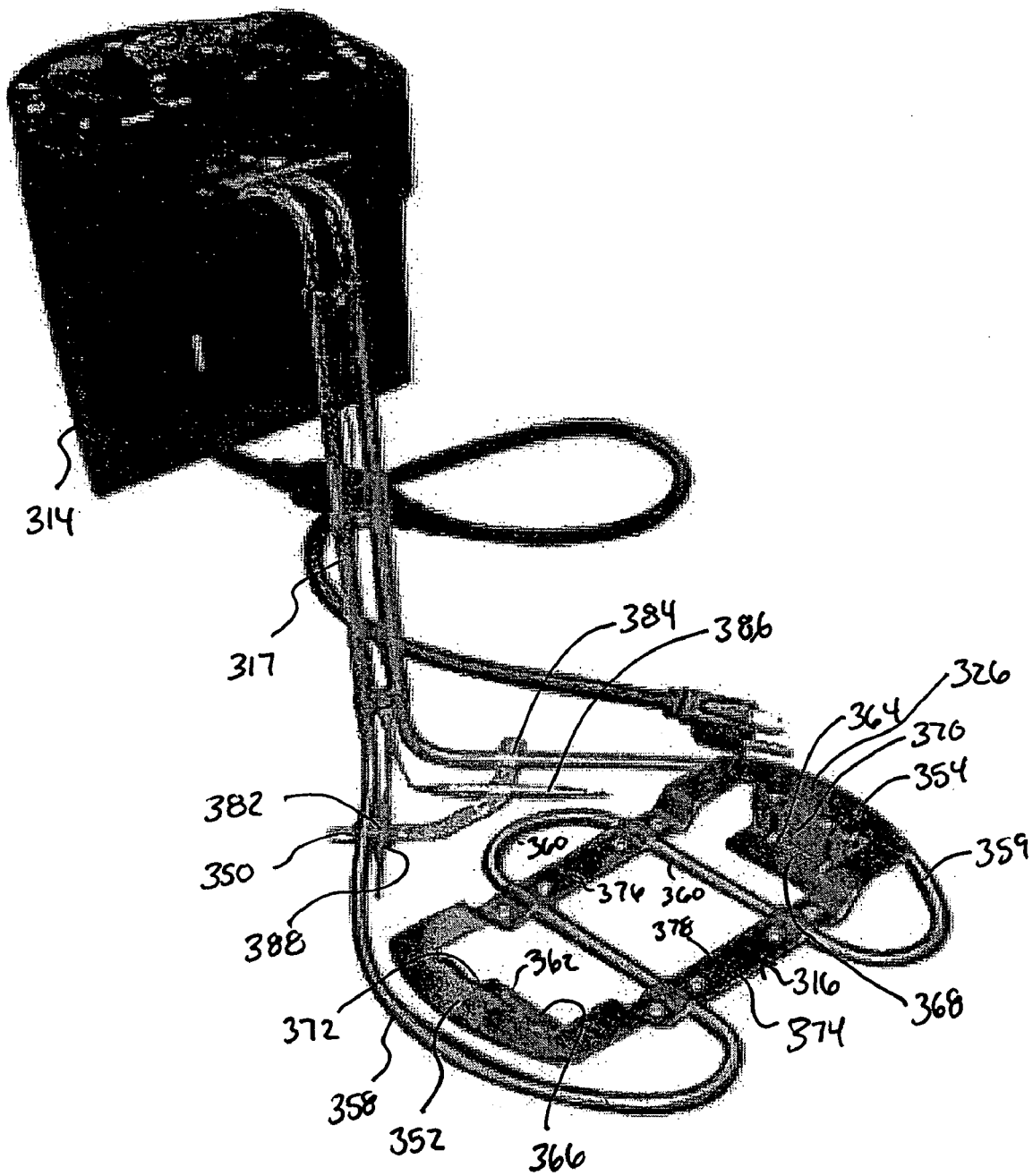
FIG. 21A shows the heating device utilized in the FIG. 20A embodiment.
Figure 21B:
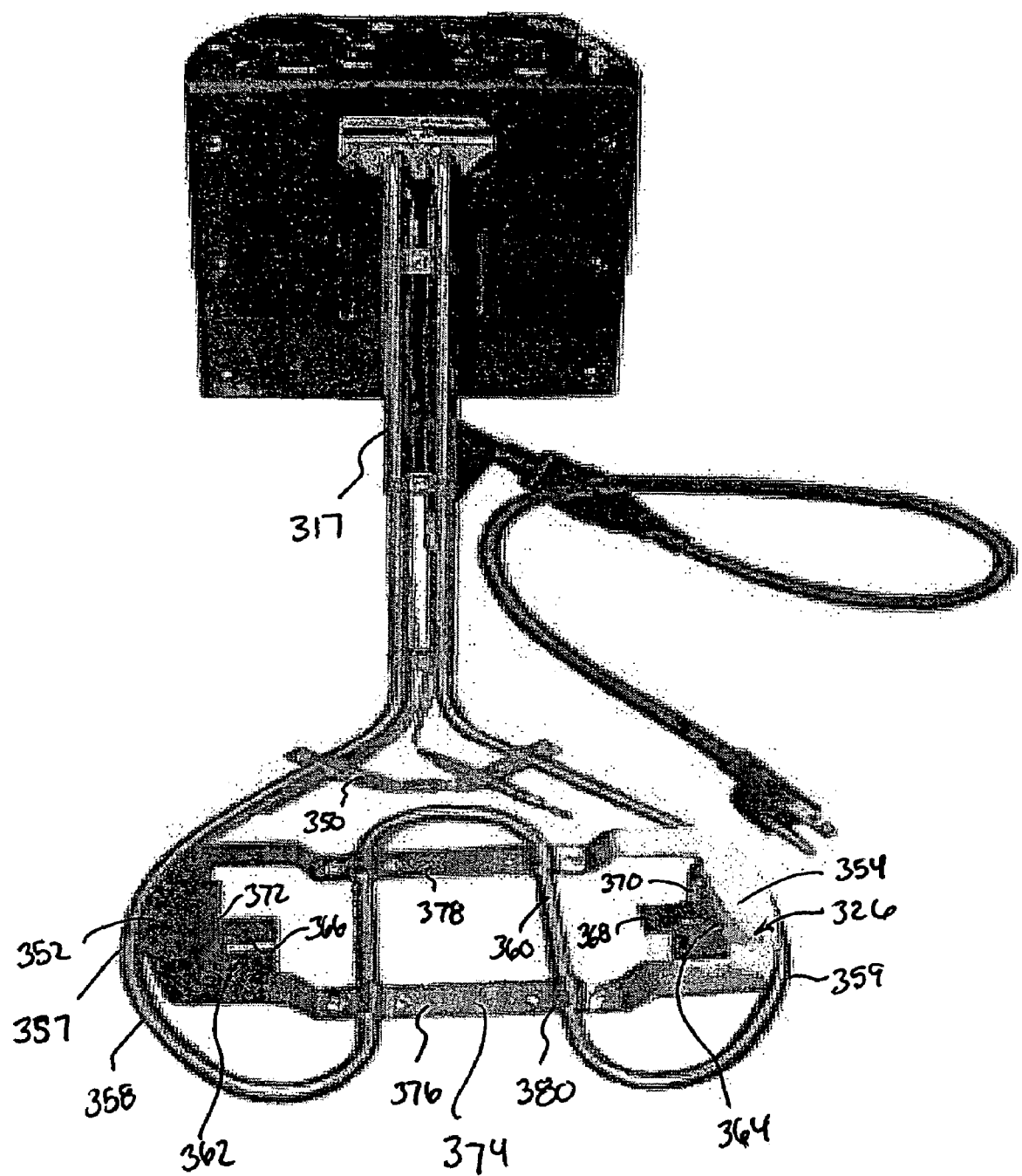
FIG. 21B shows a different view of the heating device of FIG. 21A.

Temperature sensor support bracket 350 and basket support platform 326 are shown in greater detail in FIGS. 21A and 21B. Basket support platform 326 is illustrated in its preferred monolithic embodiment (e.g., a cut and stamped embodiment, injection molded embodiment, etc.). Support platform 326 is shown in FIGS. 21A and 21B as having raised opposite end sections 352 and 354 which have a planar (e.g., flanged) upper basket supporting surface onto which a cooking basket or alternate food support device can rest. In an embodiment wherein basket support is achieved by basket support platform 326, the step-in 58 (see FIG. 24H) is preferably provided still for cooking fluid volume reduction, but need not contact the basket. The level of end sections 352 and 354 is preferably generally commensurate with a lower step-in surface in the cooking pot.

End section 352 and 354 of basket support 326 are shown to represent the highest portions of basket support 326 so as to suspend the contacting pot 304 bottom just above horizontal coil section's curved edge sections 357 and 359 and inner U-shaped interior section 360. End sections 352 and 354 are shown having curved outer edging generally positioned horizontally commensurate with the underlying curved heat resistance bar sections 357 and 359 and generally conforming in curvature which provides a large surface area and diametric extension to provide a highly stable basket support. This stability is enhanced with the relatively wide base feet 362, 364 shown as being formed from an inwardly bent region of an initially flat plate forming a further stepped section together with inwardly turned horizontal pot contact sections 366, 368 up from which extend the intermediate more vertical extensions 370, 372. The horizontal bracket feet or pot contact sections 366, 368 are shown to have a relatively long length (e.g., ⅓ or more of the extension length of the U-shaped heater resistance bar section 360). Radially inward of the outer basket support platforms 352 and 354 is intermediate section 374 which is represented by two horizontally extending rails 376 and 378 extending at a horizontal plane level that is intermediate heightwise between the basket support plane provided by sections 352 and 354, but above the pot's bottom surface so as to suspend the heater unit at an intermediate (e.g., right at the half-way point) location between the bottom surface of the pot and the bottom surface of the basket so as to provide for fluid circulation while providing as well a high heating exchange effect while avoiding direct pot to heat resistance element contact. The curvature (horizontal retention) and suspension level (vertical retention) in the coiled horizontal section of the heat resistant element is maintained by the basket support platform 326 which further comprises indents and cover clamps 380 (e.g., screwed or alternate fastener clamping relationship between bracket 326 and the received portions of U-shaped heater bar section 360). FIG. 21A shows four separate clamping contact points between the heater bar and bracket 326 at the few points of transverse intersection between rails 378 and 380 and the two elongated components of U-shaped section 360 of the heat resistance bar. Rails 376 and 378 are also preferably an integral component of basket support bracket 326 and can be formed in a stamping arrangement or some other forming technique (e.g., molding) which places the rails at the desired intermediate location.

A variety of alternate combination heater bar and cooking pot direct contact (or backup support platform) support and retention means 326 are also featured under the present invention including, for example, full upper horizontal plating preferably with downwardly extending heater bar retention and/or support feet or vice versa, a lower flat plate with upward pot and/or heater bar contact and retention extension. In an alternate embodiment, the support and/or retention means 326 can be integrated (fastened or formed) with the interior surface of cooking pot 304 and alternate heat resistance bar securement means provided as in a snap-in (metal expansion contraction clips) designed to receive the horizontal section of the bent bar heat resistance element of heater device 316 and with outstanding flanges to provide basket support or a cooking pot contact surface if the flanged section is arranged at the opposite end.

The combination temperature sensor and heat resistance element support bracket 350 is shown in FIGS. 21A and 21B to be generally U-shaped and connected at intersection ends 382 and 384 with the heater bar extensions of the horizontal section extending out from vertical heater bar section 317 (preferably a similar indent/cover clamp arrangement) combination as described above. Interior bracket 350 thus helps retain the original configuration of the initial divergence area of the horizontal portion of the coiled heat resistance bar while further providing means to secure in position temperature sensors 386, 388 which are similar in function to those described for the previous embodiments.

Figure 21C:
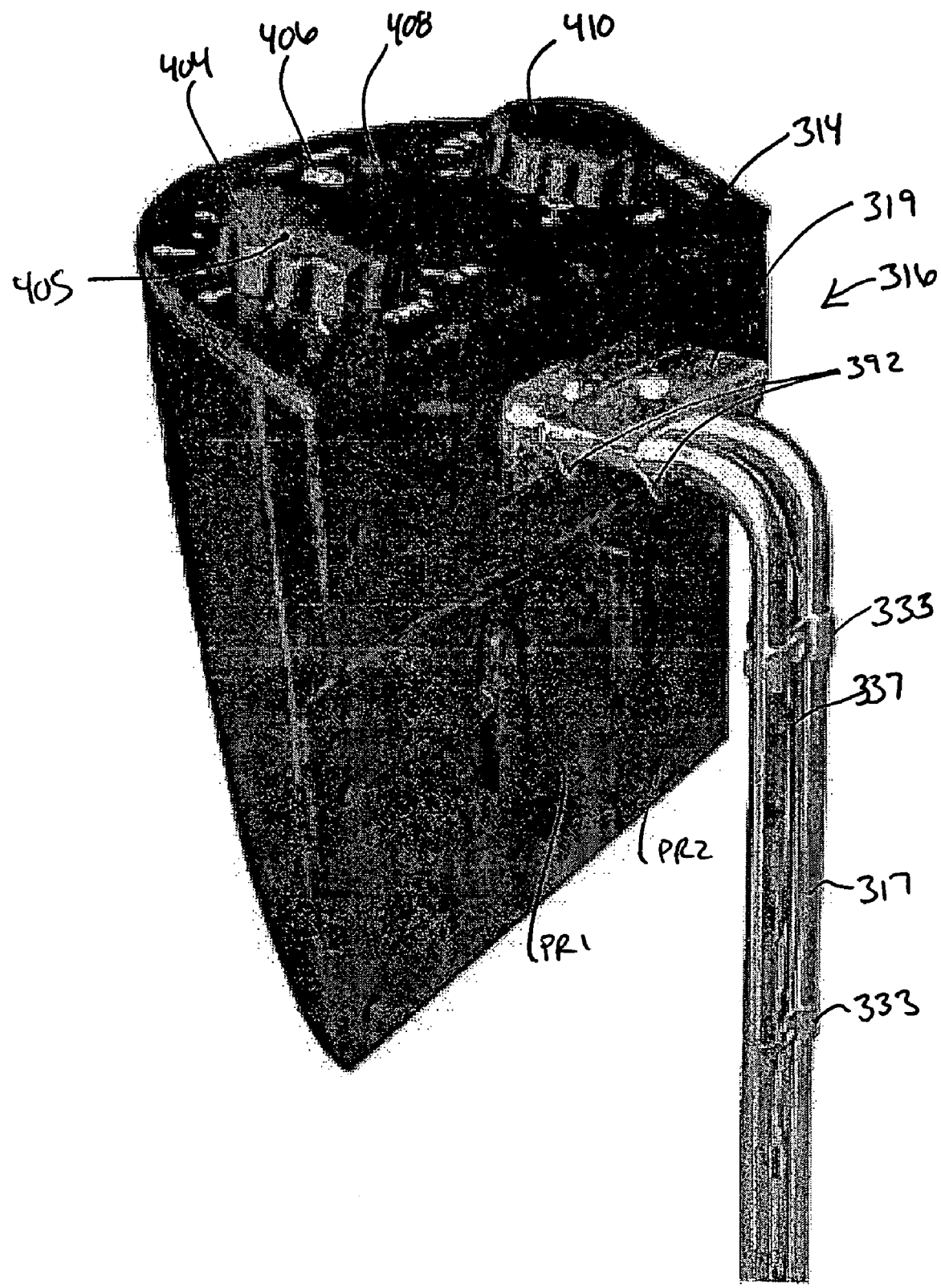
FIG. 21C shows an enlarged view of the upper portion of the heating device.

FIG. 21C shows in enlarged fashion the control unit 314 of heating device 316 together with the upper section of the preferably stainless steel heat resistance bar 317. Temperature sensor wire 337 is shown leading into the control means of the control unit and retained by the heat resistant bar clamps 333 spaced periodically along the vertical section of heater bar 317. The inner side of the control unit main body includes the pairs of male projections with intermediate formed grooves GR1 and GR2 which arrangement is designed to provide a slide and lock arrangement relative to the shell's block BL and associated corresponding extension/groove arrangement 335 (see FIGS. 20D and 24G). In a preferred embodiment the engagement or lock arrangement between block BL and control unit 314 projections GR1 and GR2 includes a contact element (e.g. one or more contacts as in a flat ribbon and leaf spring contact plate combination (see component CE in FIG. 24G)) that is in association with the heater element circuitry (e.g., completes a part of the "power on" to resistance bar circuitry extending from the wall outlet source to the intake end of the heater bar resistor) such that any time the block heater element 316 (main body of control unit 314) is disengaged from block BL of the shell, the electrical supply to the heater bar 317 is terminated (even when the heater unit on button is on). This additional shut off safety feature provides added security that the heating element will not be removed from the cooking fluid while "on" which can damage the heating unit. A suitable electric conductor (e.g., insulated plate) can provide an electrical bridge between the reception grooves GR1, GR2 in block (FIG. 24G) BL and complete a circuit having contact nodes as the projections PR1, PR2 in control unit housing 126.

Figure 22A:
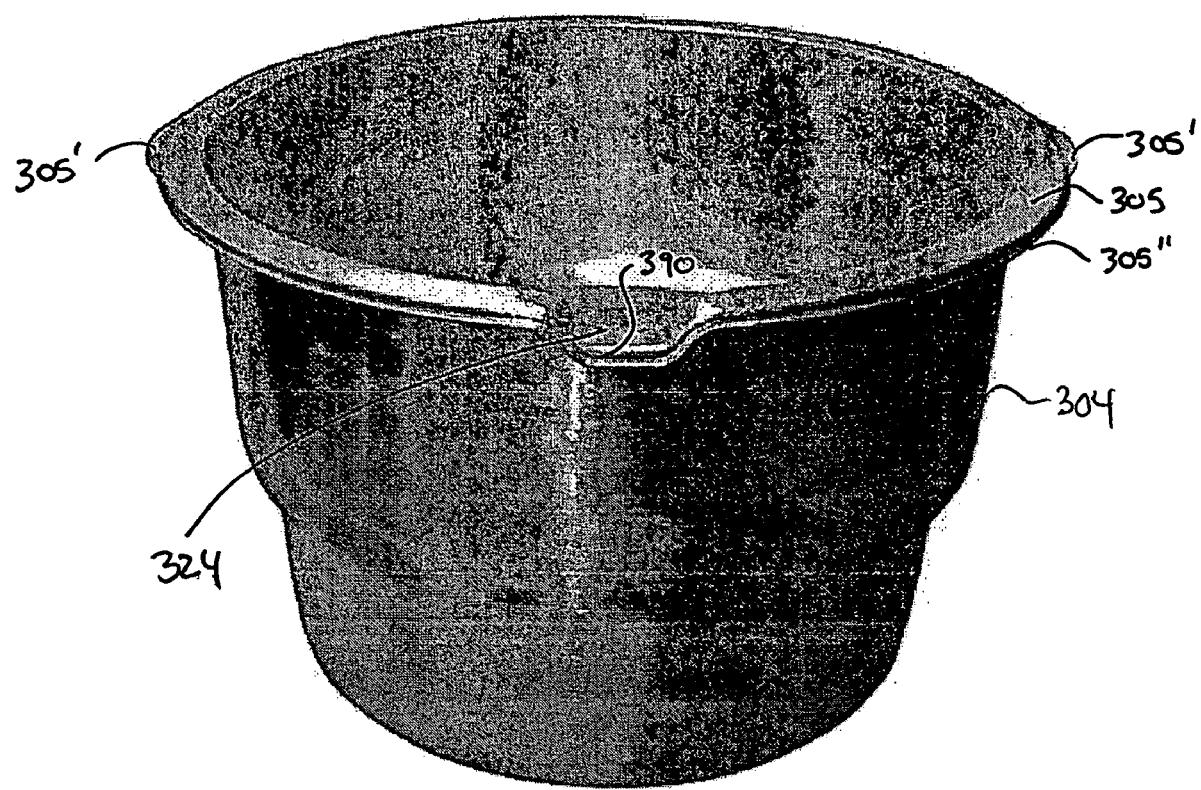
FIG. 22A shows a perspective view of the cooking pot.
Figure 22B:
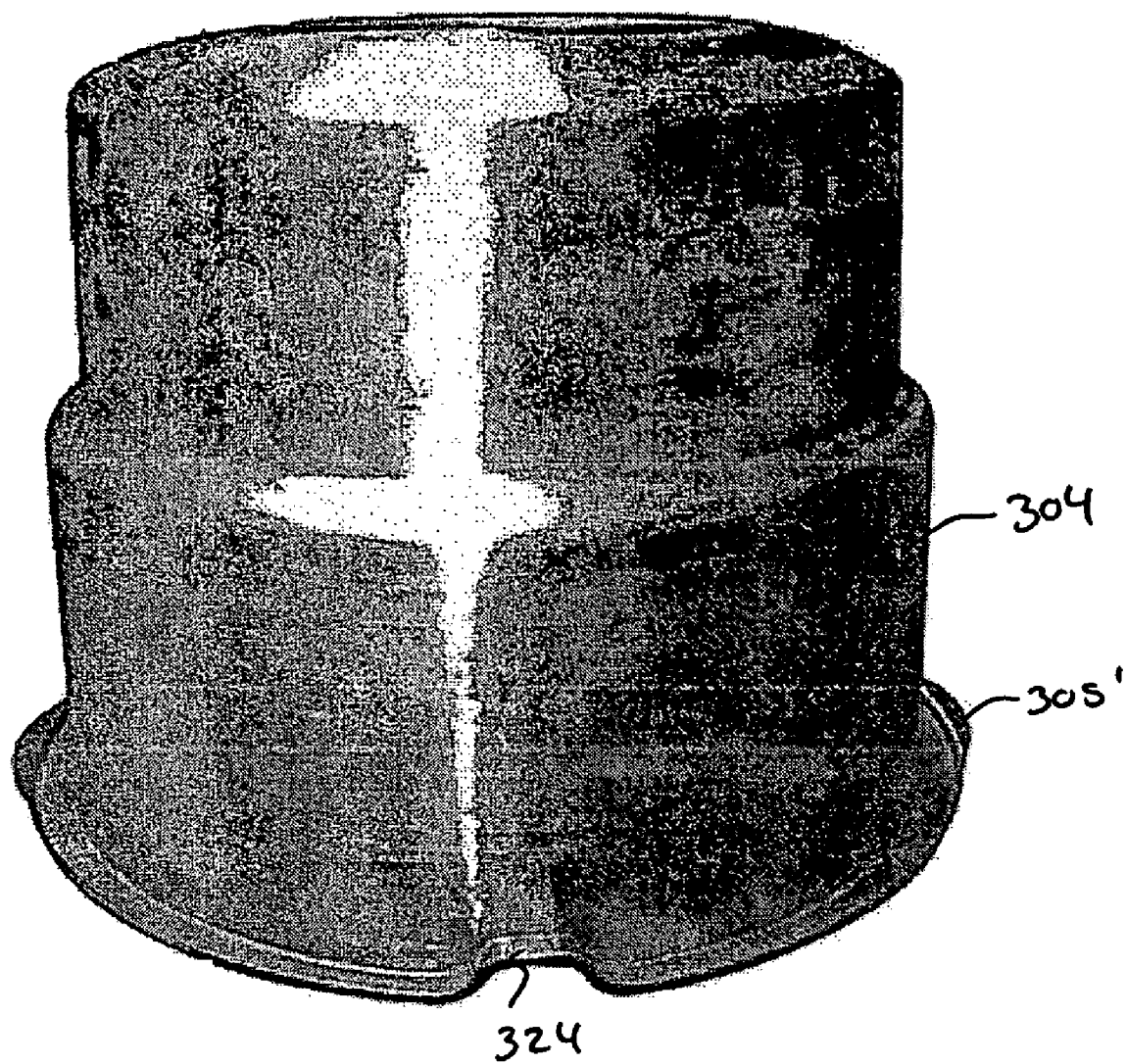
FIG. 22B shows the cooking pot of FIG. 22A from an alternate view.
Figure 23:
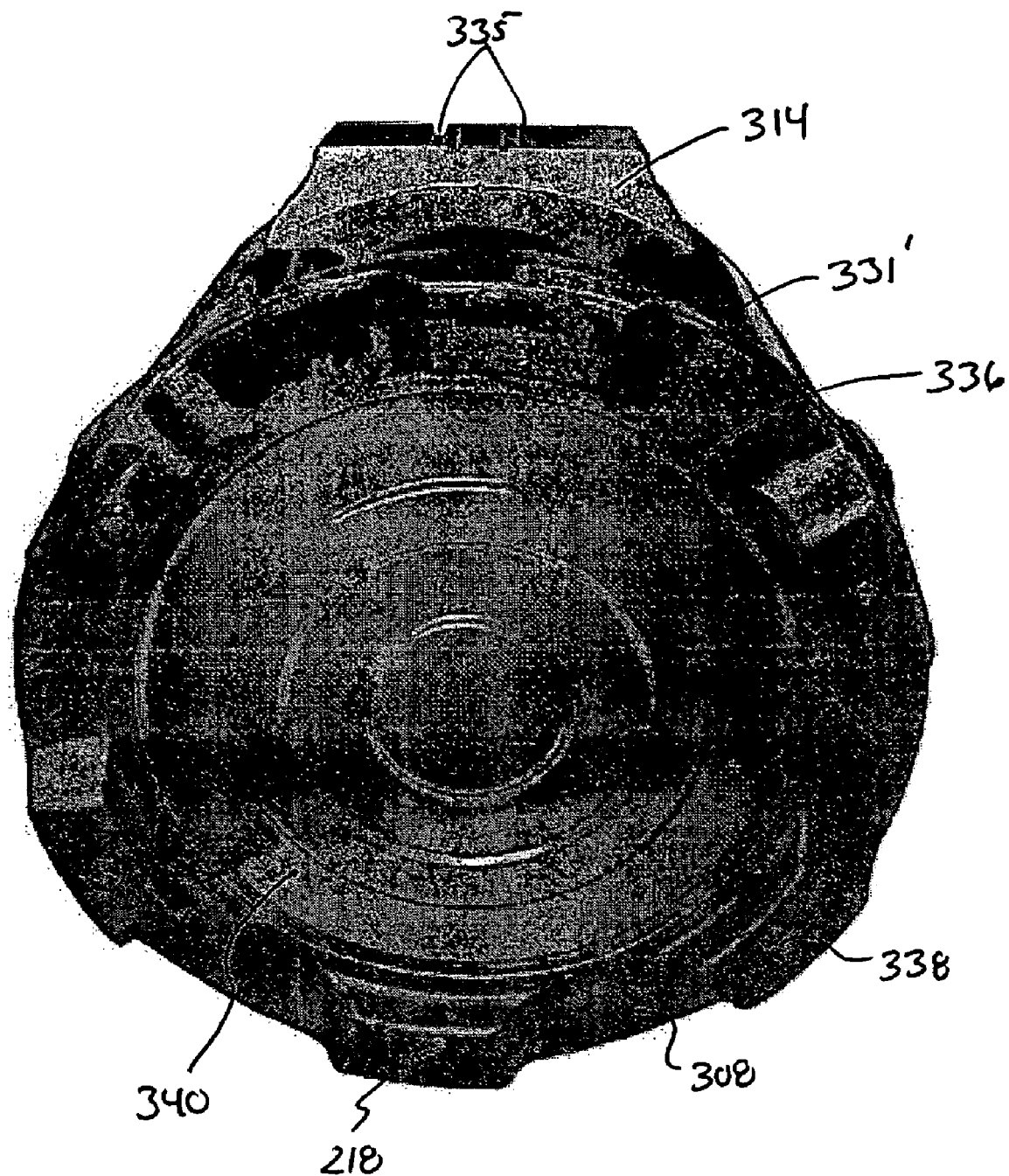
FIG. 23 shows a bottom view of the shell or housing of the cooking apparatus.

FIGS. 20J and 21C further illustrates bridging cover section 319 which provides a position retention function relative to the upper horizontally extending heater bar sections extending into the control unit while also providing a cover section relative to the indented section or recessed tab 324 provided in pot 304. FIGS. 22A and 22B illustrate in greater detail cooking pot 304 (low volume with multiple vertical level step-ins) with its indent section 324. Upper flange section 305 of pot 304 includes the radially, generally horizontal section which terminates in the vertically downward bead 305" except for the non-beaded pot handle sections 305' provided diametrically opposite each other and 90 degrees from indent 324. The indent 324 also provides a convenient pour out location despite the preferred planar lower level platform 390 (although the fluid level may be minimal with the below described drain out valve). Platform 390 additionally provides for heat resistance bar support (or clearance) when the heater is in place, with cover 319 bridging the indent with the prongs 392 holding the heater element sections in place and providing a flush arrangement with the non-indented portion of the cooking pot flanged upper end.

FIG. 21C additionally shows the control unit operator interfacing elements provided on control unit 314. The interfacing elements include timer 404 having turn dial knob 405 with a time measurement count down unit 407 (shown as one of the control unit elements in FIG. 20J as well) such as one having an hour or two time schedule indicia with audible completion signaler and preferably a heating element shut down as well. Adjacent timer knob 404 there is positioned power light 406 which lights whenever the unit is plugged in. The second dial knob 410 represents an on/off and thermostat setting control knob and features, for example, an on switch on location and multiple temperature choices extending up to a preferred maximum temperature as in 450° F. [232.2° C.]. Heater light 408 is designed-to turn on when the cooking fluid is sensed as less than the set thermostat and goes off when the cooking temperature is reached which is a sign that the cooking fluid has reached a desired cooking temperature such that the food can be inserted. Once inserted the cooking fluid temperature will typically drop and the light relights until the time the cooking fluid again reaches the desired temperature where it then goes off again.

Figure 24A:
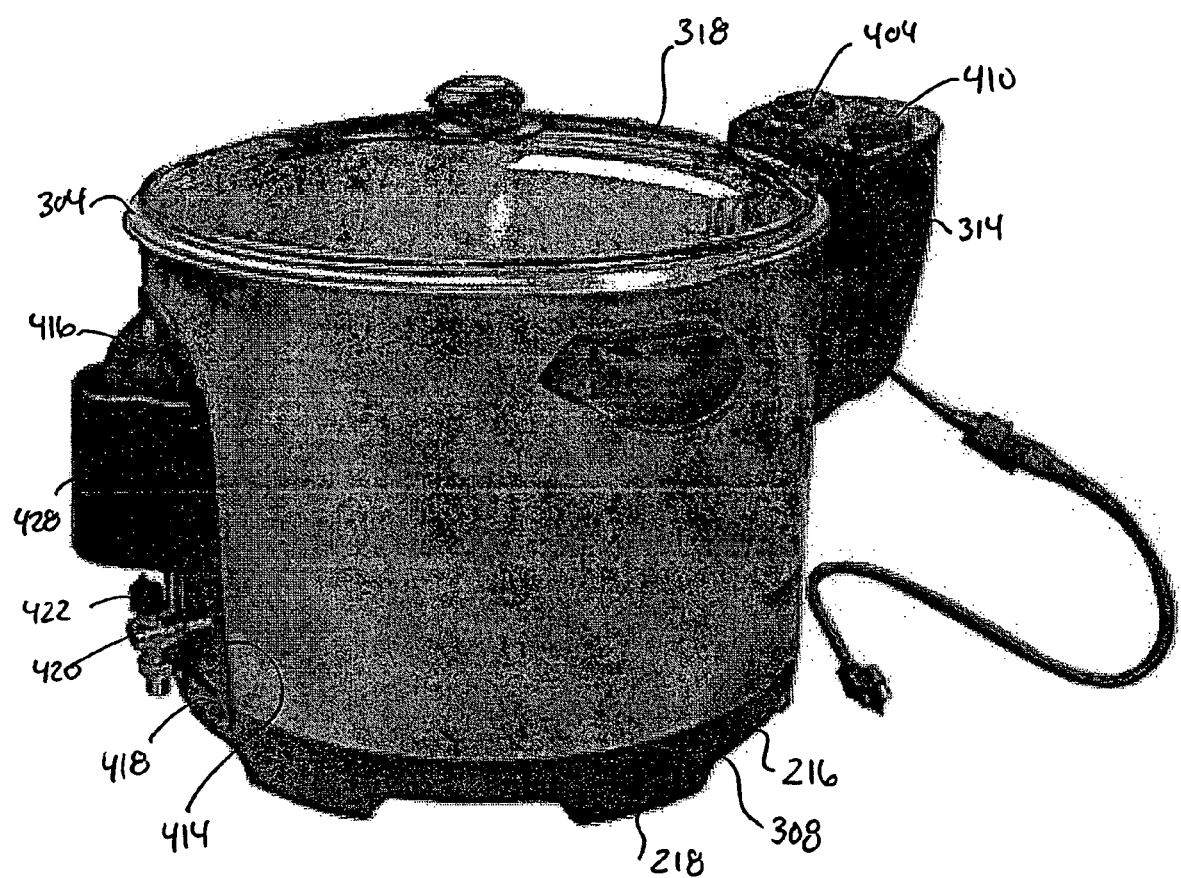
FIG. 24A shows an alternate embodiment of the cooking apparatus of the present invention with drain valve.
Figure 24B:
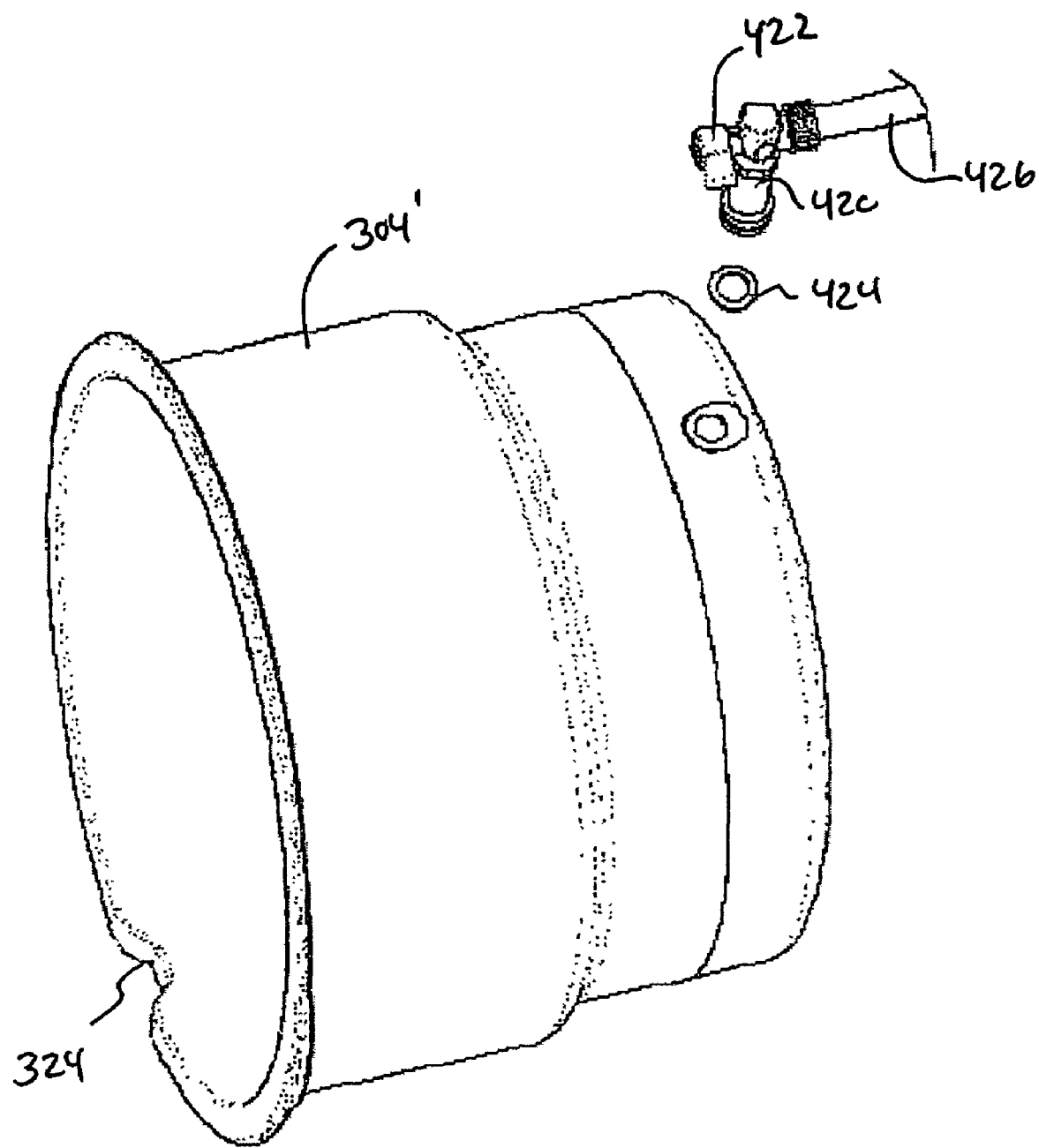
FIG. 24B shows an exploded view of the cooking pot with drain valve.
Figure 24C:
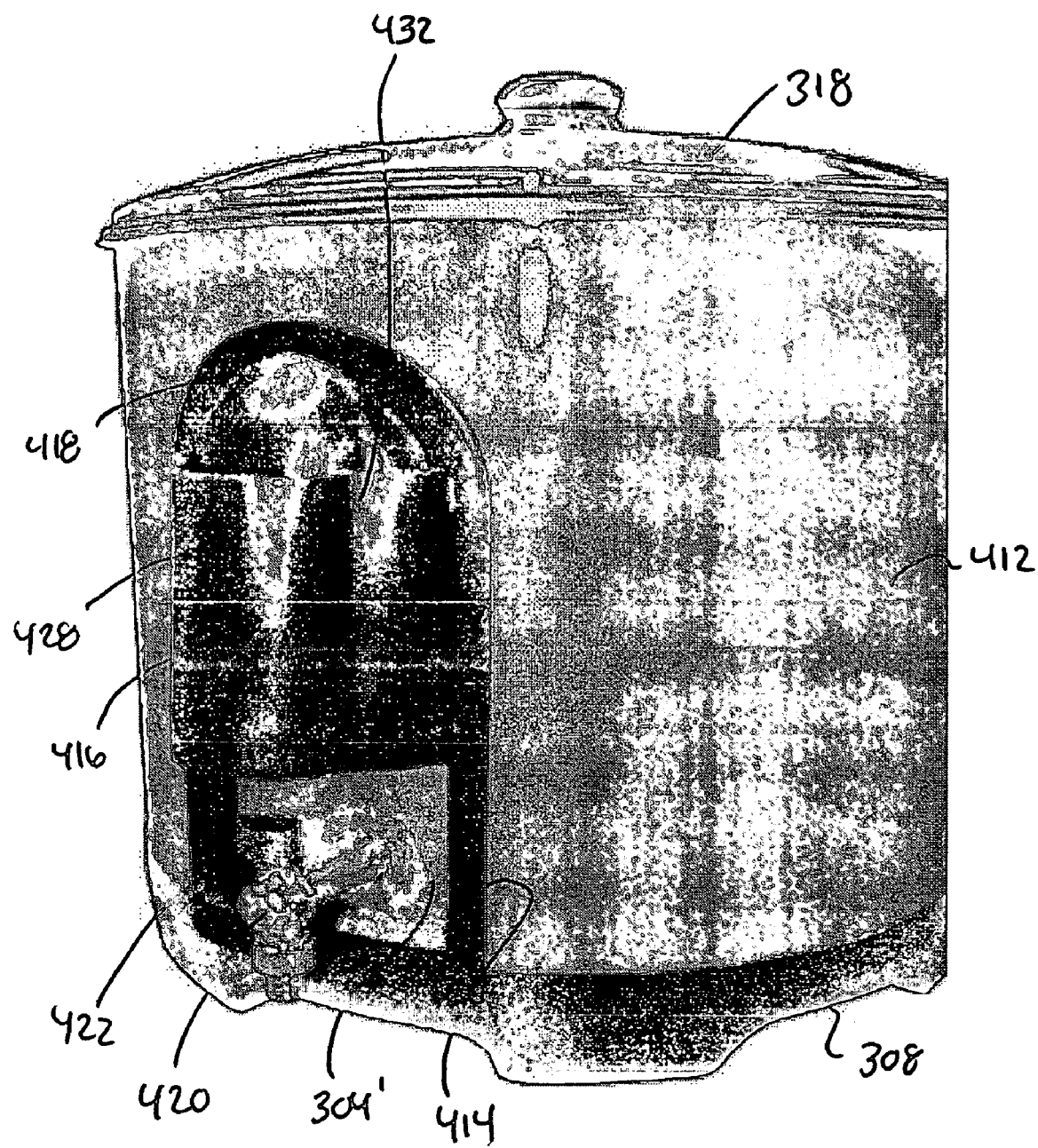
FIG. 24C shows an enlarged view of the cooking apparatus of FIG. 24A with spigot or drain valve cover open.

FIGS. 23, 24A, 24B, 24C and 24D illustrate an additional embodiment of the present invention with added drain valve assembly to facilitate drainage of all or close to all of the cooking fluid utilized after a sufficient cool down period. For example, cooking oil can be drained to a suitable receptacle for recycle/discarding or for reuse in the same cooking apparatus. As shown in FIGS. 24A and 24C, main body 412 of the outer shell is modified as compared to the earlier embodiment in its having opening 414 formed in it to accommodate the below described insert 418 of valve cover assembly 416. Opening 414 extends completely radially through to opposite sides of the one or more walls comprising the main body of main body 412 of the outer shell and is preferably has an upside down U shape that extends from an open bottom edge to a closed off upper edge that falls within the upper half or third region of the shell. Around the edging of opening 414 is provided insert 418 which is preferably formed of a smooth plastic material and has a peripheral edge conforming to the opening 414 shape (e.g. a snap in double flange grooved periphery edge (e.g., continuous outer flange and periodic interior flexible snap tabs) which captures the outer shell wall edging defining the opening 414 in the shell wall).

Figure 24D:
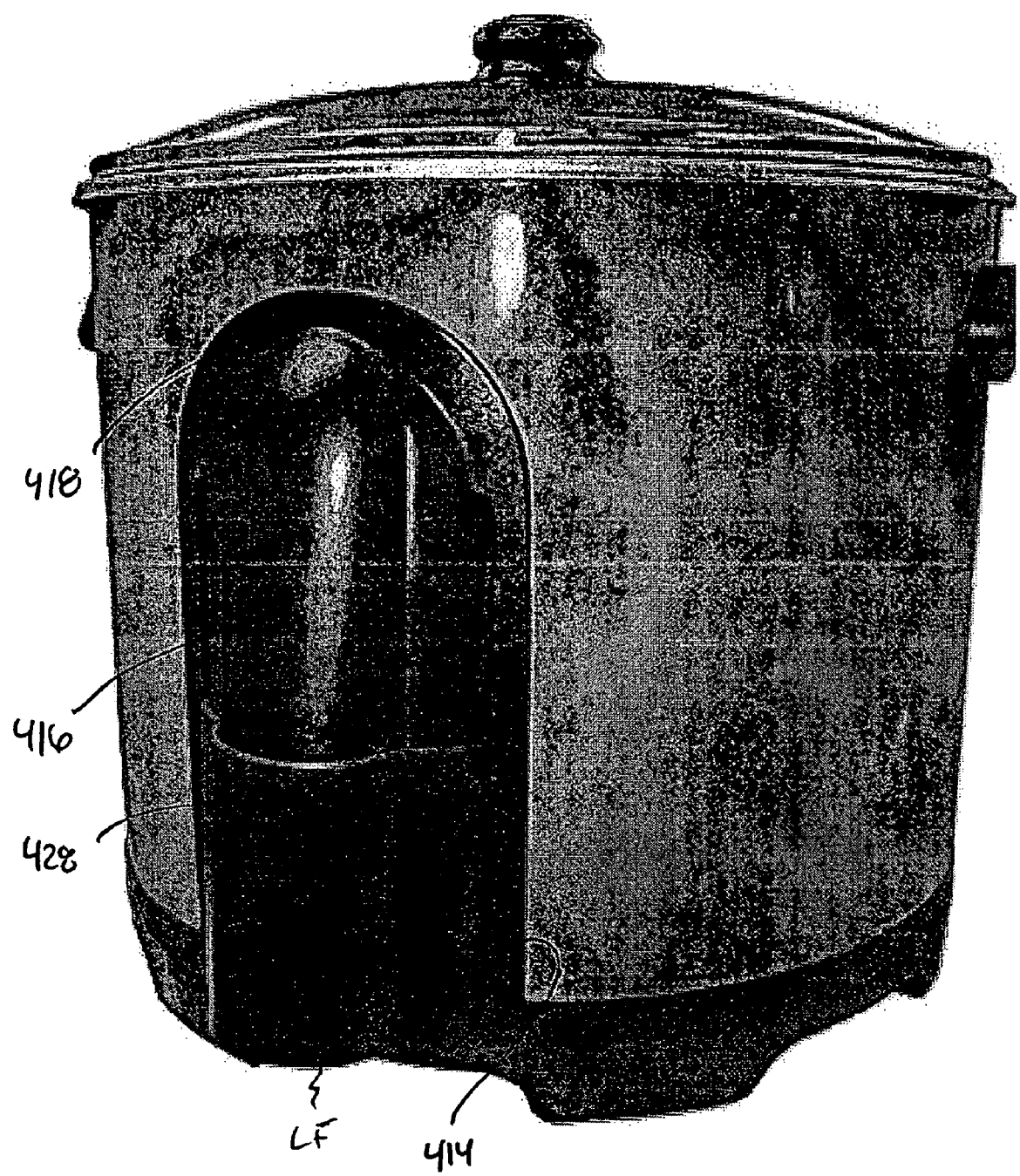
FIG. 24D shows the cooking apparatus of FIG. 24B with valve cover closed.
Figure 24E:
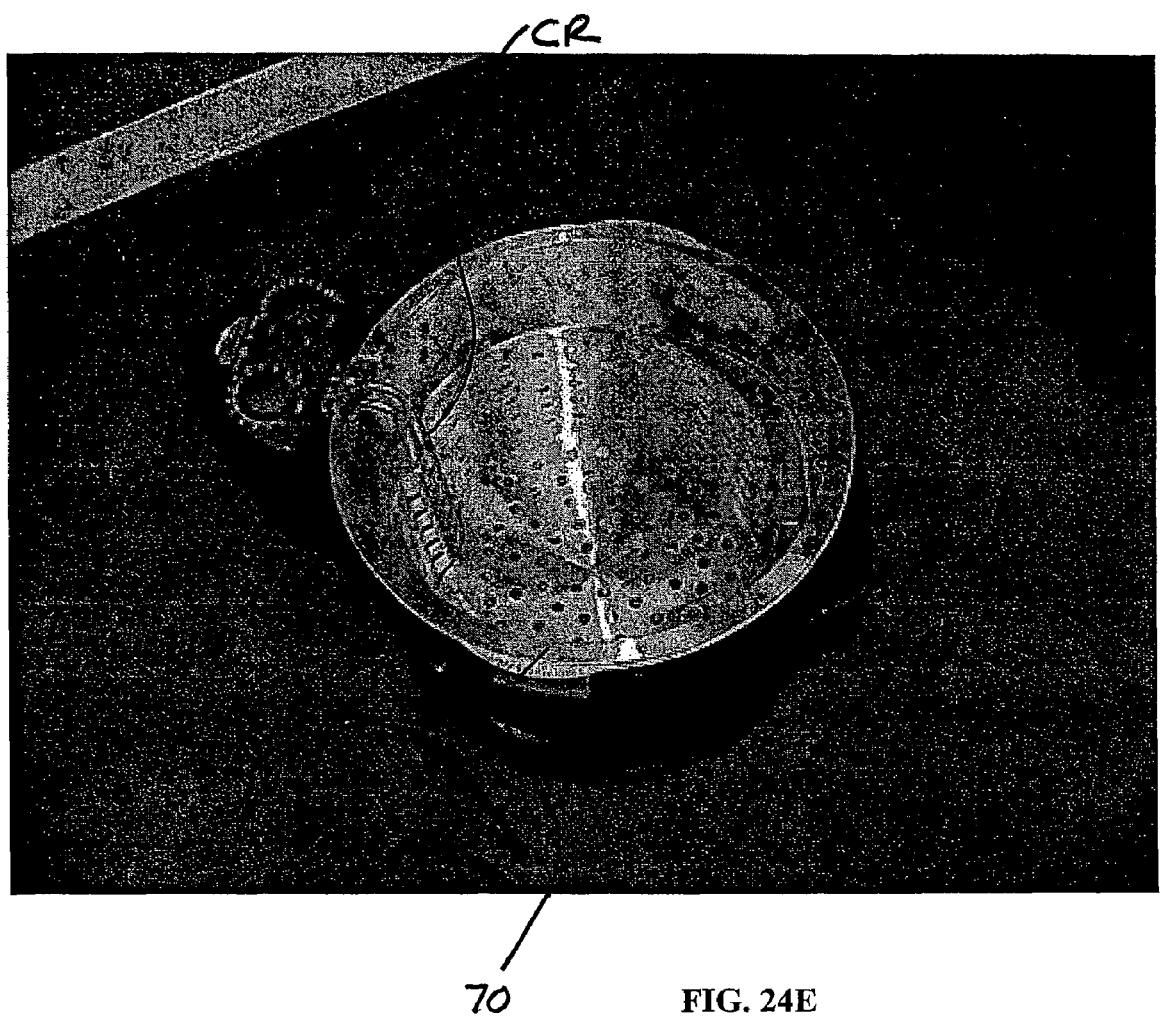
FIG. 24E shows a top perspective view of the embodiment of FIG. 24A showing the vertical section of the heating element and reception recess in the basket receiving the vertical section.
Figure 24F:
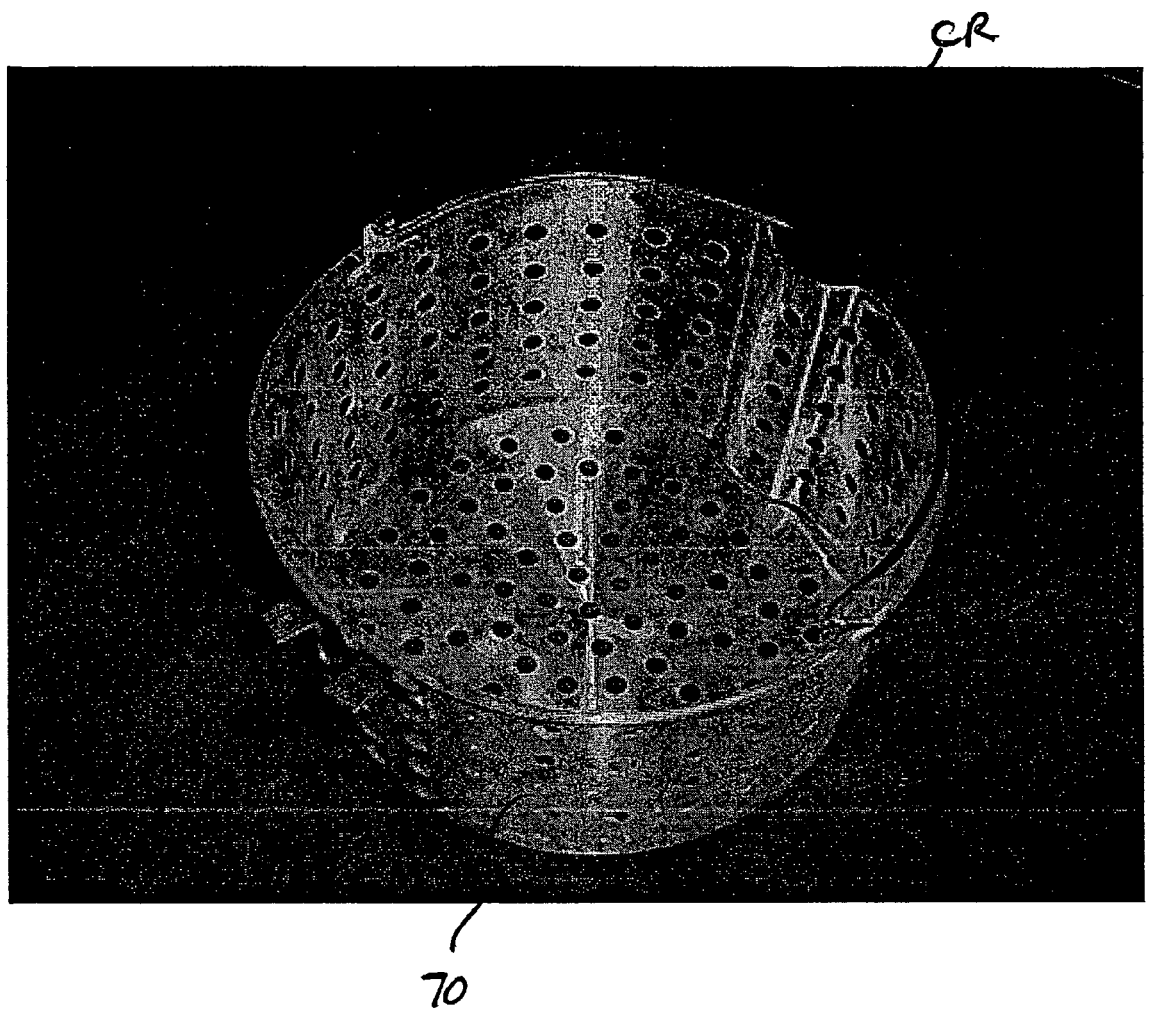
FIG. 24F shows in greater detail the basket of FIG. 24E.
Figure 24G:
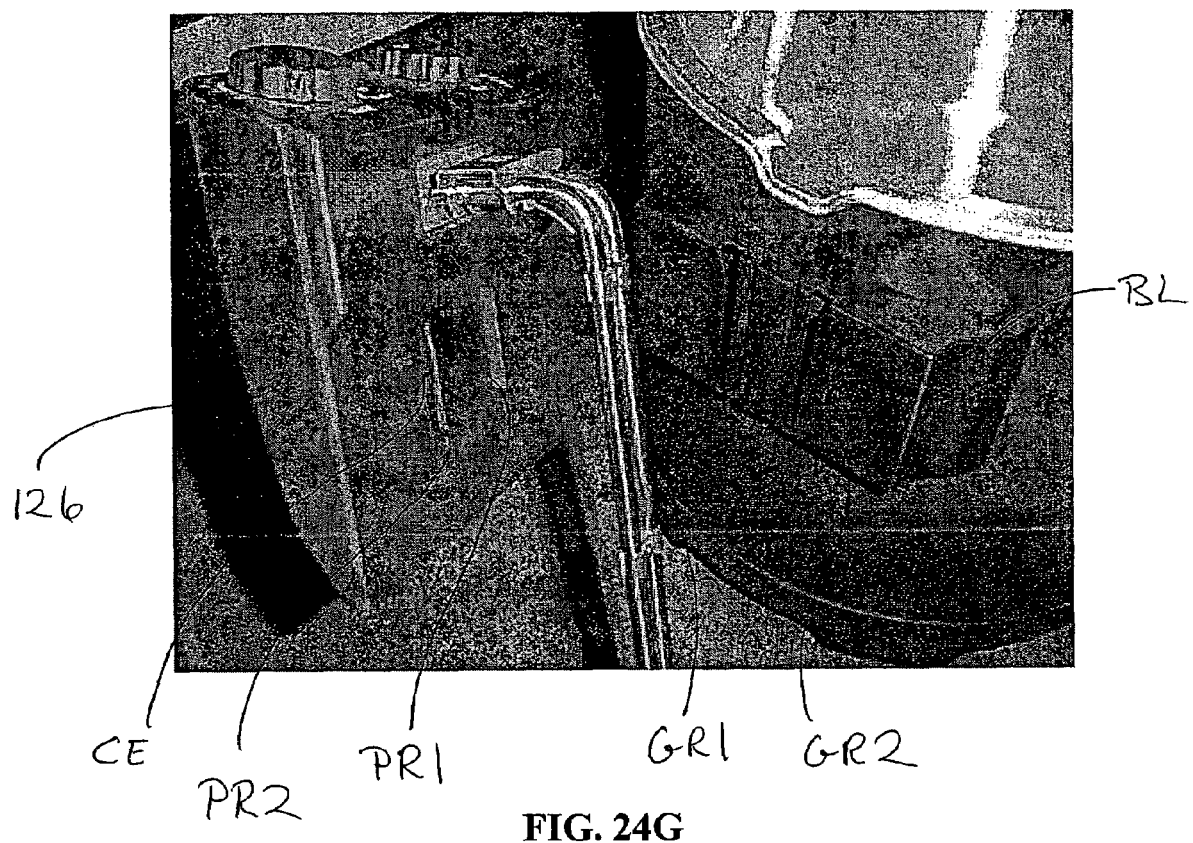
FIG. 24G shows in greater detail the male/female connectors for the heating device control unit housing and shell block.
Figure 24H:
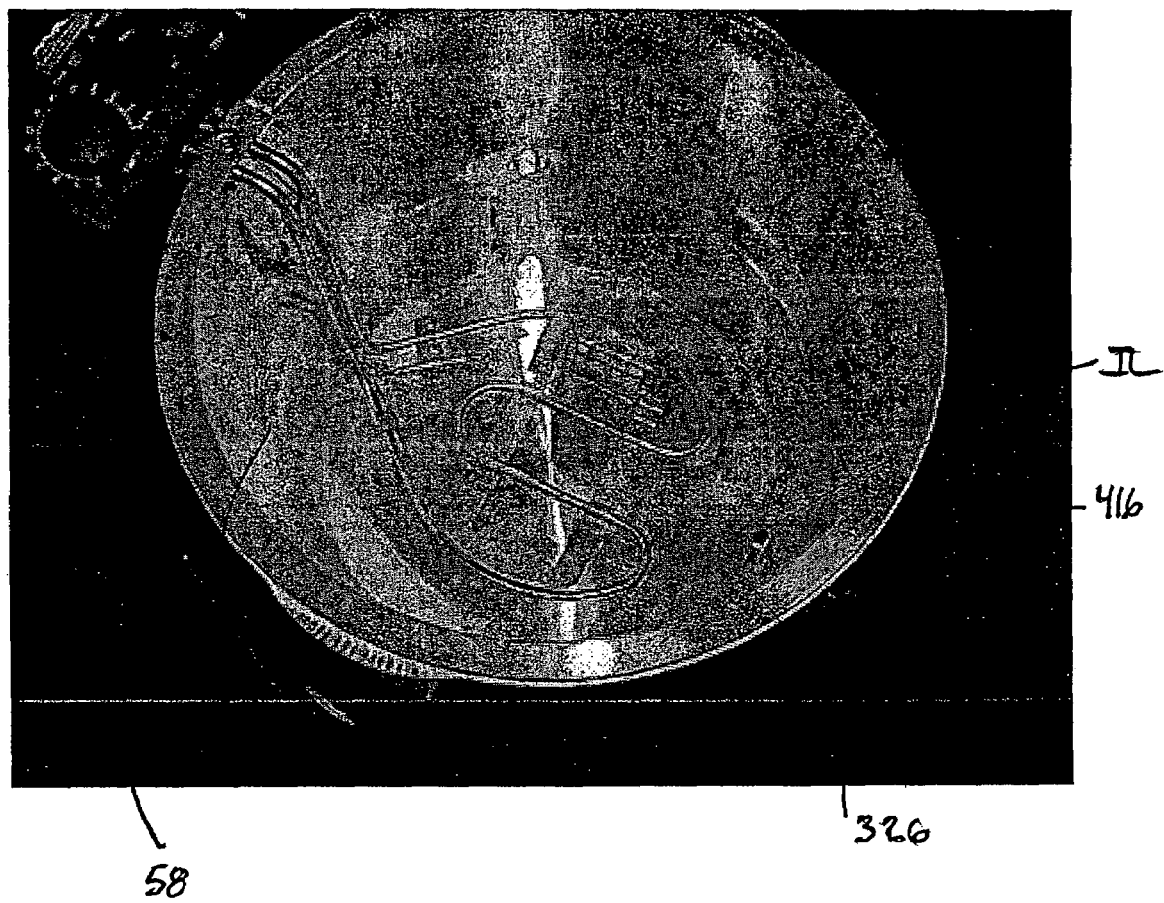
FIG. 24H shows the horizontal section of the heater bar generally commensurate with the drain valve spigot.
Figure 24I:
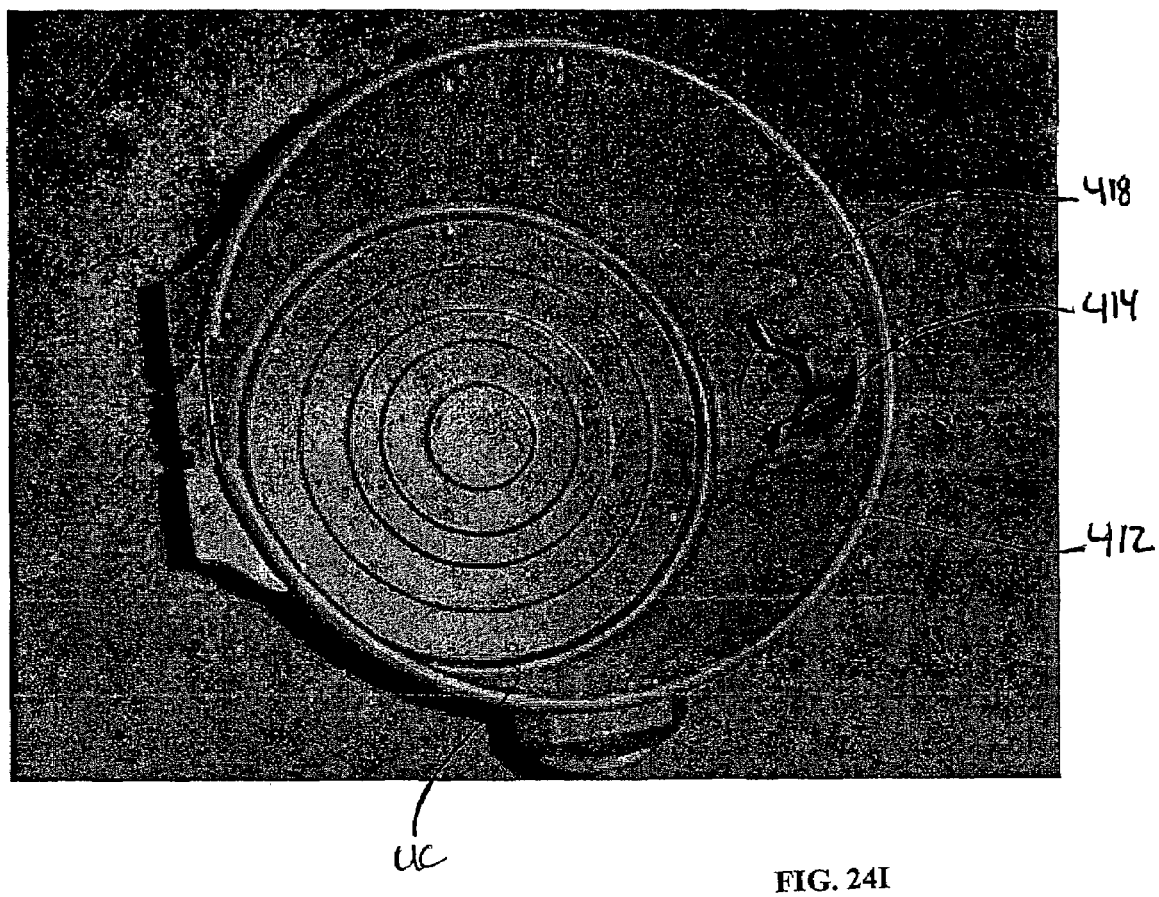
FIG. 24I illustrates an outer shell with sliding spigot cover removed and cover insert flange connected to the shell opening edging.

As seen from FIGS. 24C and 24D opening 414 and the corresponding lower opening of insert 418 is sized as to enable drain assembly 419 to extend radially out from its support location on pot 304 (the lower region preferably the lower 20% of overall pot height and more preferably lower than 10% as in a 3 to 5% vertical location—which is preferably generally commensurate or below the upper level of the lower cooking pot volume reduction step ins as in Q1 and generally commensurate with drain valve inlet IL shown in FIG. 24H) sufficiently to clear the shell for pouring out cooking fluid fee of contact with the shell. Opening 414 and insert 418 are preferably located diametrically opposite the control unit support location (notch NT). As seen from FIG. 24B, the drain assembly includes a spigot 420 with internal valve and on/off valve handle 422, which is preferably a hand manipulatable handle and has its inner end threaded or welded to a corresponding opening in the pot with a seal device 424. FIG. 24B further shows the potential for adding a drain hose 426 to the exit end of the spigot (or optionally the spigot can free flow out to an awaiting receptacle).

With reference again to FIGS. 24C and 24D there is seen the adjustable nature of the cover component 428 of the insert assembly 416 which in the illustrated preferred embodiment is slidable up into a drainage mode and back down again for a heat retention/heat shield mode. For example, an Omega cross sectioned insert is provided that has legs received in corresponding slide grooves in the insert 418 vertical side walls with or without friction enhancing lock in position plastic tabs or cam contoured rises in the groove region of insert 314 receiving the legs of cover 428. Insert 418 preferably has a curved dome section 430 which occupies the upper vertical half portion of the insert and extends sufficiently radially out as to have its outer radial point slightly beyond that of spigot assembly 420. Sliding cover component 428 is designed to have an interior surface generally conforming to the outer surface of the dome cover 430 so as to be in a telescoping slide relationship. In addition, there can be provided a slight pinched portion or inset 432 to opposite side of the cover and, preferably, a generally corresponding inset arrangement in the dome cover. The relative flexibility and tolerance relationship in the components defining the slide contact portions of the dome relative to the insert provides for a releasable retention state which precludes a slide down in normal usage but allows an operator to move down upon hand gripping and pushing down. This can be supplemented or replaced with the above noted insert 428 groove tabs or cam rises. The cover moves down until its lower edge hits the lower region of insert 48 where it is retained in the heat shielding arrangement. Other arrangements for this spigot accommodating cover assembly are also featured under the present invention as in a hinged (horizontal or vertical pivot) door arrangement or a slide arrangement wherein the cover is partially or entirely embedded within the shell casing (e.g., better suited for a multi-wall shell embodiment) are also featured under the present invention. The adjustable in position cover 420 thus provides enhanced heat capture retention when closed which facilitates cool down of the heated material in pot 304' after cooking is complete. In addition, the cover provides both protection from undesired abutment with the cantilevered spigot either by the operator or with other items stored on a shelf or the like when the device is stored. In the illustrated embodiment, there is an open area about lower flange LF, but in an alternate embodiment (not shown) a lower cover extension can be provided with a cut-out closely conforming to the shape of the spigot to allow vertical extension of the cover past the spigot when moved down into its closure mode. In an alternate embodiment, this lower region of cover 428 can be provided with a seal member (pair of flexible flaps with cut line between for a complete enclosure while still providing lift up and down functioning). In yet another embodiment, insert 428 can include a lower (e.g., stationary) cover section that extends about the spigot from below and to its sides, while still providing a lift out capability in cooking pot 304' with its spigot. This lower section can be positioned for close-off abutment with an upper, adjustable cover section.

The invention thus features an easy drain capacity following cooking completion and preferably when the oil has suitably cooled for retention in an exterior container. That is, after heating the food item in the cooking fluid and draining the food item, the cooking fluid is cooled and then drained by opening the cover component 428 of the cover assembly 416 to a spigot access position and then turning the spigot handle from a closed to open state whereupon the cooking fluid is free to exit the spigot drain opening. Upon completion of the spigot drainage the cooking pot can be lifted out (a slight tilting may facilitate clearance out of the shell which is accommodated by the opening 414 and outwardly projecting dome section 4301). Once removed any remaining fluid can be poured out such as through the stepped region 324 in pot 304'. This spigot drainage step is also preferably carried out following a basket suspension and cooking fluid cooked item drainage step such that the food item does not drip as much when removed and more of the cooking fluid can be captured and drained out.

What is claimed is:

1. A cooking apparatus, comprising:
   a cooking pot having an upper peripheral edge extending about a central, vertical axis of the cooking pot;
   a drain spigot positioned for cooking pot drainage;
   a shell having a base and a side wall and a first opening for receipt of the cooking pot in a cooking mode position and a second opening through which the spigot extends when the pot is in cooking mode position;
   a drain spigot cover device;
   a food support having a handle configured such that a food lift from bottom of cooking pot force on the handle is directed along a pull axis that includes a vertical force component that extends within an area internal of the cooking pot peripheral edge; and
   wherein said food support comprises a basket dimensioned for receipt within said cooking pot, and a support platform positioned between said basket and a bottom, interior surface of said cooking pot.

2. The apparatus of claim 1, wherein said cover device comprising an adjustable cover that is adjustable between a spigot access position and a spigot cover position.

3. The apparatus of claim 2 wherein said second opening is formed in the side wall of said shell and said cover is telescopically supported on said side wall.

4. The apparatus of claim 2 wherein said cover assembly further comprises means for releasable retention of said cover in the spigot access position.

5. The apparatus of claim 2 wherein said cover assembly includes a dome section that, together with said adjustable cover, cover an area above and in front of the drain spigot.

6. The apparatus of claim 1 further comprising a heating device that is positioned internally of the cooking pot when in cooking position.

7. The apparatus of claim 6 wherein said heating device comprises an immersion heat resistance element having a section extending into said cooking pot, said heating device being designed for tool free release from said cooking pot.

8. The apparatus of claim 7 further comprising a lid and wherein said cooking pot and shell have an upper reception region through which a portion of said heating device extends, and said heating device comprising a bridging section at said upper reception region which forms a flush arrangement relative to the upper region of the cooking pot for providing a heat retention lid seal arrangement about the entire periphery of said cooking pot.

9. The apparatus of claim 7 wherein the cooking pot comprises a peripheral flange and the upper reception region of said cooking pot is defined by a depressed flange region of said peripheral flange and the upper reception region of said shell comprises a notch within which the depressed flange region of said cooking pot is received.

10. The apparatus of claim 1 wherein said shell and cooking pot are arranged for tool free insertion and release of said cooking pot relative to said shell.

11. The apparatus of claim 10 wherein said shell has a flanged upper edge which flanged upper edge comprises a pair of flange handles.

12. The apparatus of claim 1 wherein said basket is dimensioned for receipt of an individual, whole turkey of 12-16 lb turkey and for receipt within said cooking pot.

13. The apparatus of claim 1 further comprising a heating device arranged for direct contact with cooking fluid when in said cooking pot, and
wherein said basket includes a recessed side wall for clearance relative to said heating device.

14. The apparatus of claim 1 wherein said basket includes a drainage capture hook and said handle is a convex bailing handle of said basket extending diametrically across said basket.

15. The apparatus of claim 1 wherein said cooking pot comprises at least one step-in, volume reduction region.

16. The apparatus of claim 15 wherein said cooking pot includes two step in regions vertically spaced.

17. The apparatus of claim 16 wherein at least one of said step-in regions includes a plurality of peripherally spaced step-in shoulders.

18. The apparatus of claim 1 further comprises a heating device received within said shell and wherein said support platform includes means for securing in position a section of a heating element of said heating device.

19. The apparatus of claim 18 wherein said heating element is a cooking fluid immersion heating element and a first temperature sensor is supported on said section of said heating element and a second over-heat temperature sensor is also supported on said section of said heating element.

20. The apparatus of claim 1 further comprises a heating device and wherein said heating device includes a heating element and a control unit integrated with said heating element, and said control unit, heating element and support platform are tool free releasable from said cooking pot as an integrated unit.

21. The apparatus of claim 20 further comprising a first set temperature sensor supported on said section of said heating element and a second over-heat temperature sensor also supported on said section of said heating element so as to be removable with said heating device and support platform.

22. The apparatus of claim 1 wherein said food support is completely received within said cooking pot during cooking of the food item such that no integral or connected food support component extends external to the cooking pot during cooking.

23. The apparatus of claim 1 wherein said cooking pot is a whole turkey cooking pot having an overall volume of 2 to 3 times a turkey cooking fluid volume level for said cooking pot, which cooking fluid volume is from 8 to 16 quarts and said cooking pot is further dimensioned such that insertion of a whole turkey into the cooking fluid results in a 35 to 65% rise in cooking fluid volume level within the cooking pot.

24. A cooking apparatus, comprising:
a cooking pot having an upper peripheral edge extending about a central, vertical axis of the cooking pot;
a drain spigot positioned for cooking pot drainage;
a shell having a base and a side wall and a first opening for receipt of the cooking pot in a cooking mode position and a second opening through which the spigot extends when the pot is in cooking mode position;
a drain spigot cover device; and
a food support having a handle configured such that a food lift from bottom of cooking pot force on the handle is directed along a pull axis that includes a vertical force component that extends within an area internal of the cooking pot peripheral edge,
wherein said cover device comprising an adjustable cover that is adjustable between a spigot access position and a spigot cover position,
wherein said cover assembly further comprises means for releasable retention of said cover in the spigot access position, and
wherein said cover assembly comprises an insert that extends about an edge of the second opening and said releasable retention means includes a slide slot formed in said insert.

25. A cooking apparatus, comprising:
a cooking pot having an upper peripheral edge extending about a central, vertical axis of the cooking pot;
a drain spigot positioned for cooking pot drainage;
a shell having a base and a side wall and a first opening for receipt of the cooking pot in a cooking mode position and a second opening through which the spigot extends when the pot is in cooking mode position;
a drain spigot cover device; and
a food support having a handle configured such that a food lift from bottom of cooking pot force on the handle is directed along a pull axis that includes a vertical force component that extends within an area internal of the cooking pot peripheral edge,
wherein said cover device comprising an adjustable cover that is adjustable between a spigot access position and a spigot cover position, and
wherein said drain spigot includes an on/off valve that is covered by said cover when said cover is in said spigot cover position and is accessible when said cover is in said spigot access position.

26. The apparatus of claim 25 further comprising a heating device which comprises an immersion heat resistance element and a control unit which are connected and mutually releasable from a cooking mode position.

27. The apparatus of claim 26 wherein said shell has a heater device support which slideably receives said control unit.

28. The apparatus of claim 26 wherein said control unit includes a temperature control device.

29. The apparatus of claim 28 wherein said control unit further comprises a timer.

30. A cooking apparatus, comprising:
   a cooking pot having an upper peripheral edge extending about a central, vertical axis of the cooking pot;
   a drain spigot positioned for cooking pot drainage;
   a shell having a base and a side wall and a first opening for receipt of the cooking pot in a cooking mode position and a second opening through which the spigot extends when the pot is in cooking mode position;
   a drain spigot cover device;
   a food support having a handle configured such that a food lift from bottom of cooking pot force on the handle is directed along a pull axis that includes a vertical force component that extends within an area internal of the cooking pot peripheral edge, and
   wherein said base includes an annular ring member and said shell is supported by a portion of said annular ring member.

31. The apparatus of claim 30 wherein said base further comprises a heat shield formed of a different material than said annular ring member and positioned under the cooking pot.

32. The apparatus of claim 31 wherein said shell includes a main body having a lower edge received within a groove formed in said annular ring, and said heat shield is received within a recessed section of said annular ring member.

33. A cooking apparatus, comprising:
   a cooking pot having an upper peripheral edge extending about a central, vertical axis of the cooking pot;
   a drain spigot positioned for cooking pot drainage;
   a shell having a base and a side wall and a first opening for receipt of the cooking pot in a cooking mode position and a second opening through which the spigot extends when the pot is in cooking mode position;
   a drain spigot cover device; and
   a food support having a handle configured such that a food lift from bottom of cooking pot force on the handle is directed along a pull axis that includes a vertical force component that extends within an area internal of the cooking pot peripheral edge,
   wherein said base comprises an annular ring member and a heat shield formed of a different material than said annular ring member and positioned under the cooking pot.

34. A cooking apparatus, comprising:
   a cooking pot having an upper peripheral edge extending about a central, vertical axis of the cooking pot;
   a drain spigot positioned for cooking pot drainage;
   a shell having a base and a side wall and a first opening for receipt of the cooking pot in a cooking mode position and a second opening through which the spigot extends when the pot is in cooking mode position;
   a drain spigot cover device; and
   a food support having a handle configured such that a food lift from bottom of cooking pot force on the handle is directed along a pull axis that includes a vertical force component that extends within an area internal of the cooking pot peripheral edge;
   a heating device comprising an immersion heat resistance element and a control unit which are connected and mutually releasable from a cooking mode position, and
   wherein said control unit includes a fail safe electrical connection assembly which is placed in a no-power-to-heating-element mode when said control unit is released from the cooking mode position.

35. The apparatus of claim 34 wherein said control unit and said shell are engaged by a male/female combination, and disconnection of the male/female combination triggers the no-power-to-heating-element mode.

36. The apparatus of claim 34 wherein said shell includes a main body formed by manipulating a sheet of material into a cooking pot cavity reception shape and said shell has a heater control unit support block which support block bridges a joined free edges region in said manipulated main body.

37. The apparatus of claim 36 wherein said control unit and said support block are engaged by a male/female slide connection and release combination and disconnection of the male/female combination triggers a no-power-to-heating-element mode.

38. A cooking apparatus for cooking an individual, whole turkey, comprising:
   a cooking pot having a capacity to accommodate, without spillover, a cooking fluid volume of 8 to 16 quarts and a change in fluid level in the cooking fluid volume upon insertion of the whole turkey into the cooking fluid;
   a drain spigot positioned for cooking pot drainage;
   a shell having a base and a side wall and a first opening for receipt of the cooking pot in a cooking mode position and a second opening through which the spigot extends when the pot is in cooking mode position;
   a whole turkey cooking support;
   a heating device comprising a control unit and an electric immersion heater which is in direct contact with the cooking fluid and is positioned as not to block a vertical pull out of said whole turkey and whole turkey cooking support, and
   wherein said immersion heater and control unit are connected and mutually releasable from a cooking mode position, and wherein said control unit includes a fail safe electrical connection which is placed in a no-power-to-heating-element mode when said control unit is released from the cooking mode position.

39. The apparatus of claim 38 wherein said whole turkey cooking support includes a basket having a grasping location that provides a pull up axis that is vertical and lies within an area that exists within a peripheral upper edge of said cooking pot.

40. The apparatus of claim 38 wherein said whole turkey cooking support includes a whole turkey skewer.

41. The apparatus of claim 38 further comprising food support suspension means for avoiding direct weight contact of the whole turkey food support when supporting a whole turkey with an underlying section of said electric immersion heater, which electric immersion heater is releasable in a tool-less manner from the shell.

* * * * *